(12) United States Patent
Rocholl et al.

(10) Patent No.: US 11,781,365 B2
(45) Date of Patent: Oct. 10, 2023

(54) ELECTRIC TAILGATE FOR ELECTRIC REFUSE VEHICLE

(71) Applicant: Oshkosh Corporation, Oshkosh, WI (US)

(72) Inventors: Joshua D. Rocholl, Rochester, MN (US); Derek A. Wente, Austin, MN (US); John T. Kellander, Oronoco, MN (US); Cody D. Clifton, Mapleton, MN (US); Vincent Hoover, Byron, MN (US); Zachary L. Klein, Rochester, MN (US); Clinton T. Weckwerth, Pine Island, MN (US); Skylar A. Wachter, Doge Center, MN (US); Andrew Kotloski, Oshkosh, WI (US); Wallace Buege, West Bend, WI (US); Caleb Binder, Oshkosh, WI (US); Martin J. Schimke, Red Granite, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 17/840,873

(22) Filed: Jun. 15, 2022

(65) Prior Publication Data

US 2022/0307312 A1 Sep. 29, 2022

Related U.S. Application Data

(63) Continuation of application No. 16/851,543, filed on Apr. 17, 2020, now Pat. No. 11,434,681.
(Continued)

(51) Int. Cl.
*E05F 15/611* (2015.01)
*E05F 15/614* (2015.01)
(Continued)

(52) U.S. Cl.
CPC .............. *E05F 15/614* (2015.01); *B60P 1/14* (2013.01); *B65F 3/046* (2013.01); *B65F 2003/025* (2013.01); *E05Y 2900/546* (2013.01)

(58) Field of Classification Search
CPC ...................................................... E05F 15/611
See application file for complete search history.

(56) References Cited

U.S. PATENT DOCUMENTS 1,151,479 A 8/1915 Kurtz
2,263,199 A 11/1941 Co
(Continued)

FOREIGN PATENT DOCUMENTS

CA 1264702 1/1990
CA 2121055 10/1995
(Continued)

OTHER PUBLICATIONS

Boivin Evolution, Introducing the First 100% Electric Automated Arm and Collection Body, URL: https://www.bev.ca/upload/files/BEV_Arm_and_collection_body_Diesel.pdf, first published on Jun. 3, 2019, 2 pps.
(Continued)

*Primary Examiner* — Jonathan Snelting
(74) *Attorney, Agent, or Firm* — Foley & Lardner LLP

(57) ABSTRACT

Another implementation of the present disclosure is a refuse vehicle. The refuse vehicle includes a chassis, a body coupled with the chassis, a tailgate, an electric lock, and a fully electric tailgate actuator assembly. The body assembly defines a refuse compartment. The tailgate is coupled with a rear of the body and is transitionable between a first position to limit access to the refuse compartment and a second position to allow access to the refuse compartment. The electric lock is operable between an engaged state and a disengaged state to limit movement of the tailgate out of the
(Continued)

first position when the electric lock is in the engaged state. The fully electric tailgate actuator assembly is configured to transition the tailgate between the first position and the second position.

21 Claims, 35 Drawing Sheets

Related U.S. Application Data

(60) Provisional application No. 62/842,914, filed on May 3, 2019.

(51) Int. Cl.
    *B60P 1/14*    (2006.01)
    *B65F 3/04*    (2006.01)
    *B65F 3/02*    (2006.01)

(56) References Cited

U.S. PATENT DOCUMENTS

| | | | |
|---|---|---|---|
| 3,195,744 | A | 7/1965 | Wender |
| 4,051,970 | A | 10/1977 | Ramsey |
| 4,219,298 | A | 8/1980 | Stragier et al. |
| 4,313,707 | A | 2/1982 | Bingman et al. |
| 4,401,407 | A | 8/1983 | Breckenridge |
| 4,461,608 | A | 7/1984 | Boda |
| 4,606,695 | A | 8/1986 | Lenz |
| 5,015,022 | A | 5/1991 | Mc Guire |
| 5,158,340 | A | 10/1992 | Boda |
| 5,391,039 | A | 2/1995 | Holtom |
| 5,421,689 | A | 6/1995 | Boivin |
| 5,498,067 | A * | 3/1996 | Christenson .............. B65F 3/00 298/23 S |
| 5,505,576 | A | 4/1996 | Sizemore et al. |
| 5,527,098 | A * | 6/1996 | McKinney ................ B65F 3/00 298/8 R |
| 5,702,225 | A | 12/1997 | Ghibaudo |
| 5,720,589 | A | 2/1998 | Christenson et al. |
| 5,785,487 | A * | 7/1998 | McNeilus ................ B65F 3/28 414/525.6 |
| 5,816,766 | A | 10/1998 | Clark |
| 5,833,428 | A | 11/1998 | Szinte |
| 5,919,027 | A | 7/1999 | Christenson |
| 5,934,858 | A | 8/1999 | Christenson |
| 5,934,867 | A | 8/1999 | Christenson |
| 5,938,394 | A | 8/1999 | Christenson |
| 5,951,235 | A | 9/1999 | Young et al. |
| 5,967,731 | A | 10/1999 | Brandt |
| 5,971,694 | A | 10/1999 | McNeilus et al. |
| 5,984,609 | A | 11/1999 | Bartlett |
| 5,988,970 | A | 11/1999 | Holtom |
| 5,988,972 | A | 11/1999 | Boivin |
| 6,033,176 | A | 3/2000 | Bartlett |
| 6,062,803 | A | 5/2000 | Christenson |
| 6,071,058 | A | 6/2000 | Tetz et al. |
| 6,089,813 | A | 7/2000 | McNeilus et al. |
| 6,095,744 | A | 8/2000 | Harrison |
| 6,120,235 | A | 9/2000 | Humphries et al. |
| 6,123,500 | A | 9/2000 | McNeilus et al. |
| 6,135,536 | A | 10/2000 | Ciavaglia et al. |
| 6,210,094 | B1 | 4/2001 | McNeilus et al. |
| 6,213,706 | B1 | 4/2001 | Christenson |
| 6,224,318 | B1 | 5/2001 | McNeilus et al. |
| 6,315,515 | B1 | 11/2001 | Young et al. |
| 6,336,783 | B1 | 1/2002 | Young et al. |
| 6,350,098 | B1 | 2/2002 | Christenson et al. |
| 6,390,758 | B1 | 5/2002 | McNeilus et al. |
| 6,447,239 | B2 | 9/2002 | Young et al. |
| 6,474,928 | B1 | 11/2002 | Christenson |
| 6,485,079 | B1 * | 11/2002 | Brown ................... B65F 3/001 296/50 |
| 6,491,489 | B1 | 12/2002 | Stragier |
| 6,494,665 | B1 | 12/2002 | Bingman |
| 6,520,008 | B1 | 2/2003 | Stragier |
| 6,565,305 | B2 | 5/2003 | Schrafel |
| 6,894,447 | B1 | 5/2005 | Friede et al. |
| 7,070,382 | B2 | 7/2006 | Pruteanu et al. |
| 7,073,620 | B2 | 7/2006 | Braun et al. |
| 7,198,130 | B2 | 4/2007 | Schimke |
| 7,258,194 | B2 | 8/2007 | Braun et al. |
| 7,284,943 | B2 | 10/2007 | Pruteanu et al. |
| 7,357,203 | B2 | 4/2008 | Morrow et al. |
| 7,448,460 | B2 | 11/2008 | Morrow et al. |
| 7,556,468 | B2 | 7/2009 | Grata |
| 7,559,735 | B2 | 7/2009 | Pruteanu et al. |
| 7,824,293 | B2 | 11/2010 | Schimke |
| 7,878,750 | B2 | 2/2011 | Zhou et al. |
| 7,931,103 | B2 | 4/2011 | Morrow et al. |
| 8,104,120 | B2 | 1/2012 | Hornbach et al. |
| 8,123,645 | B2 | 2/2012 | Schimke |
| 8,182,194 | B2 | 5/2012 | Pruteanu et al. |
| 8,215,892 | B2 | 7/2012 | Calliari |
| 8,251,420 | B2 | 8/2012 | Mizuno et al. |
| 8,337,352 | B2 | 12/2012 | Morrow et al. |
| 8,360,706 | B2 | 1/2013 | Addleman et al. |
| 8,540,475 | B2 | 9/2013 | Kuriakose et al. |
| 8,561,735 | B2 | 10/2013 | Morrow et al. |
| 8,807,613 | B2 | 8/2014 | Howell et al. |
| 8,864,613 | B2 | 10/2014 | Morrow et al. |
| 9,174,686 | B1 | 11/2015 | Messina et al. |
| 9,216,856 | B2 | 12/2015 | Howell et al. |
| 9,387,985 | B2 | 7/2016 | Gillmore et al. |
| 9,403,641 | B1 | 8/2016 | Ghibaudo |
| 9,428,042 | B2 | 8/2016 | Morrow et al. |
| 9,624,033 | B1 | 4/2017 | Price et al. |
| 9,650,032 | B2 | 5/2017 | Kotloski et al. |
| 9,651,120 | B2 | 5/2017 | Morrow et al. |
| 9,656,659 | B2 | 5/2017 | Shukla et al. |
| 9,707,869 | B1 | 7/2017 | Messina et al. |
| 9,834,377 | B1 | 12/2017 | Hayes et al. |
| 9,880,581 | B2 | 1/2018 | Kuriakose et al. |
| 9,908,520 | B2 | 3/2018 | Shukla et al. |
| 9,970,515 | B2 | 5/2018 | Morrow et al. |
| 9,981,803 | B2 | 5/2018 | Davis et al. |
| 10,029,555 | B2 | 7/2018 | Kotloski et al. |
| 10,029,556 | B2 | 7/2018 | Morrow et al. |
| 10,160,438 | B2 | 12/2018 | Shukla et al. |
| 10,174,868 | B2 | 1/2019 | Ditty et al. |
| 10,196,205 | B2 | 2/2019 | Betz et al. |
| 10,267,390 | B2 | 4/2019 | Morrow et al. |
| 10,301,111 | B2 | 5/2019 | Schell |
| 10,308,429 | B2 | 6/2019 | McNeilus et al. |
| 10,357,995 | B2 | 7/2019 | Palmer et al. |
| 10,414,067 | B2 | 9/2019 | Datema et al. |
| 10,421,350 | B2 | 9/2019 | Morrow et al. |
| 10,435,026 | B2 | 10/2019 | Shively et al. |
| 10,457,134 | B2 | 10/2019 | Morrow et al. |
| 10,457,533 | B2 | 10/2019 | Puszkiewicz et al. |
| 10,558,234 | B2 | 2/2020 | Kuriakose et al. |
| 10,569,423 | B1 | 2/2020 | Jones et al. |
| 10,578,195 | B2 | 3/2020 | Steinberger et al. |
| 10,584,775 | B2 | 3/2020 | Steinberger et al. |
| 10,661,986 | B2 | 5/2020 | Price et al. |
| 10,703,356 | B2 | 7/2020 | Lacroix et al. |
| 10,801,243 | B2 * | 10/2020 | Nakatomi ............. E05F 1/1253 |
| 10,865,827 | B2 | 12/2020 | Gentry et al. |
| 11,001,440 | B2 | 5/2021 | Rocholl et al. |
| 11,254,500 | B2 | 2/2022 | Buege et al. |
| 2002/0154973 | A1 | 10/2002 | Bradshaw et al. |
| 2004/0177934 | A1 | 9/2004 | Olmsted |
| 2006/0280582 | A1 | 12/2006 | Kouri |
| 2011/0240777 | A1 | 10/2011 | Johns et al. |
| 2012/0261931 | A1 | 10/2012 | Kang |
| 2014/0269145 | A1 | 9/2014 | Fasana et al. |
| 2015/0151433 | A1 | 6/2015 | Rust et al. |
| 2016/0044285 | A1 | 2/2016 | Gasca et al. |
| 2017/0044815 | A1 | 2/2017 | Watanabe |
| 2018/0155124 | A1 | 6/2018 | Kay et al. |
| 2018/0250847 | A1 | 9/2018 | Wurtz et al. |
| 2018/0326832 | A1 | 11/2018 | Kotloski et al. |
| 2019/0091890 | A1 | 3/2019 | Rocholl et al. |

(56) References Cited

U.S. PATENT DOCUMENTS

| | | |
|---|---|---|
| 2019/0111910 A1 | 4/2019 | Shukla et al. |
| 2019/0121353 A1 | 4/2019 | Datema et al. |
| 2019/0161272 A1 | 5/2019 | Betz et al. |
| 2019/0193934 A1 | 6/2019 | Rocholl et al. |
| 2019/0242460 A1 | 8/2019 | Morrow et al. |
| 2019/0322321 A1 | 10/2019 | Schwartz et al. |
| 2019/0325220 A1 | 10/2019 | Wildgrube et al. |
| 2019/0344475 A1 | 11/2019 | Datema et al. |
| 2019/0360600 A1 | 11/2019 | Jax et al. |
| 2019/0366828 A1 | 12/2019 | Morrow et al. |
| 2020/0031641 A1 | 1/2020 | Puszkiewicz et al. |
| 2020/0039341 A1 | 2/2020 | Morrow et al. |
| 2020/0078986 A1 | 3/2020 | Clifton et al. |
| 2020/0102145 A1 | 4/2020 | Nelson et al. |
| 2020/0180860 A1 | 6/2020 | Searle et al. |
| 2020/0200237 A1 | 6/2020 | Steinberger et al. |
| 2020/0200238 A1 | 6/2020 | Steinberger et al. |
| 2020/0230841 A1 | 7/2020 | Datema et al. |
| 2020/0230842 A1 | 7/2020 | Datema et al. |
| 2020/0262328 A1 | 8/2020 | Nelson et al. |
| 2020/0262366 A1 | 8/2020 | Wildgrube et al. |
| 2020/0265656 A1 | 8/2020 | Koga et al. |
| 2021/0039880 A1 | 2/2021 | Boivin et al. |
| 2021/0122568 A1 | 4/2021 | Boivin et al. |

FOREIGN PATENT DOCUMENTS

| | | |
|---|---|---|
| CA | 2373724 | 8/2003 |
| CA | 3072106 | 2/2019 |
| CN | 105210518 | 1/2016 |
| CN | 105501766 B | 3/2018 |
| CN | 107985873 A | 5/2018 |
| DE | 10 2006 032 206 A1 | 1/2008 |
| DE | 10 2007 026 418 A1 | 12/2008 |
| DE | 10 2008 013 940 A1 | 9/2009 |
| EP | 0 620 167 | 10/1994 |
| GB | 2 129 086 A | 5/1984 |
| GB | 2 405 395 A | 3/2005 |
| JP | H11-168925 A | 6/1999 |
| JP | 2016-068200 A | 5/2016 |
| WO | WO-2019/033201 A1 | 2/2019 |
| WO | WO-2021/068063 A1 | 4/2021 |

OTHER PUBLICATIONS

Lion Electric on Twitter: https://twitter.com/LionElectricCo/status/1280202671379509248?ref_src=twsrc%5Etfw%7Ctwcamp%5EtWeetembed%7Ctwterm%5E1280202671379509248%7Ctwgr%5E%7Ctwcon%5Es1_ &ref_url=https%3A92F%2Fcleantechnica.com%2F2020%2F07%2F13%2Flion-electric-boivin-evolution-start-selling-electric-garbage-truck%2F, first published on Jul. 6, 2020, 7 pps.

Lion Electric & Boivin Evolution Start Selling Electric Garbage Truck, Clean Technica, URL: https://cleantechnica.com/2020/07/13/lion-electric-boivin-evolution-start-selling-electric-garbage-truck/, first published Jul. 13, 2020, 9 pps.

* cited by examiner

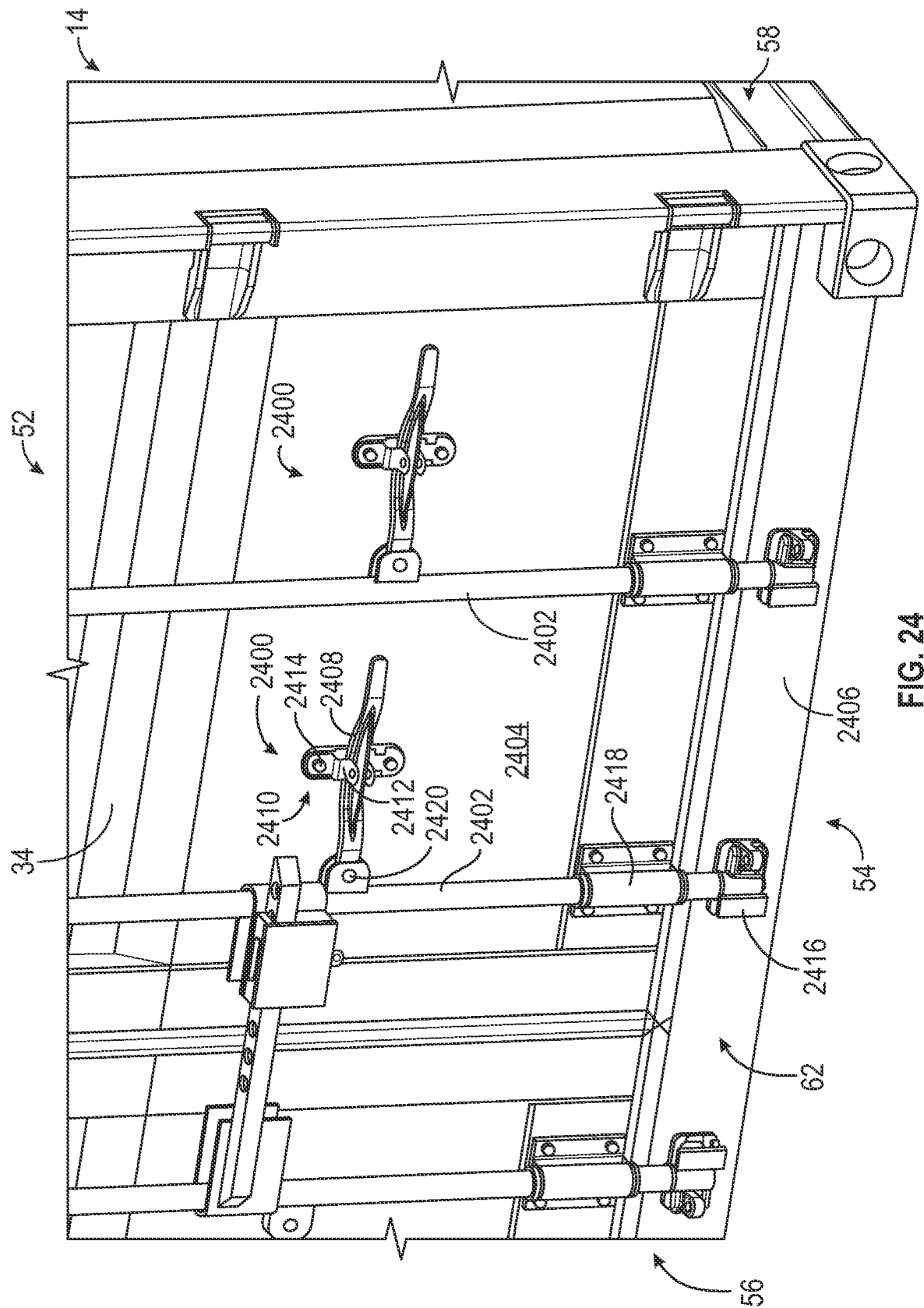

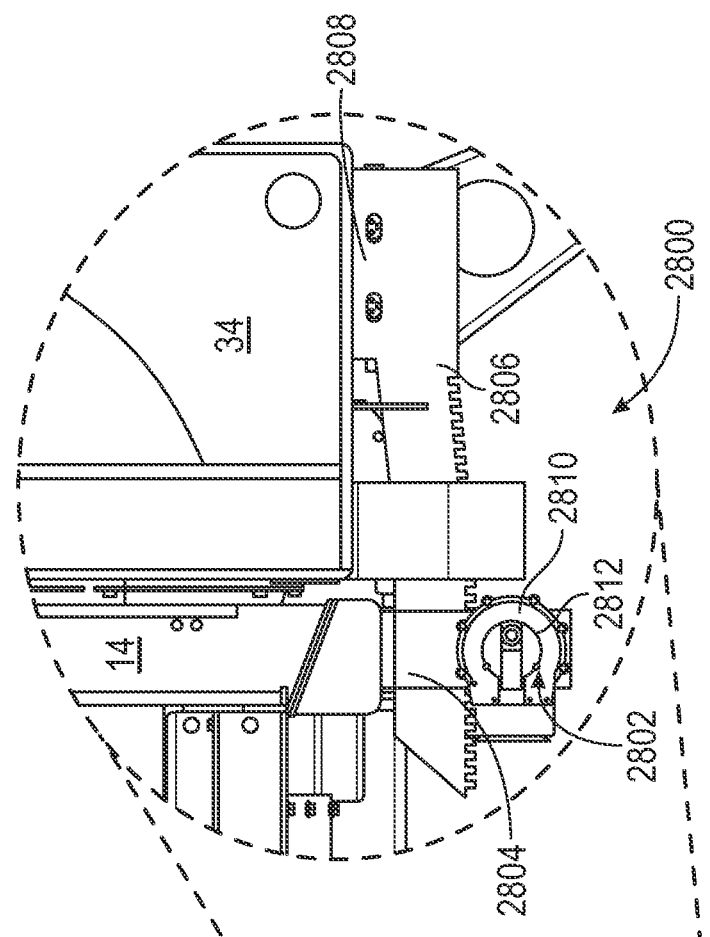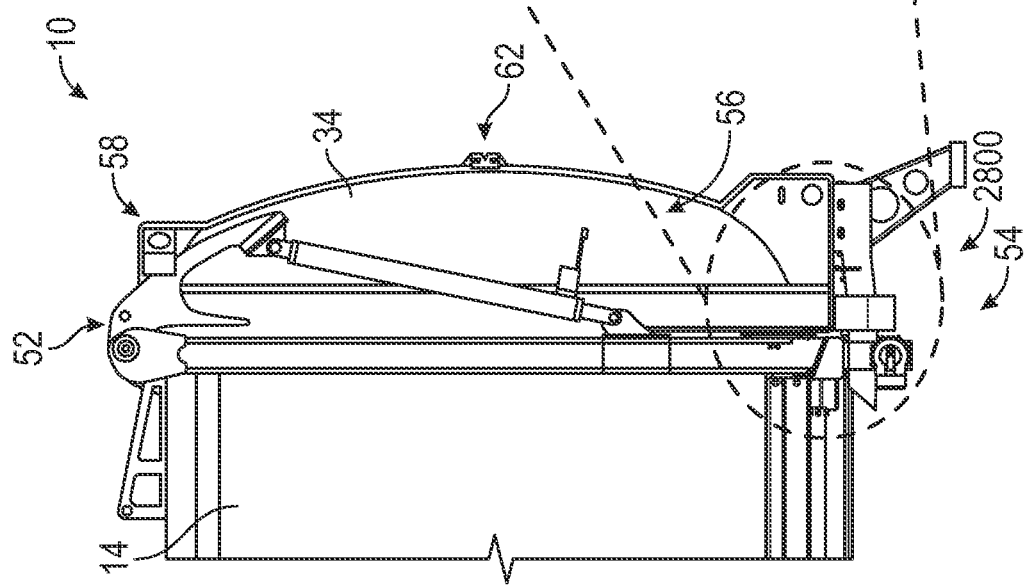
FIG. 28

ELECTRIC TAILGATE FOR ELECTRIC REFUSE VEHICLE

CROSS-REFERENCE TO RELATED PATENT APPLICATION

This application is a continuation of U.S. application Ser. No. 16/851,543, filed Apr. 17, 2020, which claims the benefit of and priority to U.S. Provisional Patent Application No. 62/842,914, filed May 3, 2019, the entire disclosures of which are incorporated by reference herein.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One implementation of the present disclosure is a refuse vehicle. The refuse vehicle includes a chassis, a body coupled with the chassis, a tailgate, and a fully electric tailgate actuator assembly. The body defines a refuse compartment. The tailgate is coupled with a rear of the body and is transitionable between a first position to limit access to the refuse compartment and a second position to allow access to the refuse compartment. The fully electric tailgate actuator assembly is configured to transition the tailgate between the first position and the second position.

Another implementation of the present disclosure is a refuse vehicle. The refuse vehicle includes a chassis, a body coupled with the chassis, a tailgate, and an electric lock. The body defines a refuse compartment. The tailgate is coupled with a rear of the body and is transitionable between a first position to limit access to the refuse compartment and a second position to allow access to the refuse compartment. The electric lock is operable between an engaged state and a disengaged state to limit movement of the tailgate out of the first position when the electric lock is in the engaged state.

Another implementation of the present disclosure is a refuse vehicle. The refuse vehicle includes a chassis, a body coupled with the chassis, a tailgate, an electric lock, and a fully electric tailgate actuator assembly. The body assembly defines a refuse compartment. The tailgate is coupled with a rear of the body and is transitionable between a first position to limit access to the refuse compartment and a second position to allow access to the refuse compartment. The electric lock is operable between an engaged state and a disengaged state to limit movement of the tailgate out of the first position when the electric lock is in the engaged state. The fully electric tailgate actuator assembly is configured to transition the tailgate between the first position and the second position.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 24 is a perspective view of a bottom portion of the refuse vehicle of FIG. 1 including one or more door locks, according to an exemplary embodiment.

FIG. 28 is a side view of a portion of the refuse vehicle of FIG. 1 including a rack and pinion locking system for locking the tailgate in the first position, according to an exemplary embodiment.

DETAILED DESCRIPTION

Figure 1:
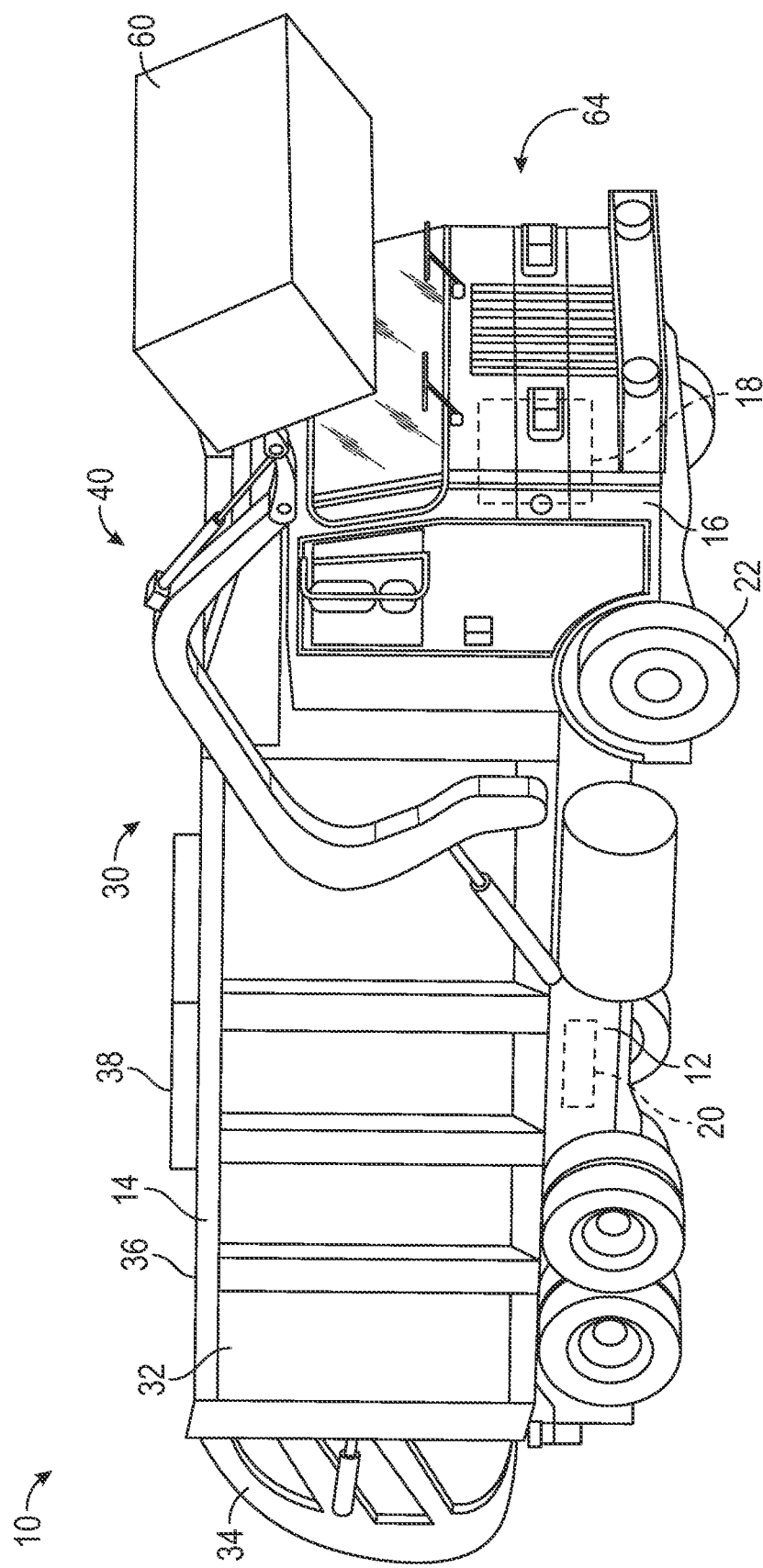
FIG. 1 is a perspective view of a refuse vehicle including a tailgate transitionable between a first position and a second position, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, an electric tailgate for a refuse vehicle is disclosed herein. The electric tailgate of the present disclosure provides many advantages over conventional systems. The electric tailgate may include one or more electric components to replace traditional hydraulic components, such as hydraulic actuators. Hydraulic actuators use hydraulic fluid, which is prone to leaking and environmentally harmful. Therefore, electric components are desirable. Furthermore, hydraulic components require a system to pressurize and distribute the hydraulic fluid requiring excess hosing, pumps and reservoirs, making them more complex and difficult to service. Electric components, such as an electric motor, are easily serviceable and modular such that they can be readily swapped for one another, decreasing maintenance cost and complexity. The electric tailgate may include electronic locking mechanisms to lock and unlock the tailgate without the need for an operator to manually engage a locking mechanism. Alternatively or additionally, the electric tailgate may include one or more electric components coupled to, or integrated with, traditional components, such as a hydraulic actuator. For example, an electric tailgate may include an electronically controlled hydraulic pump swash plate as a throttling element for a hydraulic system.

The refuse vehicle can include a body, a chassis, and a tailgate. The body can include or define an inner or storage volume for storing, loading, and unloading of refuse. The tailgate may be hingedly coupled (e.g., at a top rearmost edge of the body, along a vertical axis that extends along a vertical member of the body) with the body, or translatable relative to the body. The tailgate is transitionable between a first position (e.g., a sealed position, a closed position) to prevent or limit access to the storage volume of the body and a second position (e.g., an open position, an access position, etc.) to allow or facilitate access to the storage volume of the body (e.g., through a rear opening in the body). Various fully or hybrid electric systems for transitioning the tailgate between the first position/state and the second position/state are described herein.

The refuse vehicle can also include a locking system for preventing movement, rotation, pivoting, translation, etc., of the tailgate relative to the body. The locking system may be transitionable (e.g., manually, through operation of one or more electric motors, linear electric actuators, or other electrical devices) between a disengaged or an unlocked state and an engaged or locked state. When the locking system is transitioned into the locked state, movement of the tailgate may be limited. For example, the locking system may limit or prevent the tailgate from transitioning out of the first position and into the second position. Various locking systems, apparatuses, assemblies, mechanisms, etc., are described herein.

Overall Vehicle

As shown in FIG. 1, a vehicle, shown as refuse vehicle 10 (e.g., a garbage truck, a waste collection truck, a sanitation truck, a recycling truck, etc.), is configured as a front-loading refuse truck. In other embodiments, the refuse vehicle 10 is configured as a side-loading refuse truck or a rear-loading refuse truck. In still other embodiments, the vehicle is another type of vehicle (e.g., a skid-loader, a telehandler, a plow truck, a boom lift, etc.). As shown in FIG. 1, the refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the refuse vehicle 10 by an operator (e.g., a seat, a steering wheel, actuator controls, a user interface, switches, buttons, dials, etc.).

As shown in FIG. 1, the refuse vehicle 10 includes a prime mover, shown as electric motor 18, and an energy system, shown as energy storage and/or generation system 20. In other embodiments, the prime mover is or includes an internal combustion engine. According to the exemplary embodiment shown in FIG. 1, the electric motor 18 is coupled to the frame 12 at a position beneath the cab 16. The electric motor 18 is configured to provide power to a plurality of tractive elements, shown as wheels 22 (e.g., via a drive shaft, axles, etc.). In other embodiments, the electric motor 18 is otherwise positioned and/or the refuse vehicle 10 includes a plurality of electric motors to facilitate independently driving one or more of the wheels 22. In still other embodiments, the electric motor 18 or a secondary electric motor is coupled to and configured to drive a hydraulic system that powers hydraulic actuators. According to the exemplary embodiment shown in FIG. 1, the energy storage and/or generation system 20 is coupled to the frame 12 beneath the body 14. In other embodiments, the energy storage and/or generation system 20 is otherwise positioned (e.g., within a tailgate of the refuse vehicle 10, beneath the cab 16, along the top of the body 14, within the body 14, etc.).

According to an exemplary embodiment, the energy storage and/or generation system 20 is configured to (a) receive, generate, and/or store power and (b) provide electric power to (i) the electric motor 18 to drive the wheels 22, (ii) electric actuators of the refuse vehicle 10 to facilitate operation thereof (e.g., lift actuators, tailgate actuators, packer actuators, grabber actuators, etc.), and/or (iii) other electrically operated accessories of the refuse vehicle 10 (e.g., displays, lights, etc.). The energy storage and/or generation system 20 may include one or more rechargeable batteries (e.g., lithium-ion batteries, nickel-metal hydride batteries, lithium-ion polymer batteries, lead-acid batteries, nickel-cadmium batteries, etc.), capacitors, solar cells, generators, power buses, etc. In one embodiment, the refuse vehicle 10 is a completely electric refuse vehicle. In other embodiments, the refuse vehicle 10 includes an internal combustion generator that utilizes one or more fuels (e.g., gasoline, diesel, propane, natural gas, hydrogen, etc.) to generate electricity to charge the energy storage and/or generation system 20, power the electric motor 18, power the electric actuators, and/or power the other electrically operated accessories (e.g., a hybrid refuse vehicle, etc.). For example, the refuse vehicle 10 may have an internal combustion engine augmented by the electric motor 18 to cooperatively provide power to the wheels 22. The energy storage and/or generation system 20 may thereby be charged via an on-board generator (e.g., an internal combustion generator, a solar panel system, etc.), from an external power source (e.g., overhead power lines, mains power source through a charging input, etc.), and/or via a power regenerative braking system, and provide power to the electrically operated systems of the refuse vehicle 10. In some embodiments, the energy storage and/or generation system 20 includes a heat management system (e.g., liquid cooling, heat exchanger, air cooling, etc.).

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 includes a plurality of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted (e.g., by a packer system, etc.). The refuse compartment 30 may provide temporary storage for refuse during transport to a waste disposal site and/or a recycling facility. In some embodiments, at least a portion of the body 14 and the refuse compartment 30 extend above or in front of the cab 16. According to the embodiment shown in FIG. 1, the body 14 and the refuse compartment 30 are positioned behind the cab 16. In some embodiments, the refuse compartment 30 includes a hopper volume and a storage volume. Refuse may be initially loaded into the hopper volume and thereafter compacted into the storage volume. According to an exemplary embodiment, the hopper volume is positioned between the storage volume and the cab 16 (e.g., refuse is loaded into a position of the refuse compartment 30 behind the cab 16 and stored in a position further toward the rear of the refuse compartment 30, a front-loading refuse vehicle, a side-loading refuse vehicle, etc.). In other embodiments, the storage volume is positioned between the hopper volume and the cab 16 (e.g., a rear-loading refuse vehicle, etc.).

As shown in FIG. 1, the refuse vehicle 10 includes a lift mechanism/system (e.g., a front-loading lift assembly, etc.), shown as lift assembly 40, coupled to the front end of the body 14. In other embodiments, the lift assembly 40 extends rearward of the body 14 (e.g., a rear-loading refuse vehicle, etc.). In still other embodiments, the lift assembly 40 extends from a side of the body 14 (e.g., a side-loading refuse vehicle, etc.). As shown in FIG. 1, the lift assembly 40 is configured to engage a container (e.g., a residential trash receptacle, a commercial trash receptacle, a container having a robotic grabber arm, etc.), shown as refuse container 60. The lift assembly 40 may include various actuators (e.g., electric actuators, hydraulic actuators, pneumatic actuators, etc.) to facilitate engaging the refuse container 60, lifting the refuse container 60, and tipping refuse out of the refuse container 60 into the hopper volume of the refuse compartment 30 through an opening in the cover 36 or through the tailgate 34. The lift assembly 40 may thereafter return the empty refuse container 60 to the ground. According to an exemplary embodiment, a door, shown as top door 38, is movably coupled along the cover 36 to seal the opening thereby preventing refuse from escaping the refuse compartment 30 (e.g., due to wind, bumps in the road, etc.).

The tailgate 34 may be configured to transition between a first position, a closed position, a sealed position, etc., (e.g., a first state or first position as shown in FIG. 1) and a second position, an open position, an open position, an open state, an open configuration, etc. (e.g., as shown in FIG. 4C). The tailgate 34 can be operated to transition between the first position and the second position using any of multiple driving mechanisms, assembles, apparatuses, etc., as described herein. In some embodiments, the driving mechanisms for transitioning the tailgate 34 between the first position and the second position are fully electric systems (e.g., including various linear electric actuators, electric motors, gearing assemblies, etc.). In other embodiments, the driving mechanisms for transitioning the tailgate 34 between the first position and the second position are hybrid systems including one or more primary electric movers (e.g., linear electric actuators, electric motors), and other motive systems that operate based on a different principle (e.g., a different source of energy, such as hydraulic, pneumatic, mechanical, etc.). In some embodiments, the tailgate 34 is transitionable between the first position and the second position by pivoting relative to refuse compartment 30. When the tailgate 34 is in the first position, the refuse compartment 30 may be accessed, while when the tailgate 34 is in the second position, access to the refuse compartment 30 may be restricted, prevented, or limited. For example, the tailgate 34 can be hingedly coupled at a top portion, a bottom portion, a right portion, a left portion, etc., of refuse compartment 30 and may pivot or rotate relative to the hinged coupling to facilitate selective access to refuse compartment 30. In some embodiments, the tailgate 34 is transitionable between the first position and the second position in response to a user input (e.g., a user request) that is provided by an operator via a human machine interface (HMI) on refuse vehicle 10.

Tailgate

Figure 2:
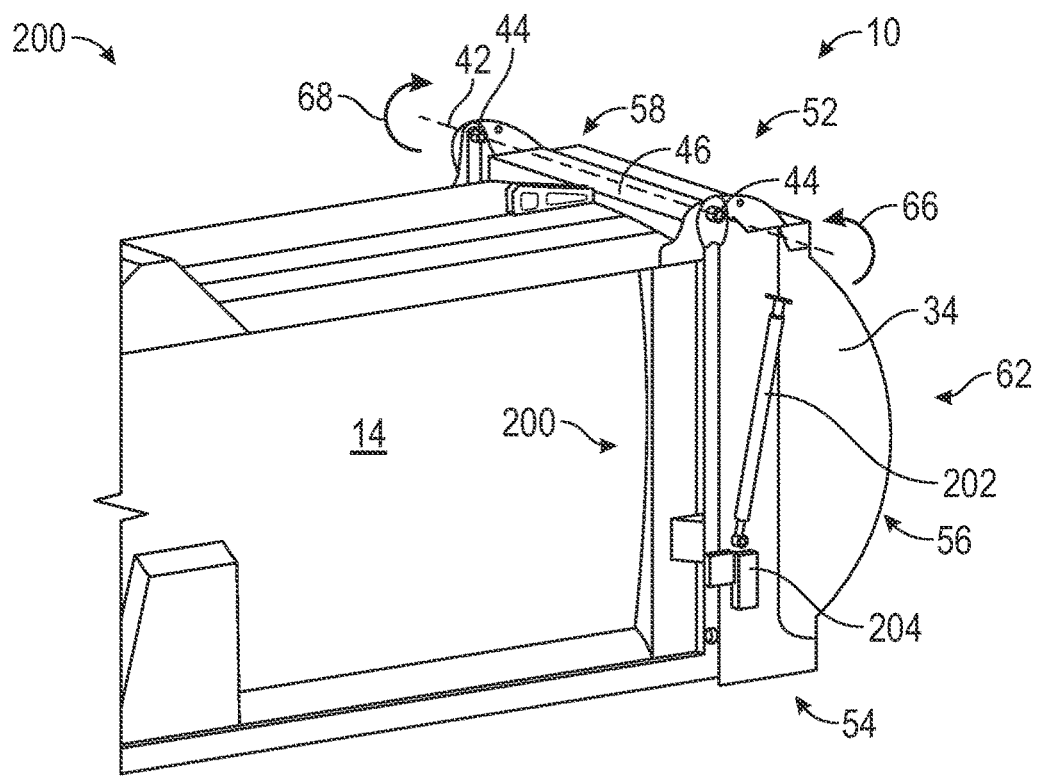
FIG. 2 is a tailgate of the refuse vehicle of FIG. 1 having an electric mechanism for transitioning a tailgate between a first position and a second position, according to an exemplary embodiment.

Referring particularly to FIG. 2, tailgate 34 can be rotatably or pivotally coupled with refuse compartment 30 or body 14 at an upper edge or upper portion 46 of body 14. Tailgate 34 may be rotatably or pivotally coupled with refuse compartment 30 through hinges 44. Hinges 44 can be positioned at opposite lateral ends of body 14.

Body 14 may define or include a top side 52, a bottom side 54, a left side 56, a right side 58, and a rear 62 of refuse vehicle 10. Tailgate 34 is pivotally coupled with body 14 at a rearwards position relative to body 14. In some embodiments, left side 56 is a left lateral side of refuse vehicle 10 and right side 58 is a right lateral side of refuse vehicle 10. Rear 62 of refuse vehicle 10 or body 14 may be a rear longitudinal end. Likewise, refuse vehicle 10 includes a front 64 that may be a front longitudinal end of refuse vehicle 10 (shown in FIG. 1).

Hinges 44 can be positioned at opposite lateral sides or ends of body 14 along upper portion 46 of body 14. For example, a first hinge 44 may be positioned at right side 58 of body 14, while a second hinge 44 can be positioned at left side 56 of body 14. Hinges 44 can pivotally couple body 14 with tailgate 34 and may define an axis 42 extending therethrough. In some embodiments, axis 42 extends in a lateral direction. In some embodiments, axis 42 is parallel with upper portion 46 of body 14. Tailgate 34 may be driven to pivot or rotate about axis 42 relative to body 14 in direction 66 to transition from the first position (as shown in FIG. 2) to the second position (to facilitate access to refuse compartment 30 or an inner volume of body 14. After tailgate 34 has been transitioned out of the first position into the second position, tailgate 34 can be re-transitioned into the first position from the second position by rotation or pivoting of tailgate 34 about axis 42 in a direction 68 that is opposite direction 66.

Tailgate with Electric Linear Actuators

Referring still to FIG. 2, the tailgate 34 of the refuse vehicle 10 can include an electric apparatus, assembly, drive assembly, a tailgate actuator assembly, a fully electric tailgate actuator assembly, etc., shown as electric apparatus 200. Electric apparatus 200 includes an electric device, shown as electric actuator 202, to facilitate movement, rotation, pivoting, swinging, etc., of the tailgate 34 about axis 42. In some embodiments, the tailgate 34 includes a number of the electric actuators 202 to facilitate movement of the tailgate 34 in one or more directions (e.g., in direction 66 and/or direction 68) at a variety of speeds (e.g., a constant angular speed, a non-constant angular speed, etc.). In some embodiments, the electric actuator 202 is a different electric device (e.g., motor, solenoid, etc.). For example, the electric actuator 202 may be ball screw driven by an electric motor.

In some embodiments, the electric actuator 202 is replaced or augmented by an electric device (e.g., an electric motor) producing a rotational force instead of a linear force. In some embodiments, the tailgate 34 includes an eccentric gearbox driven by an electric motor to facilitate movement of the tailgate 34. For example, the electric actuator 202 could be an electric motor integrated with the axis 42 and configured to generate a rotational force (e.g., a torque) to facilitate opening of the tailgate 34. In some embodiments, the electric actuator is coupled to, or integrated with, a mechanical element. For example, the electric actuator 202 may be paired with a torsional spring to assist in opening the tailgate 34, similar to opening a garage door. Pairing the electric actuator 202 with one or more mechanical elements may reduce the "breakaway torque," or the torque required by the electric actuator 202 to begin moving the tailgate 34 or other component. Additionally or alternatively, the tailgate 34 may include one or more electric components coupled to or integrated with traditional components of refuse vehicle 10. For example, an electrically controlled hydraulic swash plate could be coupled to one or more electronic sensors to throttle the flow of hydraulic fluid in a hydraulic system.

In some embodiments, the axis 42 is a horizontal axis located substantially at the rearward top edge of the refuse compartment 30 such that the tailgate 34 opens similarly to a hatch-type door. In some embodiments, such as the embodiment described below with reference to FIG. 5, the axis 42 is located elsewhere. The axis 42 may be or include one or more mechanical bearings, for example a hinge. In some embodiments, the axis 42 couples the tailgate 34 to the body 14 via one or more removable elements, such as a removable pin. The removable element may allow the tailgate 34 to be removed from the body 14 and/or replaced by another tailgate. For example, the tailgate 34 may include one or more battery systems (e.g., energy storage and/or generation system 20) that may be replaced when the battery system is depleted by swapping the tailgate for a different tailgate having a charged battery system.

In some embodiments, the tailgate 34 includes one or more additional electric components. For example, the tailgate 34 may include one or more electric locks as described in detail with reference to FIG. 3. Additionally or alternatively, the tailgate 34 may include one or more electric packing mechanisms. For example, the tailgate 34 may include an electrically driven pendulum packer. A rack may be coupled to the base of a pendulum packer and be driven by an electric motor coupled to a sun gear received by the rack. The electric motor may impart potential energy on the pendulum packer by lifting/rotating the pendulum packer into a raised position (e.g., by driving the sun gear). The pendulum packer may freely pivot/fall from the raised position thereby converting the potential energy into kinetic energy used to compress refuse. In some embodiments, compression of the pendulum packer is provided in whole or in part by an electric device (e.g., an electric motor). For example, an electric motor may drive the pendulum packer through a series of gears to provide a large compressive force. In some embodiments, the tailgate 34 includes a linear electric packing mechanism. For example, one or more gear racks may couple to an inside surface of the refuse compartment 30 and receive a pinion gear coupled to an electric device (e.g., a motor) of the tailgate 34 configured to translate a packer component horizontally across the refuse compartment 30 thereby packing the refuse therein.

In some embodiments, the tailgate 34 includes one or more electric components to facilitate ejection of refuse from the refuse compartment 30. For example, one or more gear racks may couple to a surface of the refuse compartment 30 and/or tailgate 34 to receive one or more electrically driven pinion gears to translate an ejector component of the refuse compartment 30 to enable ejection of refuse. In some embodiments, one or more gear racks may couple to the bottom of the refuse compartment 30 while in other embodiments the one or more gear racks may couple to the sides of the refuse compartment 30 (e.g. to the body 14). Alternatively or additionally, one or more gear racks may couple to an ejector component and be driven by an electric device coupled to the body 14 of refuse vehicle 10.

Figure 4A:
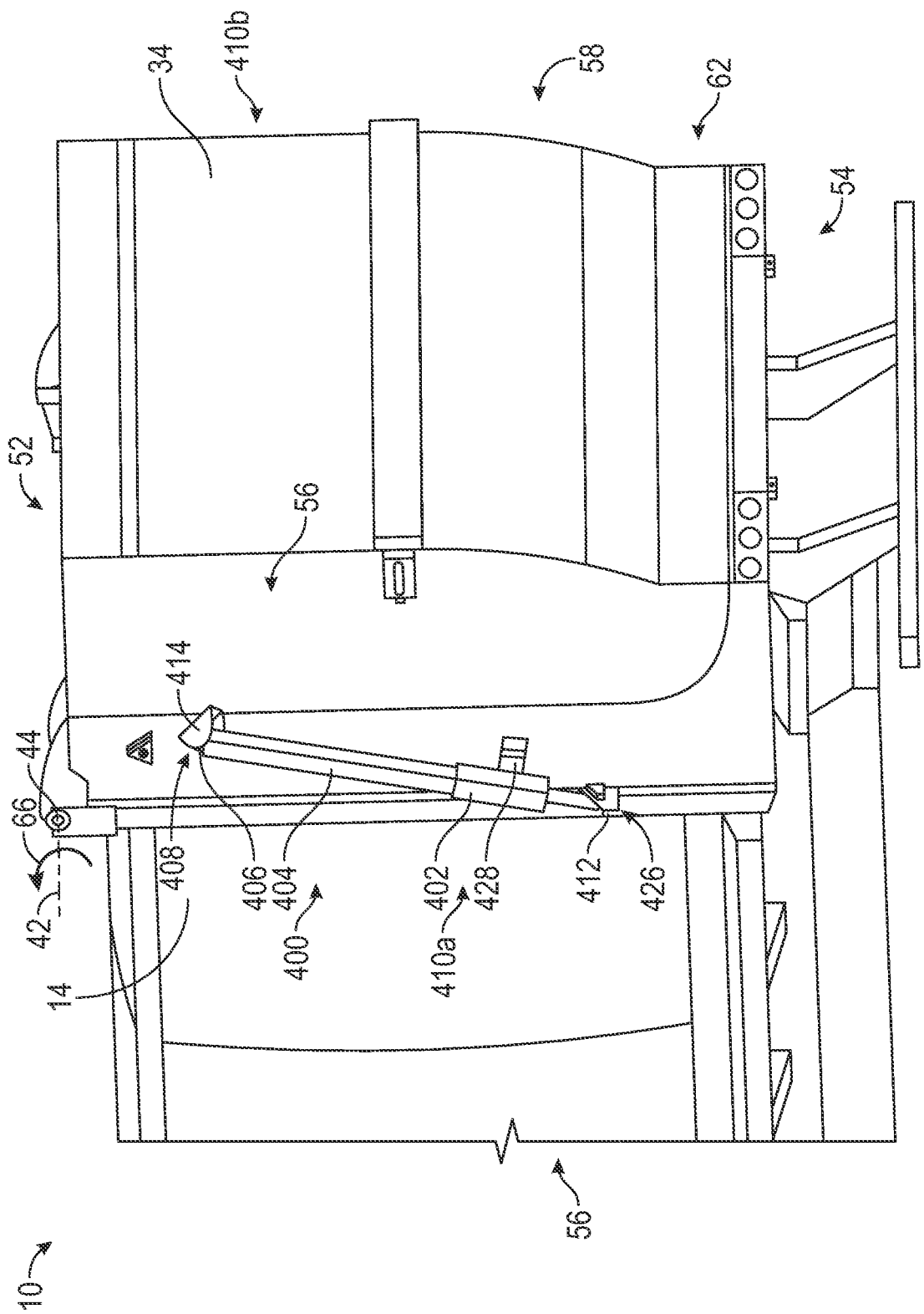
FIG. 4A is a perspective view of a portion of the refuse vehicle of FIG. 1 including side-mounted electric actuators for transitioning the tailgate between the first position and the second position, according to an exemplary embodiment.
Figure 4B:
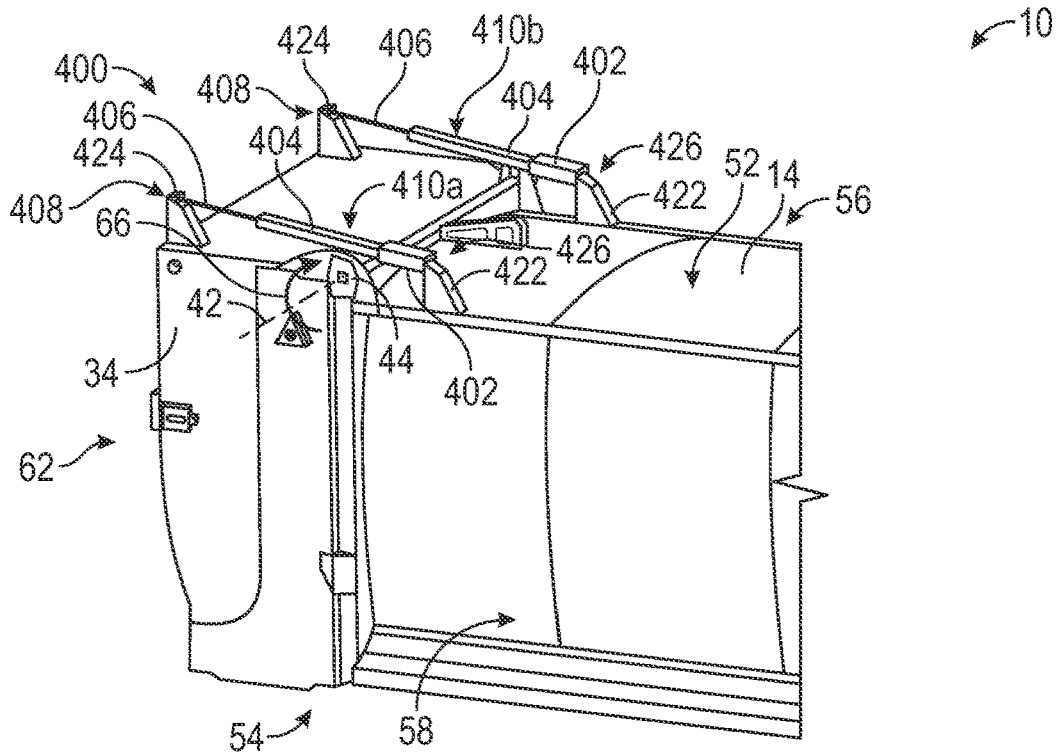
FIG. 4B is a perspective view of a portion of the refuse vehicle of FIG. 1 including top-mounted electric actuators for transitioning the tailgate between the first position and the second position when the tailgate is in the first position, according to an exemplary embodiment.
Figure 4C:
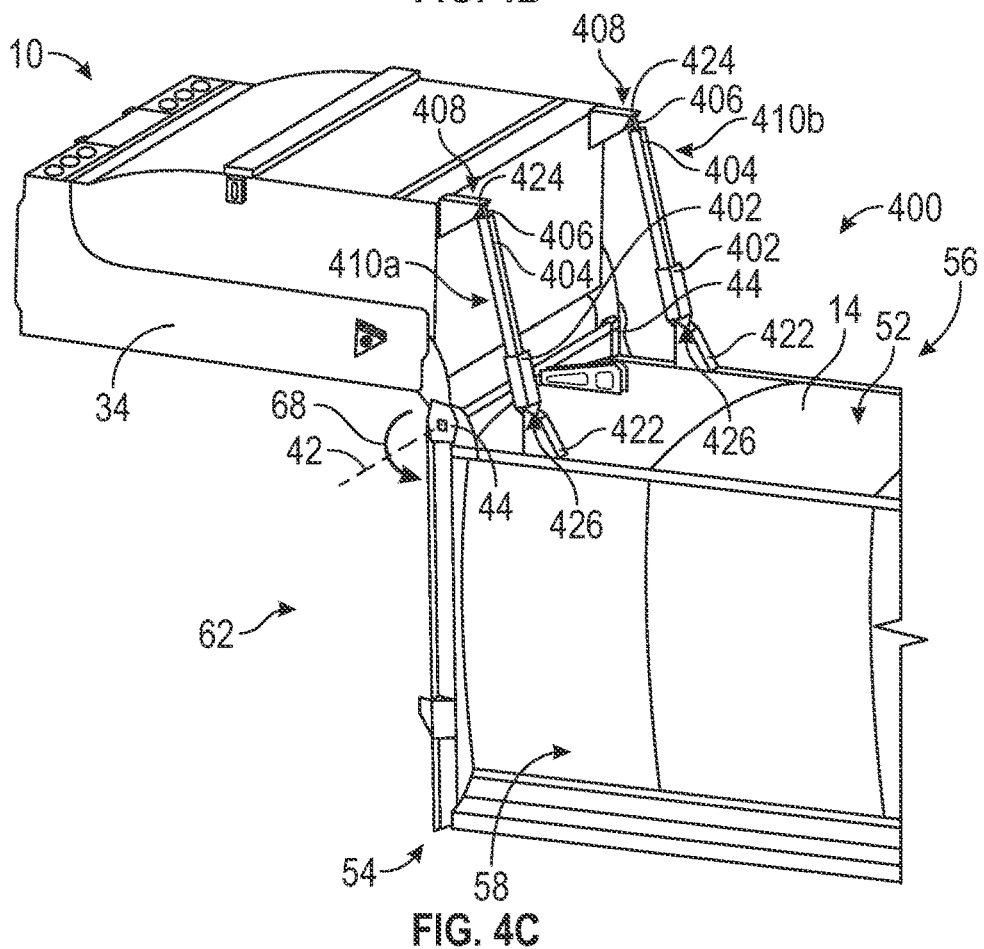
FIG. 4C is a perspective view of a portion of the refuse vehicle of FIG. 4B including the top-mounted electric actuators when the tailgate is in the second position, according to an exemplary embodiment.

Referring particularly to FIGS. 4A-4C, various embodiments of an electric lift mechanism 400 (e.g., a fully electric tailgate actuator assembly) are shown. Electric lift mechanism 400 is configured to drive, rotate, move, pivot, etc., tailgate 34 of refuse vehicle 10 about axis 42 to transition the tailgate 34 between the first position (shown in FIG. 4A) and the second position (shown in FIG. 4C). Advantageously, electric lift mechanism 400 may use electrical energy to facilitate an efficient, robust, and environmentally friendly apparatus to transition tailgate 34 between the first position and the second position.

Referring particularly to FIGS. 4A-4C, electric lift mechanism 400 includes a pair of linear electric actuators 410 (e.g., linear electric actuator 410a and linear electric actuator 410b). Linear electric actuators 410 can be configured to consume electrical energy (e.g., as provided by the energy storage and/or generation system 20 of refuse vehicle 10) to output translational motion or a translational force (e.g., to extend or retract). Linear electric actuators 410 can include an outer member 404 and an inner member 406. Outer member 404 can be configured to receive the inner member 406 so that inner member 406 translates (e.g., extends or retracts) relative to outer member 404. Linear electric actuators 410 each include an electric motor 402 that is configured to drive inner member 406 to translate in a first direction (e.g., to extend linear electric actuator 410) or in a second direction (e.g., to retract linear electric actuator 410) relative to outer member 404. Linear electric actuators 410 each include a first end 408 and a second end 426. In some embodiments, first end 408 of linear electric actuator 410 is a distal end of inner member 406.

Referring particularly to FIG. 4A, linear electric actuators 410 can be positioned on opposite lateral sides of refuse vehicle 10. For example, a first linear electric actuator 410a is positioned on left side 56 of refuse vehicle 10, while a second linear electric actuator 410b is positioned on right side 58 of refuse vehicle 10. First linear electric actuator 410a is configured to pivotally or rotatably couple with left side 56 of body 14 at second end 426 and pivotally or rotatably couple with left side 56 of tailgate 34 at first end 408. Likewise, second linear electric actuator 410b is configured to pivotally or rotatably couple with right side 58 of body 14 at second end 426 and pivotally or rotatably couple with right side 58 of tailgate 34 at first end 408.

Body 14 can include a mount 412 that is configured to rotatably or pivotally couple with second end 426 of first linear electric actuator 410a. Mount 412 can be positioned along a frame member of body 14 on the left side 56 of body 14, proximate bottom side 54 of body 14. Tailgate 34 includes a mount 414 that is configured to pivotally or rotatably couple with first end 408 of linear electric actuator 410a. In some embodiments, mount 414 is positioned on left side 56 of tailgate 34 proximate top side 52 of tailgate 34. It should be understood that second linear electric actuator 410b can be similarly configured on right side 58 of refuse vehicle 10 and may include corresponding and symmetrically positioned/configured mounts 412 and 414.

First linear electric actuator 410a and second linear electric actuator 410b can operate in unison to extend or retract to drive tailgate 34 to pivot about axis 42. For example, first linear electric actuator 410a and second linear electric actuator 410b can operate in unison to extend to drive tailgate 34 to pivot about axis 42 in direction 66 to transition tailgate 34 out of the first position and into the second position. Once tailgate 34 is transitioned into the second position, first linear electric actuator 410a and second linear electric actuator 410b can maintain a current degree of extension to maintain tailgate 34 in the second position. Tailgate 34 can be transitioned out of the second position and into the first position by operation of first linear electric actuator 410a and second linear electric actuator 410b to retract. Retraction of first linear electric actuator 410a and second linear electric actuator 410b (e.g., in unison) drives tailgate 34 to rotate or pivot about axis 42 relative to body 14 in direction 68.

First linear electric actuator 410a and second linear electric actuator 410b can each include a brake 428. In some embodiments, brake 428 is an electrically actuated brake that is configured to transition between a locked position and an unlocked position. When brake 428 is transitioned into the locked position, brake 428 may engage a mechanism of the corresponding linear electric actuator 410 to prevent or limit translation of inner member 406 relative to outer member 404 or to otherwise lock linear electric actuator 410 at a current degree of extension or retraction.

First linear electric actuator 410a and second linear electric actuator 410b can be electrically driven ball-screw actuators, including a ball screw mechanism that is configured to receive rotational kinetic energy from electric motor 402 and transfer the rotational kinetic energy received from electric motor 402 to translational motion between inner member 406 and outer member 404. In some embodiments, brake 428 is configured to transition into the locked position to engage the ball screw mechanism to lock linear electric actuator 410 at a current degree of extension or retraction (e.g., to limit extension or retraction of linear electric actuator 410).

Referring particularly to FIGS. 4B-4C, first linear electric actuator 410a and second linear electric actuator 410b can be positioned on top side 52 of refuse vehicle 10. For example, body 14 can include mounts 422 that extend, protrude, etc., from top side 52 of refuse vehicle 10. Mounts 422 can be configured to receive and pivotally or rotatably couple with second ends 426 of linear electric actuators 410. Mounts 422 may be positioned on top side 52 of body 14 at left side 56 and ride side 58 of body 14. Tailgate 34 includes mounts 424 that extend from top side 52 of tailgate 34. Mounts 424 are each configured to receive and pivotally couple with the distal end of a corresponding one of inner members 406. In some embodiments, mounts 424 pivotally or rotatably couple with first ends 408 of linear electric actuators 410.

First linear electric actuator 410a and second linear electric actuator 410b can be configured to retract (e.g., in unison) to drive tailgate 34 to pivot about axis 42 (e.g., in direction 66) to thereby transition tailgate 34 out of the first position (shown in FIG. 4B) to the second position (shown in FIG. 4C). First linear electric actuator 410a and second linear electric actuator 410b can be configured to extend (e.g., in unison) to drive tailgate 34 to pivot about axis 42 (e.g., in direction 68) to transition tailgate 34 out of the second position (shown in FIG. 4C) to the first position (shown in FIG. 4B). First linear electric actuator 410a and second linear electric actuator 410b can include brake 428 that is configured to limit extension/retraction of first linear electric actuator 410a and second linear electric actuator 410b, and thereby limit rotation of tailgate 34 about axis 42.

In some embodiments, any of the linear electric actuators described herein (e.g., linear electric actuators 410, electric actuators 202, etc.) may be replaced with hydraulic actuators (e.g., hydraulic linear actuators). The hydraulic actuators may receive pressurized hydraulic fluid to operate to extend or retract. The hydraulic fluid can be pressurized by a pump that is driven by one or more electric motors. In this way, the tailgate 34 may be configured to be transitioned between the first position and the second position using a hydraulic-electric hybrid system.

Cable Lift

Figure 5A:
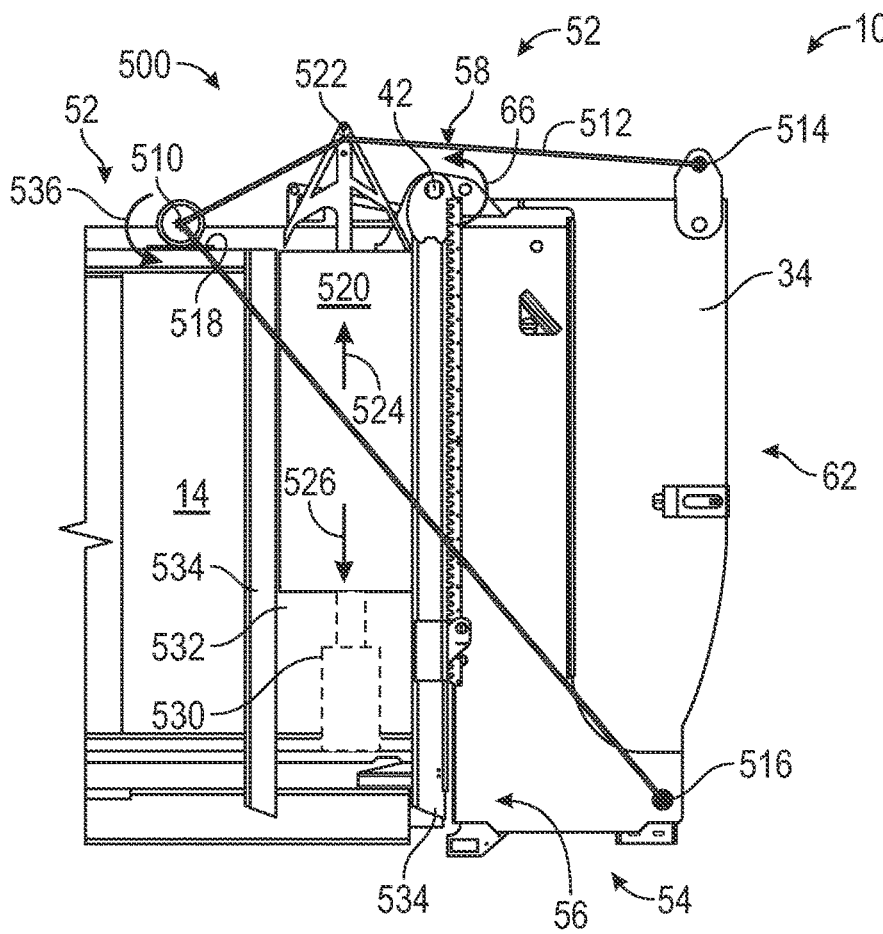
FIG. 5A is a side view of a portion of the refuse vehicle of FIG. 1 including a cable lift mechanism with a telescoping pulley to transition the tailgate between the first position and the second position when the tailgate is in the first position, according to an exemplary embodiment.
Figure 5B:
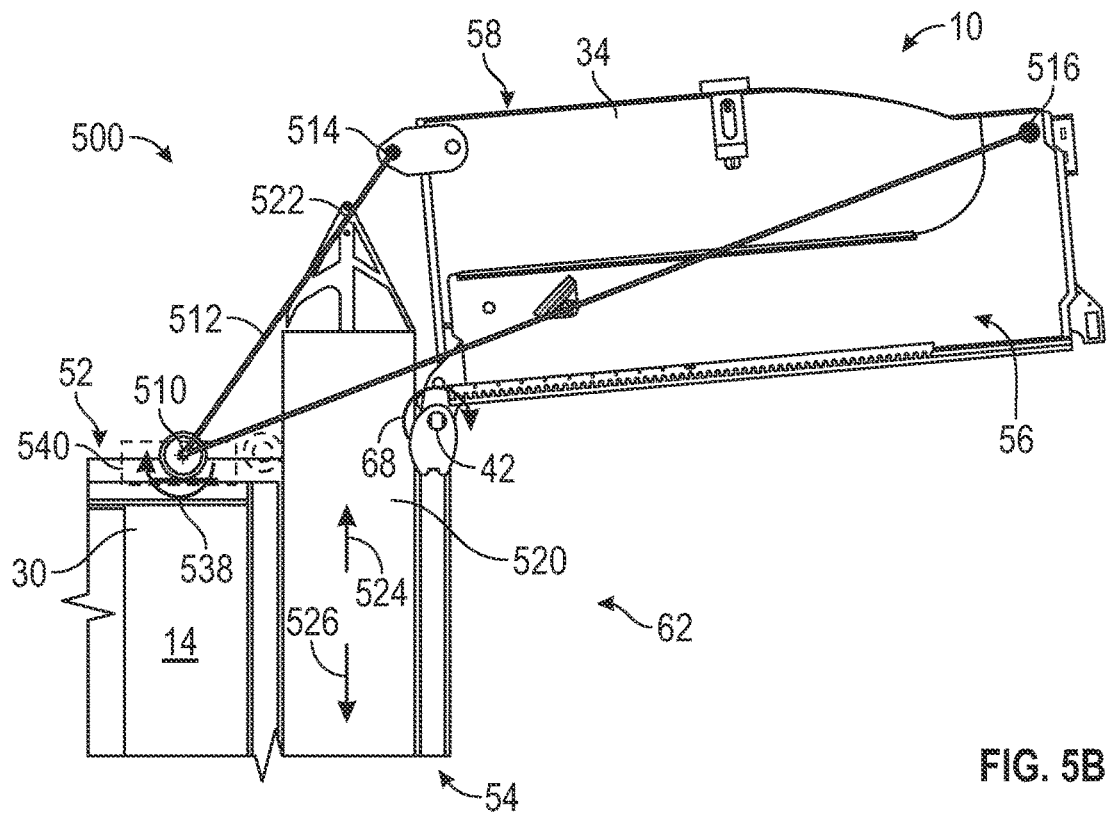
FIG. 5B is a side view of a portion of the refuse vehicle of FIG. 5A including the cable lift mechanism when the tailgate is in the second position, according to an exemplary embodiment.

Referring particularly to FIGS. 5A-5B, tailgate 34 may be configured to be driven to pivot or rotate about axis 42 (e.g., between the first position shown in FIG. 5A and the second position shown in FIG. 5B) by a winch or cable lift mechanism 500 (e.g., a tailgate actuator assembly, a fully electric tailgate actuator assembly, etc.). Cable lift mechanism 500 includes a winch 510, a cable 512, and a slidable member 520. In some embodiments, slidable member 520 is received within a corresponding track, groove, recess, etc., shown as track 532 of body 14. Track 532 may be a vertical track that extends along a side of body 14. In some embodiments, track 532 is defined by a vertical members 534 (e.g., beams, bars, elongated members, I-beams, etc.). Winch 510 may be fixedly coupled or otherwise mounted at a top surface of body 14.

Slidable member 520 can include a body portion that is configured to slidably engage or slidably couple with vertical members 534 of track 532 and an engagement portion 522 (e.g., an extension, a protrusion, etc.) that protrudes from an upper portion of the body portion. Tailgate 34 includes an engagement portion 514 at an upper rear corner of tailgate 34. In some embodiments, engagement portion 514 is positioned at or defines a corner of tailgate 34 that is proximate top side 52 and rear 62 of tailgate 34. Engagement portion 514 can include an aperture, an opening, an eyelet, etc., configured to receive a first end of cable 512. In some embodiments, engagement portion 514 extends outwards or upwards from an upper surface of tailgate 34.

Tailgate 34 also includes a bottom receiving portion 516. Receiving portion 516 can be or include a post, a protrusion, a hook, an eyelet, an aperture, an opening, etc., configured to couple with a second or opposite end of cable 512. Cable 512 may couple at second end with receiving portion 516, engage or wrap around winch 510, engage or pass over engagement portion 522, and couple with engagement portion 514 of tailgate 34 at the first end. Receiving portion 516 can be the same as or similar to engagement portion 514. Receiving portion 516 is positioned at a bottom rear corner of tailgate 34 and may be vertically aligned or offset from engagement portion 514. For example, the second end of cable 512 can be coupled with tailgate 34 at a corner of tailgate 34 that is proximate bottom side 54 and rear 62 of tailgate 34.

Winch 510 can be driven to rotate to drive cable 512 to transition tailgate 34 between the first position (shown in FIG. 5A) and the second position (shown in FIG. 5B). Winch 510 can include an electric motor 540 that is configured to drive winch 510 to rotate in direction 536 (e.g., to transition tailgate 34 from the first position shown in FIG. 5A to the second position shown in FIG. 5B) or in direction 538 (e.g., to transition tailgate 34 from the second position shown in FIG. 5B to the first position shown in FIG. 5A).

When winch 510 operates to rotate in direction 536, a tensile or pulling force is applied to engagement portion 514 through portions of cable 512 that extend from winch 510, over engagement portion 522, and to receiving portion 514. The tensile or pulling force results in a moment about axis 42 in direction 66, thereby driving tailgate 34 to rotate in direction 66 about axis 42 (e.g., to transition out of the first position and into the second position). Winch 510 may operate to rotate or be driven to rotate in direction 538 at a controlled speed. For example, weight of tailgate 34 and engagement of cable 512 between winch 510 and tailgate 34 may drive winch 510 to rotate in direction 538. Winch 510 may rotate (e.g., by back-driving motor 540) in direction 538 at a controlled speed to control a rotational speed of tailgate 34 about axis 42 in direction 68.

Referring still to FIGS. 5A and 5B, slidable member 520 may be configured to translate in direction 524 (e.g., upwards) or direction 526 (e.g., downwards) along track 532 to facilitate an improved mechanical advantage or lever arm of winch 510. For example, slidable member 520 can translate in direction 524 (upwards) when winch 510 operates to transition tailgate 34 from the first position to the second position to thereby improve a mechanical advantage of winch 510. Likewise, slidable member 520 can translate in direction 526 when winch 510 operates to transition tailgate 34 from the second position to the first position to thereby improve the mechanical advantage of winch 510.

Slidable member 520 can be independently driven to translate along track 532. For example, slidable member 520 may be driven to translate along track 532 in direction 524 or direction 526 by operation of a linear electric actuator 530. In other embodiments, slidable member 520 is driven to translate in direction 524 or direction 526 through operation of winch 510 (e.g., through a gear set, a rack and pinion, etc.). Advantageously, slidable member 520 improves a mechanical advantage of winch 510 so that efficiency of winch 510 is improved and a smaller or less powerful electric motor can be used to drive winch 510 to transition tailgate 34 between the first position and the second position.

Eccentric Gear Mechanism

Figure 6A:
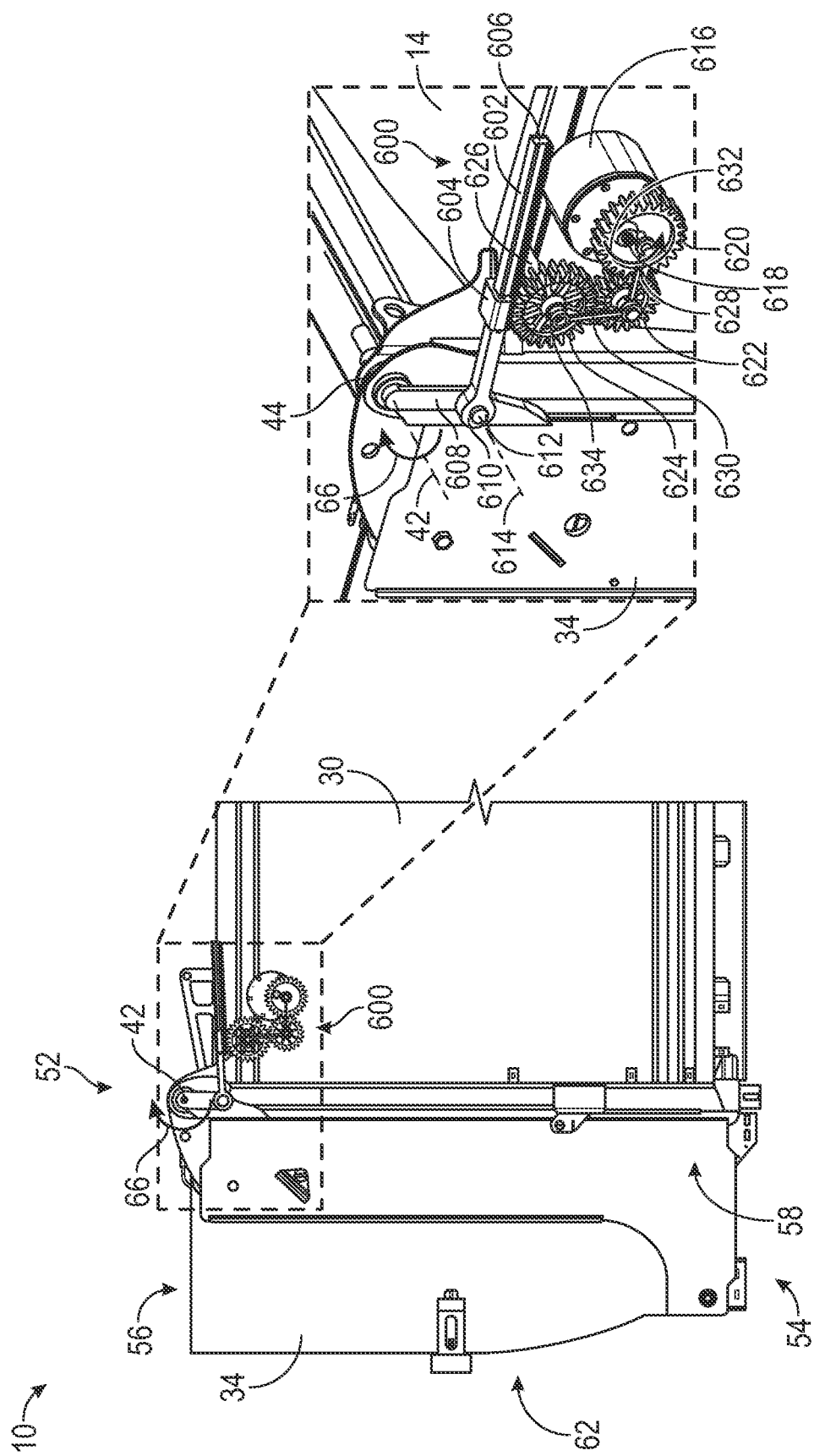
FIG. 6A is a portion of the refuse vehicle of FIG. 1 including an eccentric gearing mechanism to transition the tailgate between the first position and the second position, according to an exemplary embodiment.
Figure 6B:
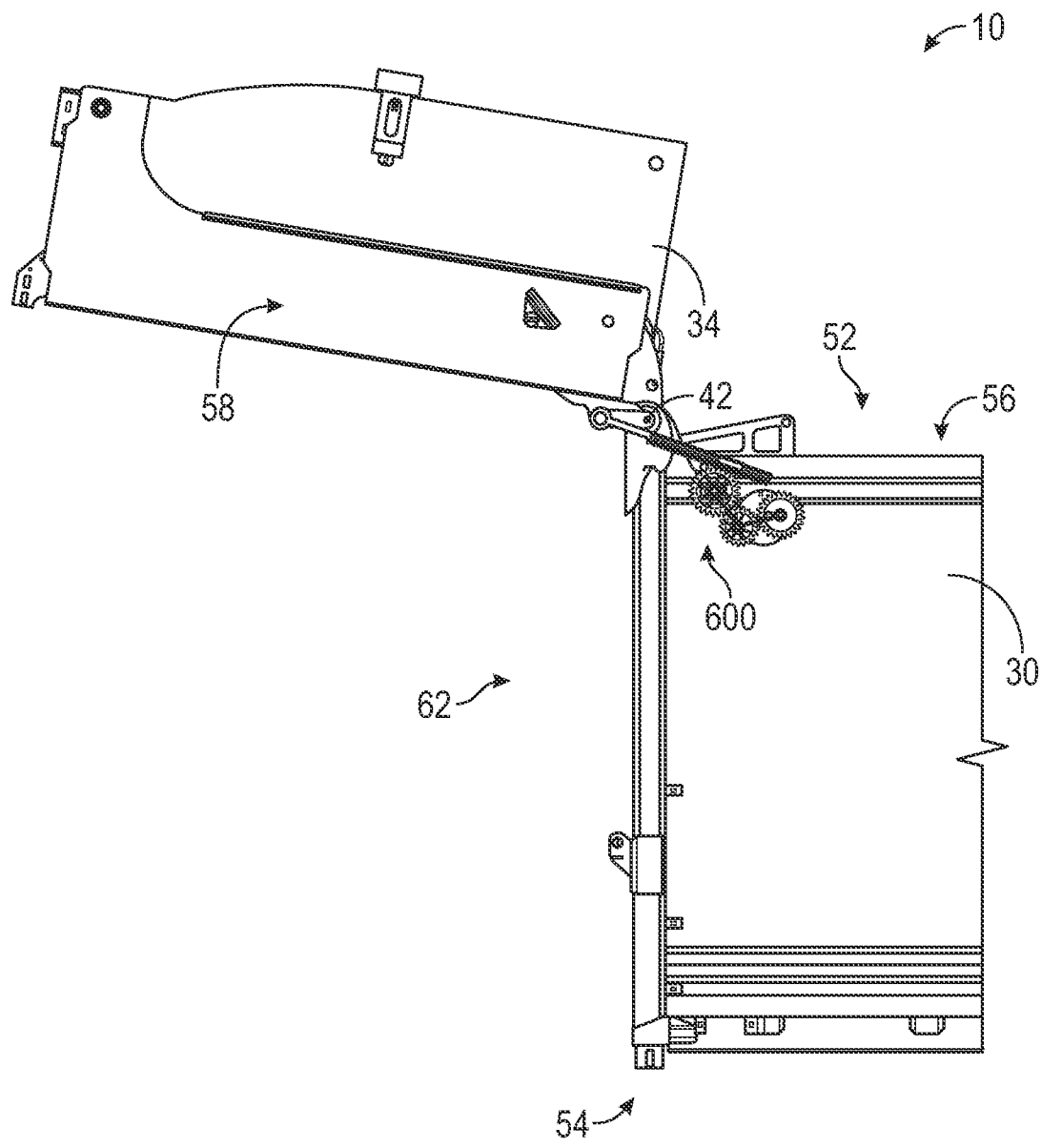
FIG. 6B is a side view of a portion of the refuse vehicle of FIG. 1 including the eccentric gearing mechanism of FIG. 6A when the tailgate is in the second position, according to an exemplary embodiment.

Referring particularly to FIGS. 6A-6B, tailgate 34 may be driven to transition between the first position and the second position by an eccentric gear mechanism 600 (e.g., a tailgate actuator assembly, a fully electric tailgate actuator assembly, etc.). Eccentric gear mechanism 600 includes an electric motor 616, a first gear 620, a second gear 622, a third gear 624, a rack member 602, and a linkage 608. Electric motor 616 is fixedly coupled with body 14 and is configured to output mechanical energy or torque through a driveshaft 618. First gear 620 is rotatably or pivotally coupled with the driveshaft 618 at an off-centered position so that first gear 620 rotates relative to an off-centered position as electric motor 616 operates to drive driveshaft 618.

First gear 620 engages or meshes with second gear 622 so that rotation of first gear 620 about the off-centered position or axis drives second gear 622 to rotate. A relative distance between first gear 620 and second may be constant through a first linkage 628 that extends between a center of first gear 620 and a center of second gear 622. First linkage 628 can be rotatably or pivotally coupled with first gear 620 and second gear 622 at opposite ends so that first linkage 628 is free to rotate or pivot relative to first gear 620 and second gear 622, while maintaining a relative spatial distance between first gear 620 and second gear 622.

Second gear 622 engages or meshes with third gear 624 so that rotation of second gear 622 drives rotation of third gear 624. A second linkage 630 that may be similar to first linkage 628 extends between second gear 622 and third gear 624 and pivotally or rotatably couples at opposite ends with second gear 622 and third gear 624. Second linkage 630 facilitates maintaining a constant relative spatial distance between second gear 622 and third gear 624 as second gear 622 and third gear 624 are driven to rotate.

Third gear 624 engages or meshes with teeth of rack 602 so that rotation of third gear 624 drives translation of rack 602. Rack 602 may be received within a carrier member 626 that includes an engagement portion 604 and a shaft portion 634. Third gear 624 is rotatably or fixedly coupled with shaft portion 634 of carrier member 626. Carrier member 626 includes engagement portion 604 that is configured to engage or slidably couple with tracks 606 of rack 602. In some embodiments, rack 602 is configured to translate or slide relative to carrier member 626. Tracks 606 extend along a length of rack 602 and are configured to receive corresponding protrusions, engagement portions, fingers, etc., of engagement portion 604 of carrier member 626. Carrier member 626 may be spatially fixedly coupled with body 14 and rotatably or pivotally free relative to body 14 so that carrier member 626 rotates about an axis extending through shaft portion 634.

Rack 602 includes an end 610 that is configured to rotatably or pivotally couple with linkage 608. In some embodiments, end 610 includes an opening, bore, or aperture, that is configured to receive a pin 612 of linkage 608. Pin 612 may define an axis 614 about which rack 602 may rotate or pivot as tailgate 34 is driven to rotate about axis 42 between the first position and the second position. Linkage 608 may be fixedly coupled with tailgate 34 and rotatably coupled with hinge element 44 so that translation of rack 602 produces a torque about axis 42 to drive tailgate 34 to rotate about axis 42 between the first position and the second position.

When eccentric gear mechanism 600 operates to transition tailgate 34 out of the first position and into the second position (e.g., to open tailgate 34 or to drive tailgate 34 to pivot about axis 42 relative to body 14 in direction 66), electric motor 616 may drive first gear 620 to rotate about the off-centered position in direction 632 (e.g., in an anti-clockwise direction). Rotation of first gear 620 about the off-centered position in direction 632 drives rotation of second gear 622 in an opposite direction (e.g., a clockwise direction) while second gear 622 may spatially move or rotate relative to first gear 620 (e.g., while maintaining relative spatial distance equal to a length of first linkage 628).

Rotation of second gear 622 in the clockwise direction results in rotation of third gear 624 in an anti-clockwise direction, thereby driving rack 602 to translate. Rack 602 may translate due to the engagement between the teeth of rack 602 and third gear 624. Rack 602 translates to produce a moment about axis 42 in direction 66, thereby driving tailgate 34 to transition out of the first position and into the second position (shown in FIG. 6B). Electric motor may similarly operate in a direction opposite direction 632 to transition tailgate 34 out of the second position (shown in FIG. 6B) to the first position (shown in FIG. 6A).

Geared Hinge

Figure 7A:
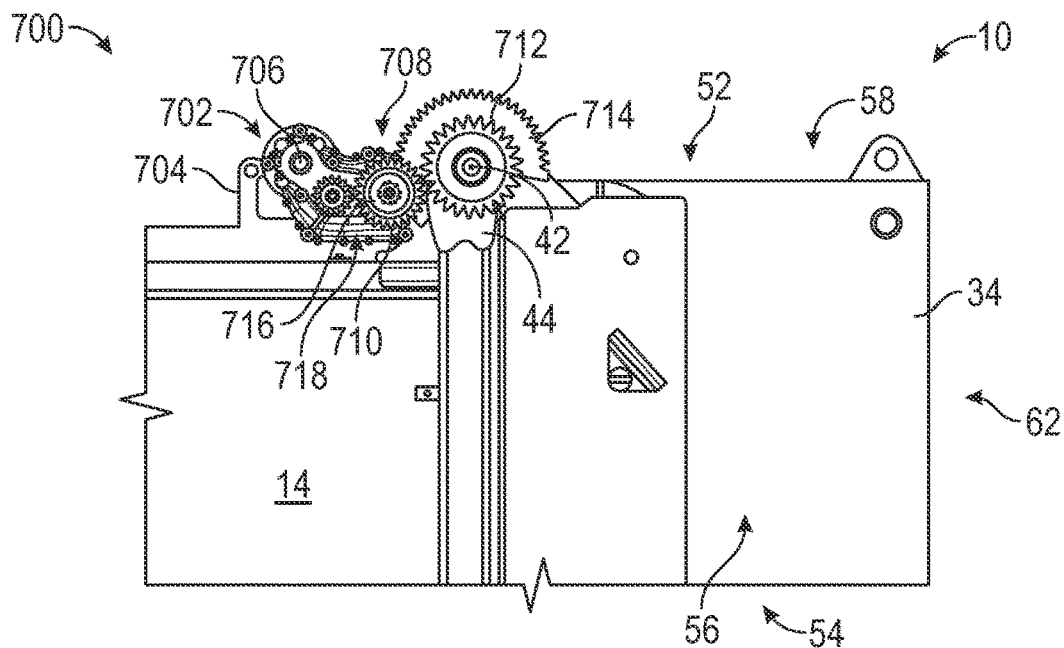
FIG. 7A is a side view of a portion of the refuse vehicle of FIG. 1 including a powered hinge mechanism when the tailgate is in the first position, according to an exemplary embodiment.
Figure 7B:
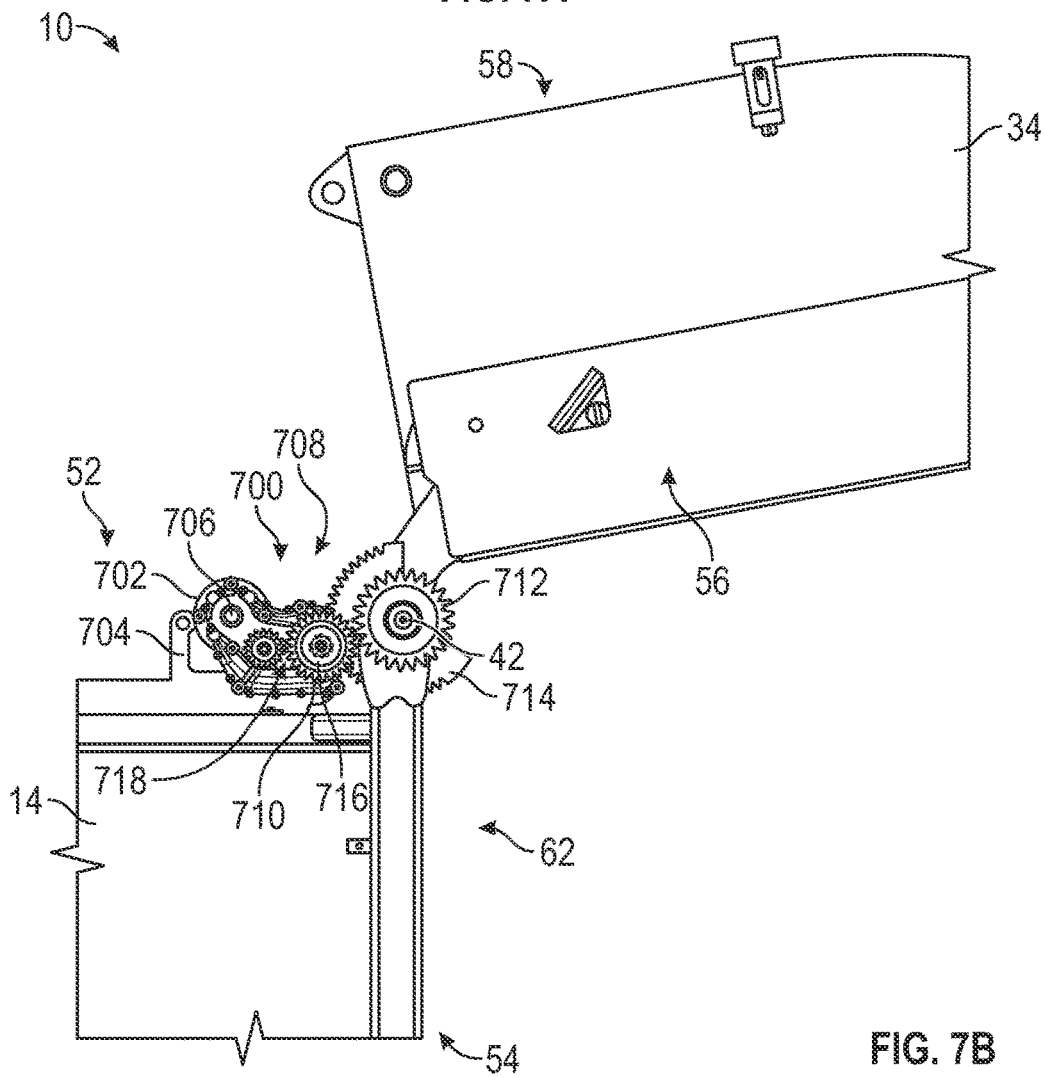
FIG. 7B is a side view of a portion of the refuse vehicle of FIG. 1 including the powered hinge mechanism of FIG. 7A when the tailgate is in the second position, according to an exemplary embodiment.

Referring particularly to FIGS. 7A and 7B, refuse vehicle 10 can include a geared hinge mechanism 700 (e.g., a tailgate actuator assembly, a fully electric tailgate actuator assembly, etc.) that is configured to operate to transition the tailgate 34 between the first position (e.g., shown in FIG. 7A) and the second position (shown in FIG. 7B). Geared hinge mechanism 700 includes an electric motor 702 that is configured to output torque to tailgate 34 to transition tailgate 34 between the first position (shown in FIG. 7A) and the second position (shown in FIG. 7B) through a gearbox 708. In some embodiments, geared hinge mechanism 700 includes a segment gear 714 that is fixedly coupled with tailgate 34 so that tailgate 34 and segment gear 714 rotate in unison about axis 42.

Electric motor 702 can output torque through a driveshaft 706. Electric motor 702 drives an output gear 710 (e.g., a spur gear) that engages, meshes, or otherwise drives a driven gear 712. Driven gear 712 can be fixedly coupled with tailgate 34 and may be centered at axis 42 of hinge element 44. Geared hinge mechanism 700 can be fixedly coupled with a top surface, a top panel, etc., of body 14. In some embodiments, geared hinge mechanism 700 is fixedly coupled with body 14 at top side 52 of body 14 through a bracket 704. Bracket 704 may provide structural support between electric motor 702 and body 14 so that electric motor 702 exerts a torque on tailgate 34 to drive tailgate 34 to rotate about axis 42 (e.g., to transition tailgate 34 between the first position and the second position).

Output gear 710 may be rotatably coupled with a body or structural member of geared hinge mechanism 700. In some embodiments, output gear 710 and driven gear 712 are spur gears with load bearing capabilities or structural strength to drive tailgate 34 to transition between the first position shown in FIG. 7A and the second position shown in FIG. 7B.

Segment gear 714 may be a load bearing gear that is configured to receive output torque from electric motor 702 to transition tailgate 34 between the first position and the second position, or may be a follower gear that is configured to rotate with tailgate 34 and drive a sensor, shown as rotary potentiometer 716. In some embodiments, segment gear 714 is a spur gear including teeth along only a portion of an outer periphery. In some embodiments, the teeth of segment gear 714 are finer than teeth of gears 710 and 712. Segment gear 714 can also have a pitch diameter that is greater than output gear 710 or driven gear 712. Segment gear 714 may drive rotation of rotary potentiometer 716 to generate a signal indication a current degree of rotation of tailgate 34.

In some embodiments, geared hinge mechanism 700 includes an electric brake 718. Electric brake 718 can be transitioned between a disengaged state and an engaged state in response to receiving a signal or an electrical current. In some embodiments, electric brake 718 is configured to engage a shaft or gear of geared hinge mechanism 700 that engages or meshes with segment gear 714. Electric brake 718 may transition into the engaged state to limit, prevent, restrict, or otherwise control a current angular position of tailgate 34. Electric brake 718 may transition into the disengaged state when geared hinge mechanism 700 operates to transition tailgate 34 out of the first position and into the second position.

Side-Positioned Eccentric Gearing Mechanism

Figure 8A:
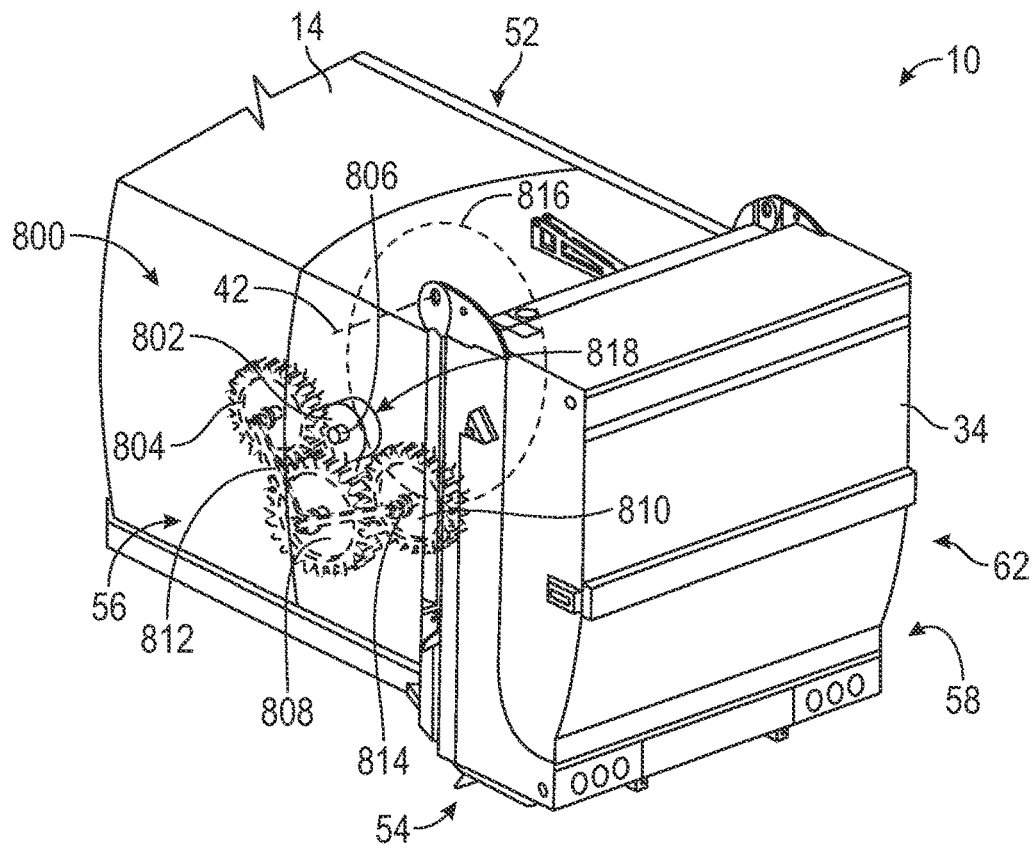
FIG. 8A is a perspective view of a portion of the refuse vehicle of FIG. 1 including an eccentric gearing mechanism when the tailgate is in the first position, according to an exemplary embodiment.
Figure 8B:
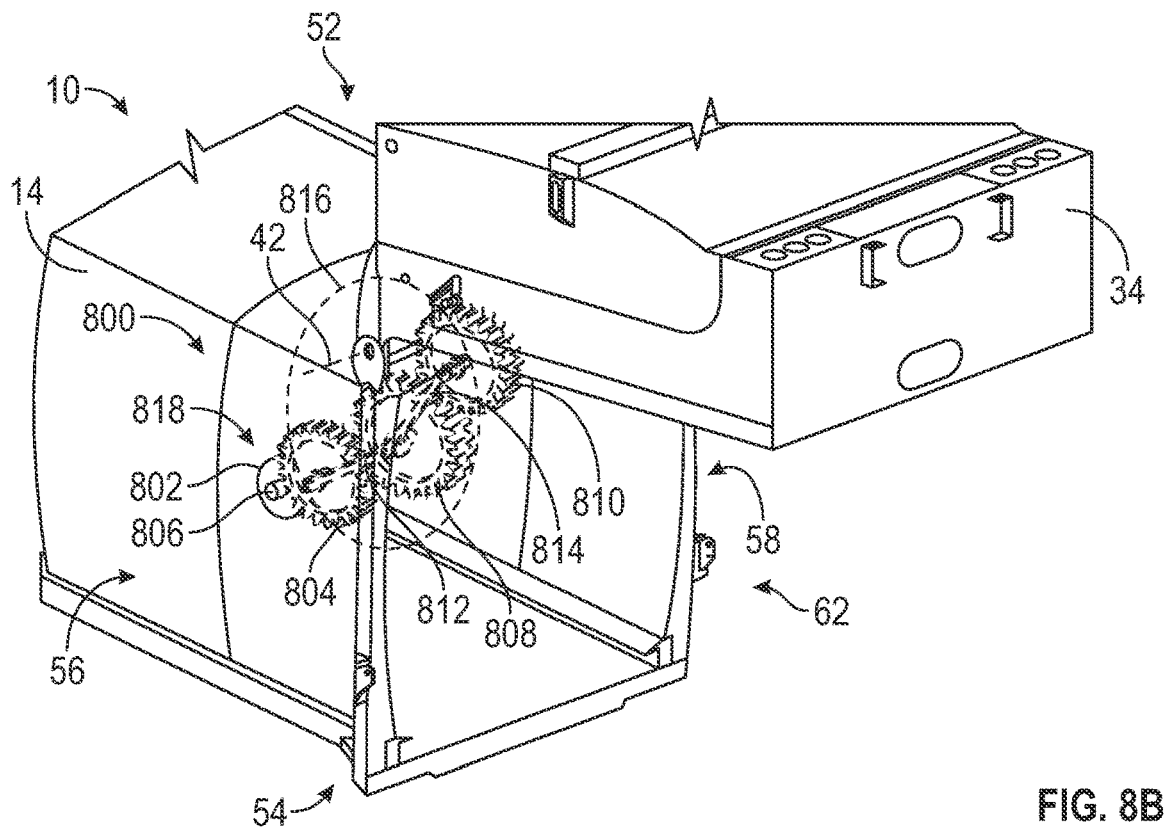
FIG. 8B is a perspective view of a portion of the refuse vehicle of FIG. 1 including the eccentric gearing mechanism of FIG. 8A when the tailgate is in the second position, according to an exemplary embodiment.

Referring particularly to FIGS. 8A-8B, refuse vehicle 10 may include an eccentric gearing mechanism 800 (e.g., a tailgate actuator assembly, a fully electric tailgate actuator assembly, etc.) that is positioned along right side 58 or left side 56 of body 14. Eccentric gearing mechanism 800 includes an electric motor 818, a first gear 804, a second gear 808, a third gear 810, a first linkage 812, and a second linkage 814. First linkage 812 extends between first gear 804 and second gear 808 and is configured to maintain a constant spatial distance between first gear 804 and second gear 808. First linkage 812 can rotatably couple at opposite ends with first gear 804 and second gear 808. Second linkage 814 can be similar to first linkage 812 and extends between second gear 808 and third gear 810 to maintain a constant relative spatial distance between second gear 808 and third gear 810 as eccentric gearing mechanism 800 operates to transition tailgate 34 between the first position shown in FIG. 8A and the second position shown in FIG. 8B.

First gear 804 is fixedly coupled with an output driveshaft 802 or output member 806 of electric motor 818 at a position offset from a center of first gear 804. Electric motor 818 may drive output driveshaft 802 to swing first gear 804. First gear 804 includes teeth that are configured to engage or mesh with teeth of second gear 808. Second gear 808 likewise includes teeth that are configured to engage or mesh with teeth of third gear 810. In some embodiments, electric motor 818 is configured to drive first gear 804 to swing or rotate. First gear 804 rotates about its central axis (where first gear 804 pivotally or rotatably couples with the end of first linkage 812), thereby driving second gear 808 to rotate about its respective central axis (where second gear 808 pivotally or rotatably couples with the opposite end of first linkage 812). First gear 804 is spatially fixedly coupled with the end of first linkage 812, while second gear 808 is spatially fixedly coupled with the opposite end of first linkage 812. First linkage 812 and second linkage 814 may be pivotally coupled at their ends with each other at the center of second gear 808.

Second gear 808 is driven to spatially translate as first linkage 812 swings, and is also driven to rotate relative to its center through engagement between the teeth of second gear 808 and the teeth of first gear 804. Second gear 808 engages third gear 810, thereby driving third gear 810 to rotate about its center (where third gear 810 is rotatably coupled with the end of second linkage 814).

Operation of electric motor 818 can drive tailgate 34 to rotate or pivot between the first position (shown in FIG. 8A) and the second position (shown in FIG. 8B). First linkage 812 and second linkage 814 may be driven to swing through rotation of first gear 804, second gear 808, and third gear 810 to provide a torque to tailgate 34 about axis 42. In some embodiments, second linkage 814 is translationally fixedly coupled at an outer end with a side of tailgate 34. Advantageously, eccentric gearing mechanism 800 can facilitate an optimal gear ratio as electric motor 818 is operated to drive tailgate 34 between the first position and the second position.

Over Centered Linkage Mechanism

Figure 9A:
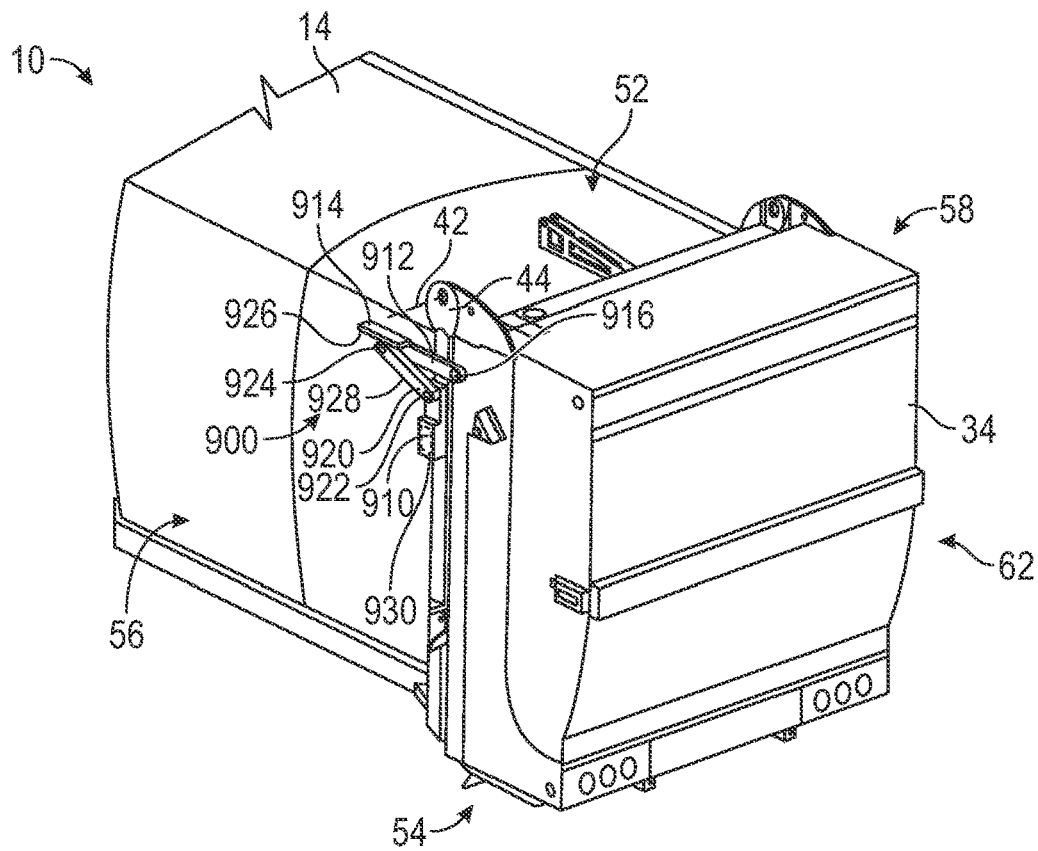
FIG. 9A is a perspective view of a portion of the refuse vehicle of FIG. 1 including an over-centered linkage mechanism when the tailgate is in the first position, according to an exemplary embodiment.
Figure 9B:
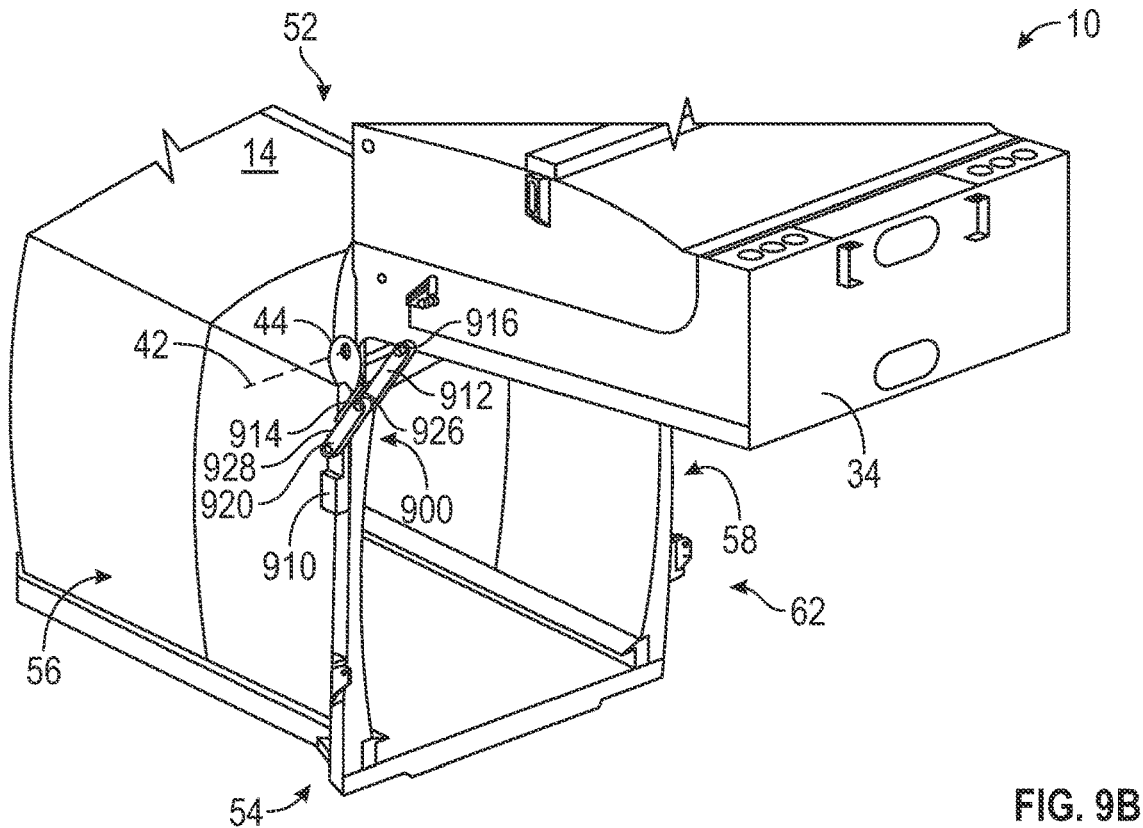
FIG. 9B is a perspective view of a portion of the refuse vehicle of FIG. 1 including the over-centered linkage mechanism of FIG. 9A when the tailgate is in the second position, according to an exemplary embodiment.

Referring particularly to FIGS. 9A-9B, refuse vehicle 10 can include an over-centered linkage mechanism 900 (e.g., a tailgate actuator assembly, a fully electric tailgate actuator assembly, etc.) configured to transition tailgate 34 between the first position and the second position. In some embodiments, over-centered linkage mechanism 900 is positioned on left side 56 of body 14, while in other embodiments, over-centered linkage mechanism 900 is positioned on right side 58 of body 14.

Over-centered linkage mechanism 900 includes a first member, shown as stationary member 918. In some embodiments, stationary member 918 is fixedly coupled with a side of body 14. For example, stationary member 918 can be fixedly coupled, fastened, or otherwise attached or secured with body 14 on left side 56 of body 14 at rear 62 of body 14. In some embodiments, refuse vehicle 10 includes two over-centered linkage mechanisms 900, the first of which is positioned on left side 56 of refuse vehicle 10 (e.g., of body 14), the second of which is positioned on right side 58 of refuse vehicle 10.

Over-centered linkage mechanism 900 also includes a first linkage 920 and a second linkage 912. First linkage 920 is rotatably coupled at opposite ends with stationary member 910 and second linkage 912. Second linkage 912 is rotatably coupled at its opposite ends with first linkage 920 and tailgate 34. In particular, first linkage 920 may be pivotally coupled but translationally fixed at a first or proximate end with a pin 922 of stationary member 910, while being rotatably or pivotally coupled at a second or opposite end with a pin 924 of second linkage 912.

Second linkage 912 includes a generally planar member, a locking member, a lock portion, a flat portion, a plate, etc., shown as locking feature 914. Locking feature 914 may be positioned at or proximate the end of second linkage 912 that pivotally couples with first linkage 920. In some embodiments, locking feature 914 extends along a side (e.g., an outer side) of second linkage 912 beyond the end of second linkage 912 that pivotally or rotatably couples with the pin 924 of first linkage 920.

Locking feature 914 can define a surface 926 that is configured to engage, contact, abut, etc., an outer surface, edge, periphery, face, side, etc., of first linkage 920, shown as engagement surface 928 when over-centered linkage mechanism 900 is transitioned into the second position shown in FIG. 9B. In some embodiments, first linkage 920 is driven by an electric motor 930 to rotate to transition over-centered linkage mechanism 900 between the first position shown in FIG. 9A and the second position shown in FIG. 9B. In some embodiments, when over-centered linkage mechanism 900 is transitioned into the second position shown in FIG. 9B, surface 926 of locking feature 914 engages or contacts the engagement surface 928 of first linkage 920 to provide a mechanical stop or mechanical locking feature for tailgate 34. For example, the engagement between surface 928 of first linkage 920 and surface 926 of locking feature 914 may lock tailgate 34 in the second position shown in FIG. 9B and prevent further rotation of tailgate 34 about axis 42 in direction 66.

It should be understood that while refuse vehicle 10 is shown including a single over-centered linkage mechanism 900 positioned on left side 56 of refuse vehicle 10 and coupled between body 14 and tailgate 34, refuse vehicle 10 can include another over-centered linkage mechanism 900 that is positioned on right side 58 of refuse vehicle 10 and coupled between body 14 and tailgate 34 on the right side 58. It should also be understood that over-centered linkage mechanism 900 may be powered (e.g., by an electric motor and gear box) to transition tailgate 34 between the first position and the second position, or tailgate 34 can be transitioned between the first position and the second position by a different motive source (e.g., geared hinge mechanism 700) while over-centered linkage mechanism 900 provides a mechanical stop or locking feature for tailgate 34.

Lowered Pivot Mechanism

Figure 10:
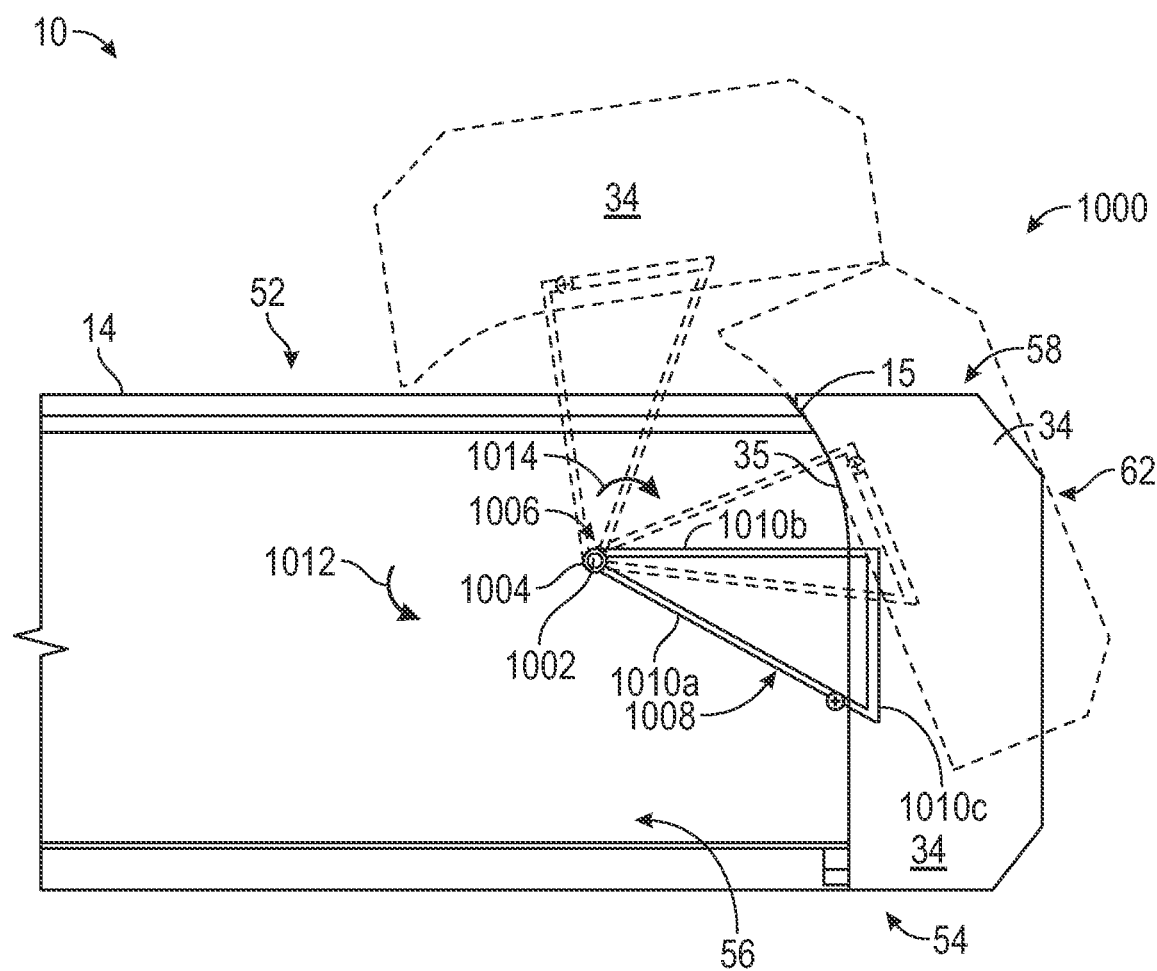
FIG. 10 is a side view of a portion of the refuse vehicle of FIG. 1 including a pivot mechanism to transition the tailgate between the first position and the second position, according to an exemplary embodiment.

Referring particularly to FIG. 10, refuse vehicle 10 can include a lowered pivot mechanism 1000 (e.g., a tailgate actuator assembly, a fully electric tailgate actuator assembly, etc.) that is configured to transition tailgate 34 between the first position (shown in solid lines) and the second position (shown in dashed lines). Lowered pivot mechanism 1000 includes a hinged element 1004, an arm assembly 1008, and an electric motor 1006. Hinged element 1004 can be positioned at a position a particular distance from rear 62 of body 14 and a particular distance between top side 52 of body 14 and bottom side 54 of body 14 as shown in FIG. 10. Hinged element 1004 can be translationally fixedly coupled with body 14 and facilitate rotation of tailgate 34 about an axis 1002 defined by hinged element 1004. Hinged element 1004 facilitates rotation of tailgate 34 and arm assembly 1008 about axis 1002 in either direction 1012 (e.g., to transition tailgate 34 into the second position) or in direction 1014 (e.g., to transition tailgate 34 into the first position).

Arm assembly 1008 may be a bar, linkage, or structure that extends between hinged element 1004 and tailgate 34. Arm assembly 1008 can include multiple elongated or structural members, shown as structural members 1010. For example, arm assembly 1008 may include a first structural member 1010a, a second structural member 1010b, and a third structural member 1010c that form arm assembly 1008. In some embodiments, one or more of structural members 1010 are fixedly coupled with tailgate 34. For example, third structural member 1010c may be fixedly coupled with tailgate 34.

Body 14 includes a curved surface 15 at rear of body 14. Similarly, tailgate 34 includes a curved inner surface 35 that corresponds in shape to curved surface 15 of body 14. In some embodiments, curved inner surface 35 of tailgate 34 is configured to slidably couple with curved surface 15 of body 14. In this way, as tailgate 34 is transitioned or swung between the first position and the second position, curved surface 15 of body 14 may slidably couple or engage with curved inner surface of tailgate 34.

Four-Bar Linkage Mechanism

Figure 11A:
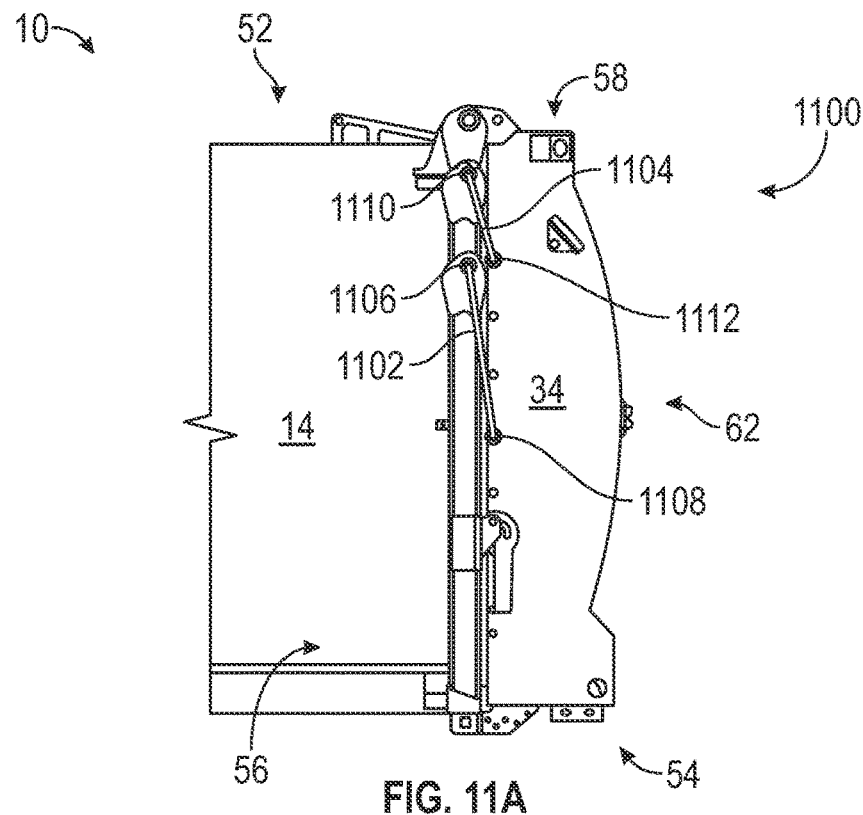
FIG. 11A is a side view of a portion of the refuse vehicle of FIG. 1 including a four-bar linkage mechanism when the tailgate is in the first position, according to an exemplary embodiment.
Figure 11B:
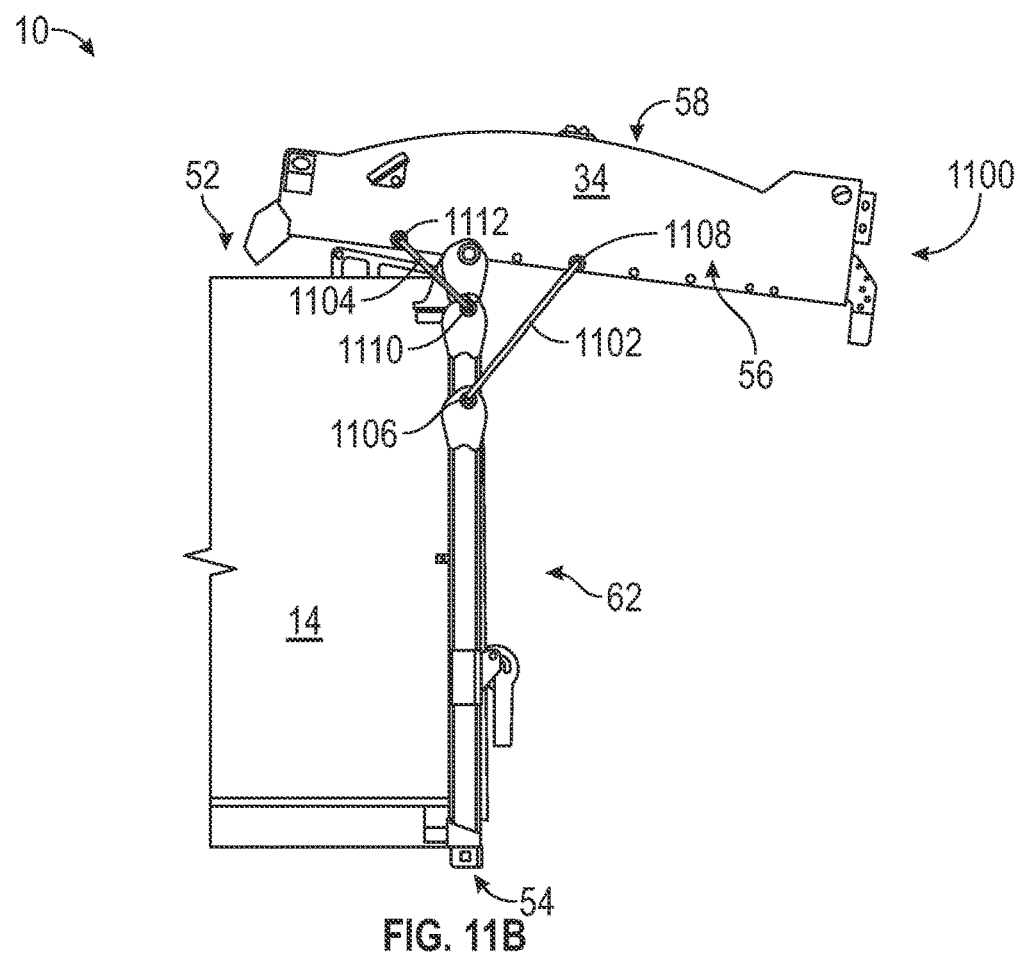
FIG. 11B is a side view of a portion of the refuse vehicle of FIG. 1 including the four-bar linkage mechanism of FIG. 11A when the tailgate is in the second position, according to an exemplary embodiment.

Referring particularly to FIGS. 11A and 11B, refuse vehicle 10 may include a four-bar linkage mechanism 1100 (e.g., a tailgate actuator assembly, a fully electric tailgate actuator assembly, etc.) that is configured to transition tailgate 34 between the first position (shown in FIG. 11A) and the second position (shown in FIG. 11B). Four-bar linkage mechanism 1100 includes a first linkage 1102 and a second linkage 1104. In some embodiments, first linkage 1102 has an overall length that is longer than an overall length of second linkage 1104. First linkage 1102 can pivotally or rotatably couple at a first or inner end with rear 62 of body 14, shown as pivotal coupling 1106. First linkage 1102 can similarly pivotally or rotatably couple at a second or outer end (e.g., an opposite end) with an inner portion of tailgate 34 (e.g., a portion of tailgate 34 that engages rear 62 of body 14 when tailgate 34 is in the first position), shown as pivotal coupling 1108. Second linkage 1104 also extends between rear 62 of body 14 and tailgate 34. Second linkage 1104 is pivotally or rotatably coupled at a first or inner end with rear 62 of body 14, shown as pivotal coupling 1110, and is pivotally or rotatably coupled at a second or outer end (e.g., an opposite end) with the inner portion of tailgate 34, shown as pivotal coupling 1112. In some embodiments, second linkage 1104 is positioned above first linkage 1102.

First linkage 1102 and second linkage 1104 can form or define two linkages of four-bar linkage mechanism 1100. Body 14 and tailgate 34 define another two linkages of four-bar linkage mechanism 1100. For example, a portion of body 14 between pivotal coupling 1106 and pivotal coupling 1110 may form another linkage, while a portion of tailgate 34 between pivotal coupling 1112 and pivotal coupling 1108 may form another linkage.

Four-bar linkage mechanism 1100 may be powered by an electric motor or electric linear actuator to transition between the first position (shown in FIG. 11A) and the second position (shown in FIG. 11B). For example, four-bar linkage mechanism 1100 can include an electric motor that is configured to drive first linkage 1102 to rotate about pivotal coupling 1106 or an electric motor configured to drive second linkage 1104 to rotate about pivotal coupling 1110 (e.g., in either direction) to transition tailgate 34 between the first position and the second position. Advantageously, four-bar linkage mechanism 1100 can reduce overhang of tailgate 34 by operating to swing and translate tailgate 34 at least partially forwards and above body 14 when tailgate 34 is transitioned into the second position (shown in FIG. 11B).

Figure 12A:
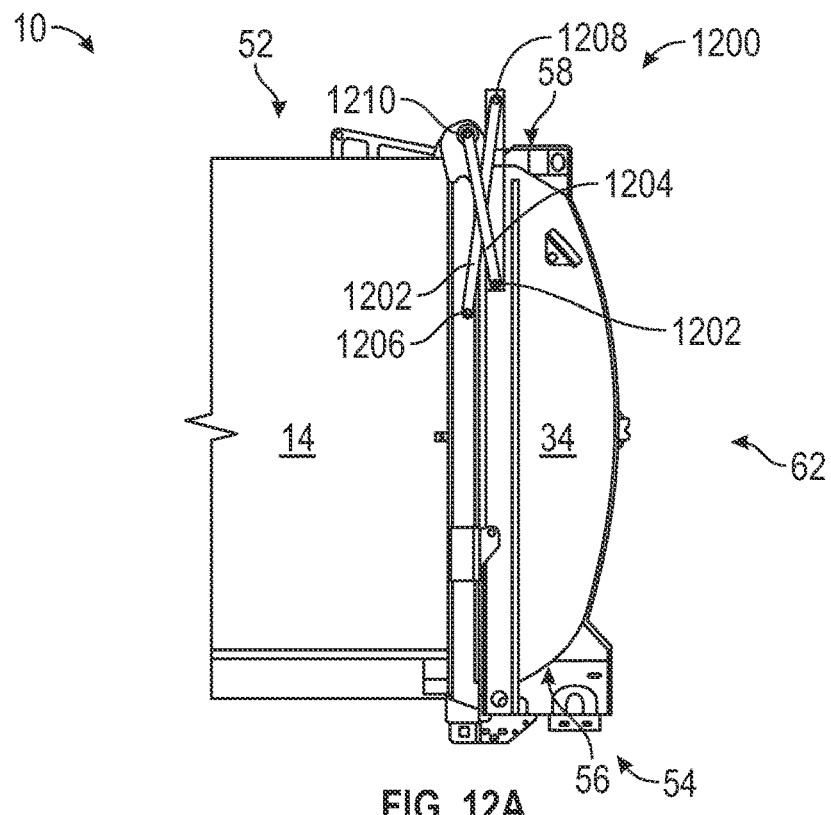
FIG. 12A is a side view of a portion of the refuse vehicle of FIG. 1 including a four-bar linkage mechanism when the tailgate is in the first position, according to an exemplary embodiment.
Figure 12B:
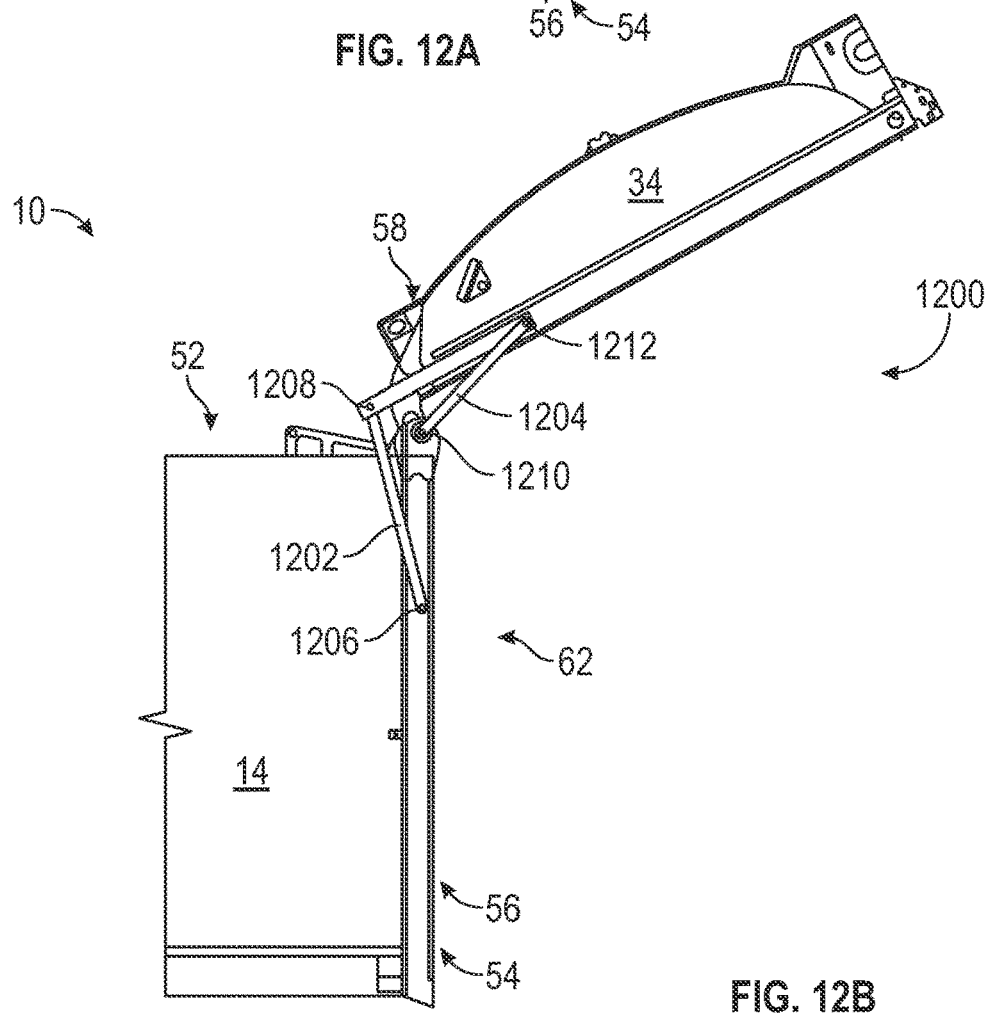
FIG. 12B is a side view of a portion of the refuse vehicle of FIG. 1 including the four-bar linkage mechanism of FIG. 12A when the tailgate is in the second position, according to an exemplary embodiment.

Referring particularly to FIGS. 12A and 12B, refuse vehicle 10 can include a four-bar linkage mechanism 1200 (e.g., a tailgate actuator assembly, a fully electric tailgate actuator assembly, etc.). Four-bar linkage mechanism 1200 can be similar to four-bar linkage mechanism 1100. Four-bar linkage mechanism 1200 includes a first linkage 1202 that extends between body 14 and tailgate 34 and a second linkage 1204 that extends between body 14 and tailgate 34. First linkage 1202 pivotally or rotatably couples with body 14 at a first or inner end, shown as pivotal coupling 1206 and pivotally or rotatably couples with tailgate 34 at a second or opposite end (e.g., an outer end), shown as pivotal coupling 1208. Similarly, second linkage 1204 pivotally or rotatably couples with body 14 at a first or inner end, shown as pivotal coupling 1210 and pivotally or rotatably couples with tailgate 34 at a second or opposite end (e.g., an outer end), shown as pivotal coupling 1212.

When tailgate 34 is in the first position (shown in FIG. 12A), first linkage 1202 and second linkage 1204 may cross over each other. For example, first linkage 1202 may extend between pivotal coupling 1206 and pivotal coupling 1208 in an at least partially upwards direction (shown in FIG. 12A). Likewise, second linkage 1204 extends between pivotal coupling 1210 and pivotal coupling 1212 in an at least partially downwards direction so that second linkage 1204 crosses first linkage 1202. In some embodiments, first linkage 1202 is pivotally coupled with tailgate 34 at a position that is upwards from a location where second linkage 1204 is pivotally coupled with tailgate 34. For example, pivotal coupling 1208 may be at an upper end or an upper corner of tailgate 34, while pivotal coupling 1212 is positioned along tailgate 34 at a position below pivotal coupling 1208. Similarly, pivotal coupling 1210 (e.g., where second linkage 1204 pivotally couples with body 14) may be at an upper corner of body 14 while pivotal coupling 1206 (e.g., where first linkage 1202 pivotally couples with body 14) may be positioned lower on body 14.

When tailgate 34 is transitioned into the second position (shown in FIG. 12B), first linkage 1202 rotates about pivotal coupling 1206 and second linkage 1204 rotates about pivotal coupling 1210 to the angular positions shown. First linkage 1202 and second linkage 1204 may rotate such that first linkage 1202 and second linkage 1204 do not cross each other when in the second position. It should be understood that four-bar linkage mechanism 1200 may be powered similarly to four-bar linkage mechanism 1100. For example, four-bar linkage mechanism 1200 may include an electric motor or linear electric actuator that is configured to drive tailgate 34 to transition between the first position and the second position. In some embodiments, the electric motor is configured to exert a torque on at least one of first linkage 1202 or second linkage 1204 to drive first linkage 1202 or second linkage 1204 to rotate or pivot about pivotal coupling 1206 or pivotal coupling 1210, respectively.

Hangar Door Mechanism

Figure 13A:
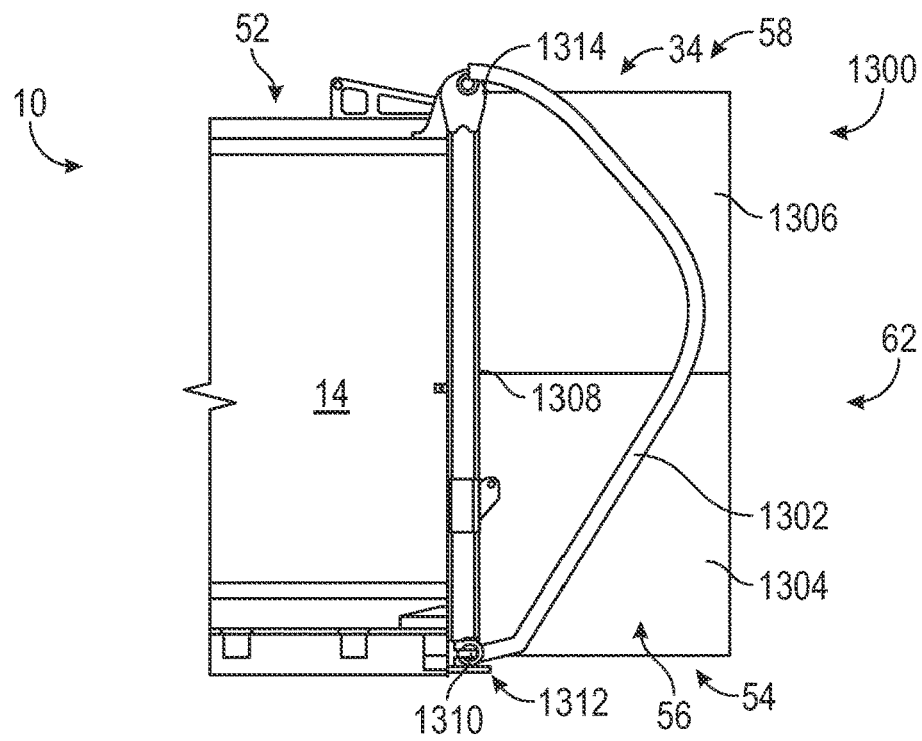
FIG. 13A is a side view of a portion of the refuse vehicle of FIG. 1 including a hangar door mechanism when the tailgate is in the first position, according to an exemplary embodiment.
Figure 13B:
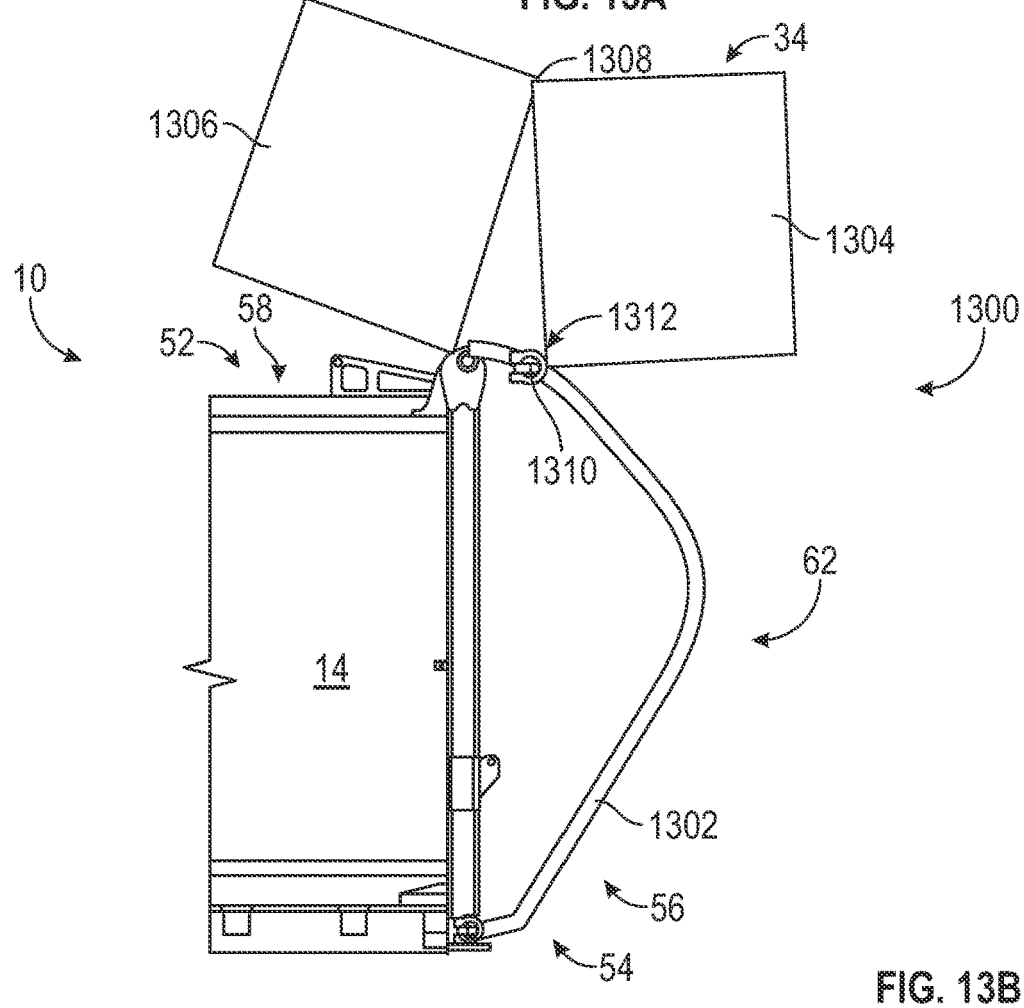
FIG. 13B is a side view of a portion of the refuse vehicle of FIG. 1 including the hangar door mechanism of FIG. 13A when the tailgate is in the second position, according to an exemplary embodiment.

Referring particularly to FIGS. 13A and 13B, refuse vehicle 10 can include a hangar door mechanism 1300 (e.g., a tailgate actuator assembly, a fully electric tailgate actuator assembly, etc.) configured to transition tailgate 34 between the first position shown in FIG. 13A and the second position shown in FIG. 13B. Hangar door mechanism 1300 can be configured for use with a multi-sectional or multi-member tailgate 34. Tailgate 34 can include a first member 1304 and a second member 1306 that are pivotally coupled with each other at pivotal coupling 1308. In some embodiments, first member 1304 and second member 1306 are pivotally or hingedly coupled at adjacent corners that are proximate body 14.

Hangar door mechanism 1300 includes a guide member, a track, a rail, a curved member, etc., shown as guide member 1302. Guide member 1302 extends between a lower corner of body 14 and an upper corner of body 14. Guide member 1302 may fixedly couple at opposite ends with body 14. Guide member 1302 can include a first portion that extends outwards from the lower corner of body 14, an apex, and a second portion that extends back inwards towards the body 14 from the apex.

Hangar door mechanism 1300 includes a following member, a slidable member, a drive member, etc., shown as drive member 1312. Drive member 1312 pivotally couples with a corner of first member 1304 and is configured to translate along guide member 1302. Drive member 1312 includes an electric drive motor 1310 that is configured to drive the drive member 1312 along guide member 1302. As drive member 1312 is driven to translate or slide along guide member 1302 by the electric drive motor 1310, the corner of first member 1304 of tailgate 34 follows a path defined by guide member 1302. As the corner of first member 1304 that pivotally couples with guide member 1302 translates along guide member 1302, first member 1304 and second member 1306 may pivot or rotate relative to each other at pivotal coupling 1308. As tailgate 34 is transitioned between the first position and the second position, second member 1306 may rotate or pivot about an upper corner that is pivotally or rotatably coupled with body 14, shown as pivotal coupling 1314.

Electric motor 1310 can operate to ascend or descend guide member 1302 to transition tailgate 34 between the first position and the second position. In some embodiments, electric motor 1310 is configured to drive a pinion that engages a rack that extends along guide member 1302 to transition tailgate 34 between the first position and the second position.

Figure 14A:
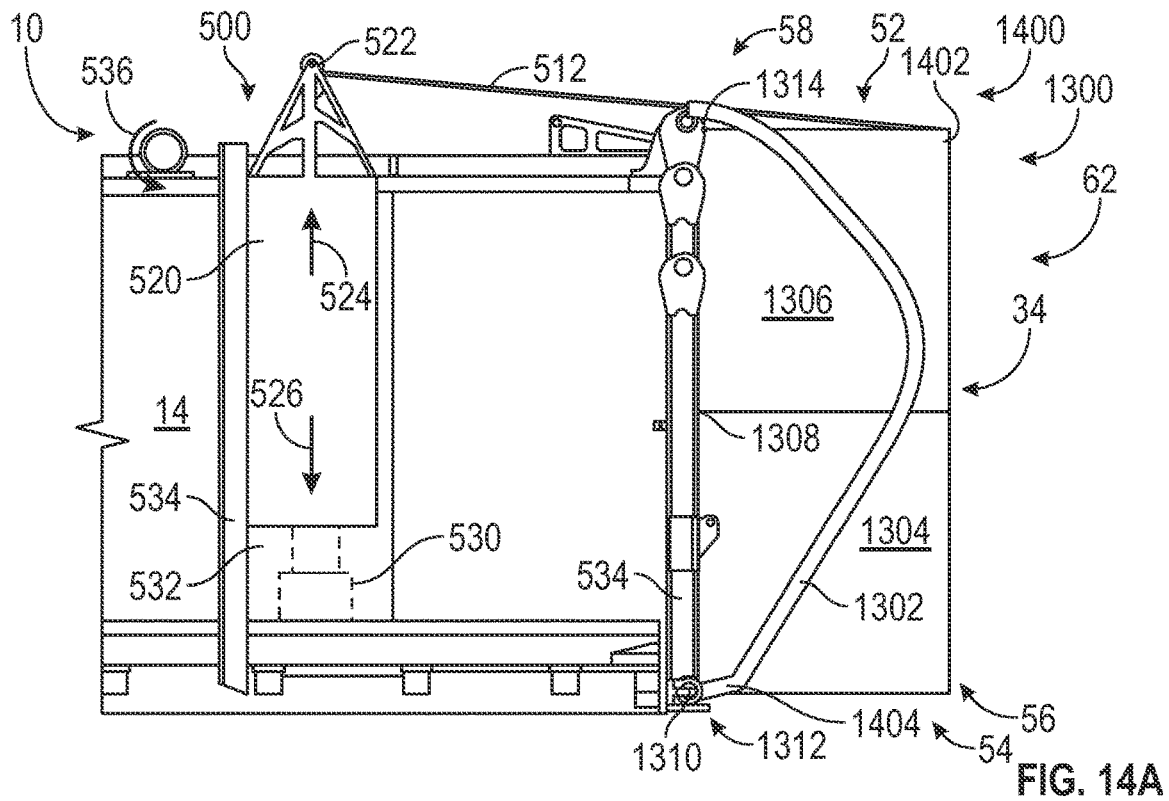
FIG. 14A is a side view of a portion of the refuse vehicle of FIG. 1 including a hangar door mechanism when the tailgate is in the first position, according to an exemplary embodiment.
Figure 14B:
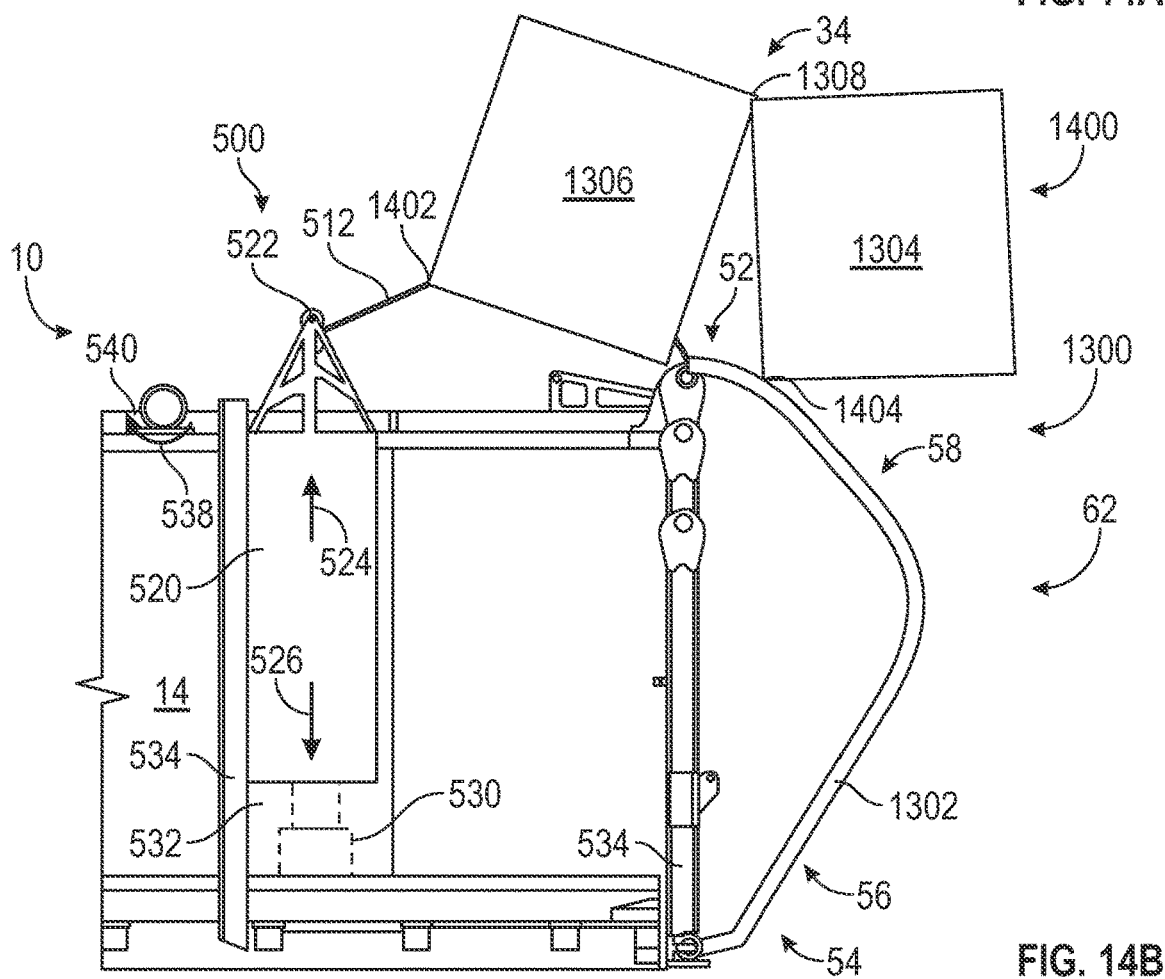
FIG. 14B is a side view of a portion of the refuse vehicle of FIG. 1 including the hangar door mechanism of FIG. 14A when the tailgate is in the second position, according to an exemplary embodiment.

Referring particularly to FIGS. 14A-14B, refuse vehicle 10 can include another hangar door mechanism 1400 (e.g., a tailgate actuator assembly, a fully electric tailgate actuator assembly, etc.). Hangar door mechanism 1400 includes both cable lift mechanism 500 and hangar door mechanism 1300. Cable 512 of cable lift mechanism 500 extends from winch 510 and slidable member 520 to at least one of first member 1304 or second member 1306. For example, cable 512 may fixedly couple at its end with an upper and outer corner 1402 of second member 1306. In other embodiments, cable 512 attaches, secures, or fixedly couples at its end with any other corner or portion of first member 1304 or second member 1306. In some embodiments, an inner bottom corner of first member 1304 includes a sliding pin joint 1404 that is configured to translate or slide along guide member 1302 or a track, recess, groove, etc., of guide member 1302.

Latch Mechanism

Figure 15:
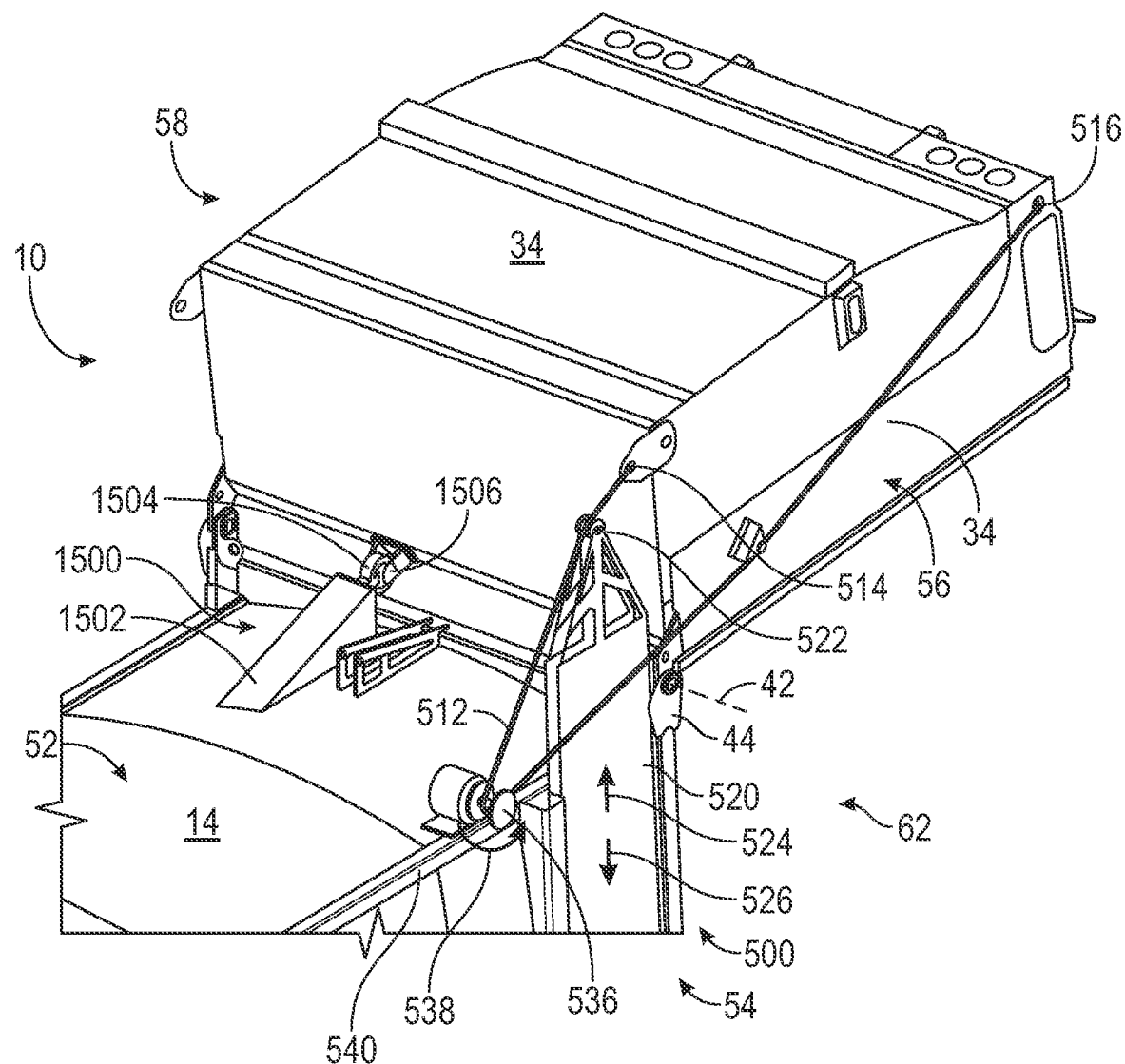
FIG. 15 is a perspective view of a portion of the refuse vehicle of FIG. 1 including a latch mechanism to lock the tailgate in the second position, according to an exemplary embodiment.

Referring particularly to FIG. 15, refuse vehicle 10 can include a latch mechanism 1500 (e.g., a lock, a fully electric lock, etc.) that is configured to lock, secure, or limit rotation of tailgate 34 about axis 42. Latch mechanism 1500 can secure or fixedly couple tailgate 34 in the second position as shown in FIG. 15. Latch mechanism 1500 is usable with any of electric apparatus 200, electric lift mechanism 400, cable lift mechanism 500 (as shown in FIG. 15), eccentric gear mechanism 500, eccentric gear mechanism 600, geared hinge mechanism 700, eccentric gearing mechanism 800, over-centered linkage mechanism 900, lowered pivot mechanism 1000, four-bar linkage mechanism 1100, four-bar linkage mechanism 1200, hangar door mechanism 1300, hangar door mechanism 1400, or any other mechanisms, apparatuses, systems, assemblies, etc., described herein to transition tailgate 34 between the first position and the second position.

Latch mechanism 1500 includes a structural member 1502 that fixedly couples, attaches, mounts, secures, etc., with top side 52 of body 14. Structural member 1502 may be integrally formed or fastened with the top side 52 of body 14. Structural member 1502 can be positioned at a center of body 14 (e.g., a lateral center) and may extend rearwards proximate rear 62 of body 14. Latch mechanism 1500 also includes a receiving member, a hook, a latch, etc., shown as hook 1504 that is fixedly coupled, secured, fastened, etc., with structural member 1502. Hook 1504 can be fixedly coupled with a most rearward portion of structural member 1502 and may protrude or extend at least partially over a rearward edge of top side 52 of body 14.

Latch mechanism 1500 also includes a pin, a hook, a latch member, etc., shown as pin member 1506. Pin member 1506 may be fixedly coupled with an upper surface, edge, periphery, face, etc., of tailgate 34. Pin member 1506 can be received within hook 1504 to secure tailgate 34 in the second position or limit rotation of tailgate 34 about axis 42.

Side Hinge Tailgate

Figure 16A:
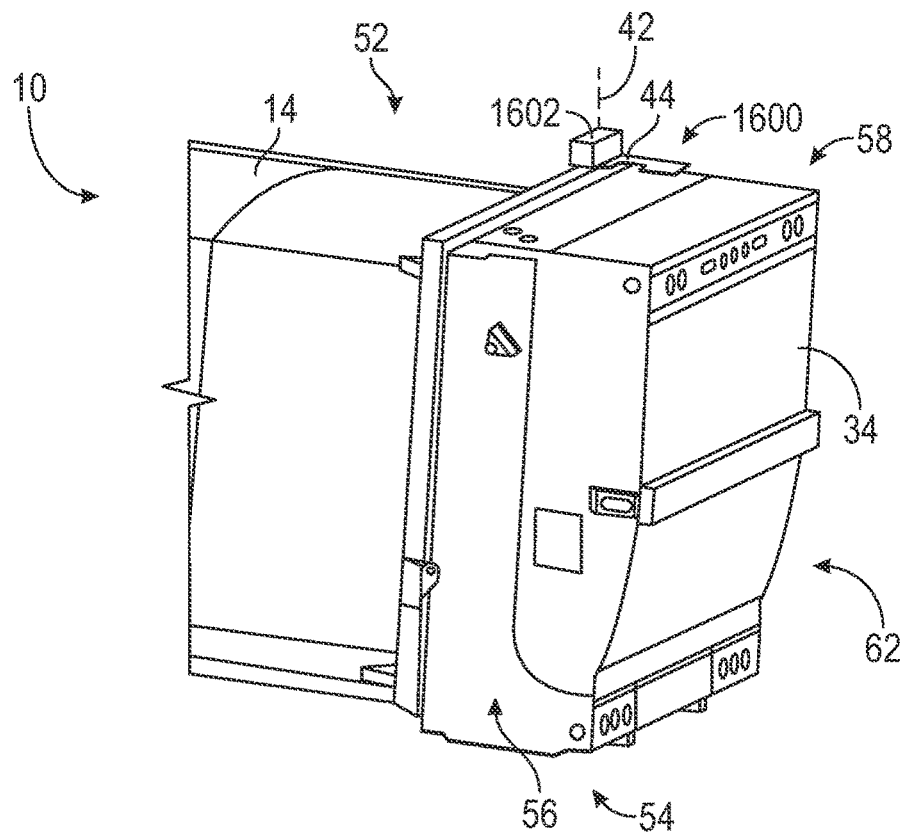
FIG. 16A is a perspective view of a portion of the refuse vehicle of FIG. 1 including a side hinge mechanism when the tailgate is in the first position, according to an exemplary embodiment.
Figure 16B:
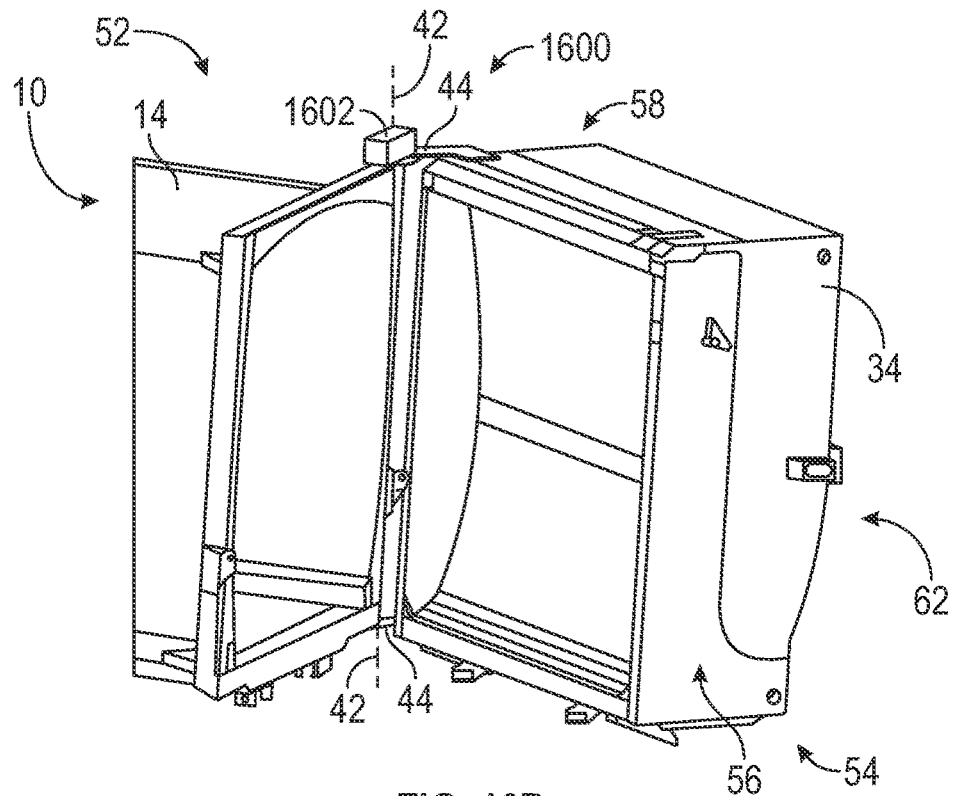
FIG. 16B is a perspective view of a portion of the refuse vehicle of FIG. 1 including the side hinge mechanism of FIG. 16A when the tailgate is in the second position, according to an exemplary embodiment.

Referring particularly to FIGS. 16A and 16B, refuse vehicle 10 can include side-oriented hinges to rotatably or pivotally couple tailgate 34 with body 14 and a side-hinge mechanism 1600 (e.g., a tailgate actuator assembly, a fully electric tailgate actuator assembly, etc.) configured to swing tailgate 34 relative to body 14. As shown in FIGS. 16A and 16B, hinge elements 44 are positioned along a lateral side at top and bottom of body 14, thereby defining axis 42 in a vertical direction.

Side-hinge mechanism 1600 includes an electric motor 1602 that is fixedly coupled at the upper side 52 of body 14. Electric motor 1602 can be fixedly coupled with body 14 at an upper corner of body 14 proximate hinge elements 44 (e.g., an upper one of hinge elements 44). Electric motor 1602 can include a gearbox or a gear ratio that outputs torque to rotate or pivot tailgate 34 about axis 42 between the first position (shown in FIG. 16A) and the second position (shown in FIG. 16B). Advantageously, since tailgate 34 is oriented to swing about a vertical axis between the first position and the second position, electric motor 1602 may be sized to swing tailgate 34, without needing to lift tailgate 34 in a direction that opposes a direction of gravity.

Side Hinge Tailgate with Actuator

Figure 17A:
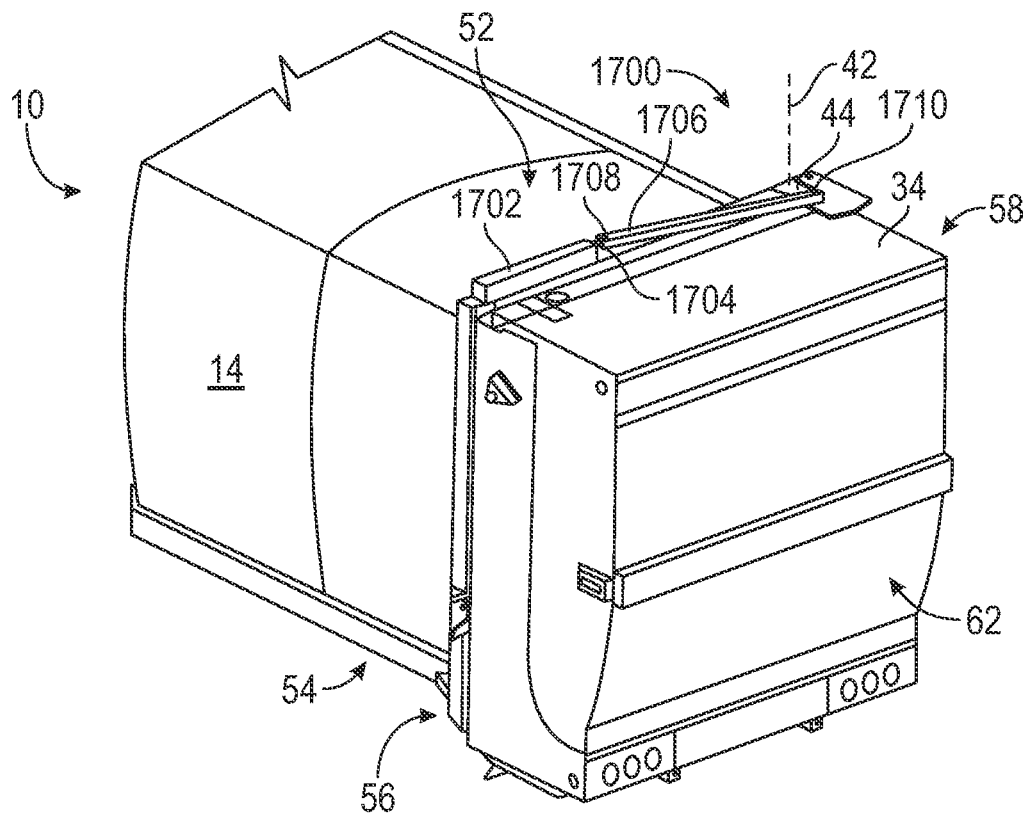
FIG. 17A is a perspective view of a portion of the refuse vehicle of FIG. 1 including a side-hinged tailgate with an actuator apparatus when the tailgate is in the first position, according to an exemplary embodiment.
Figure 17B:
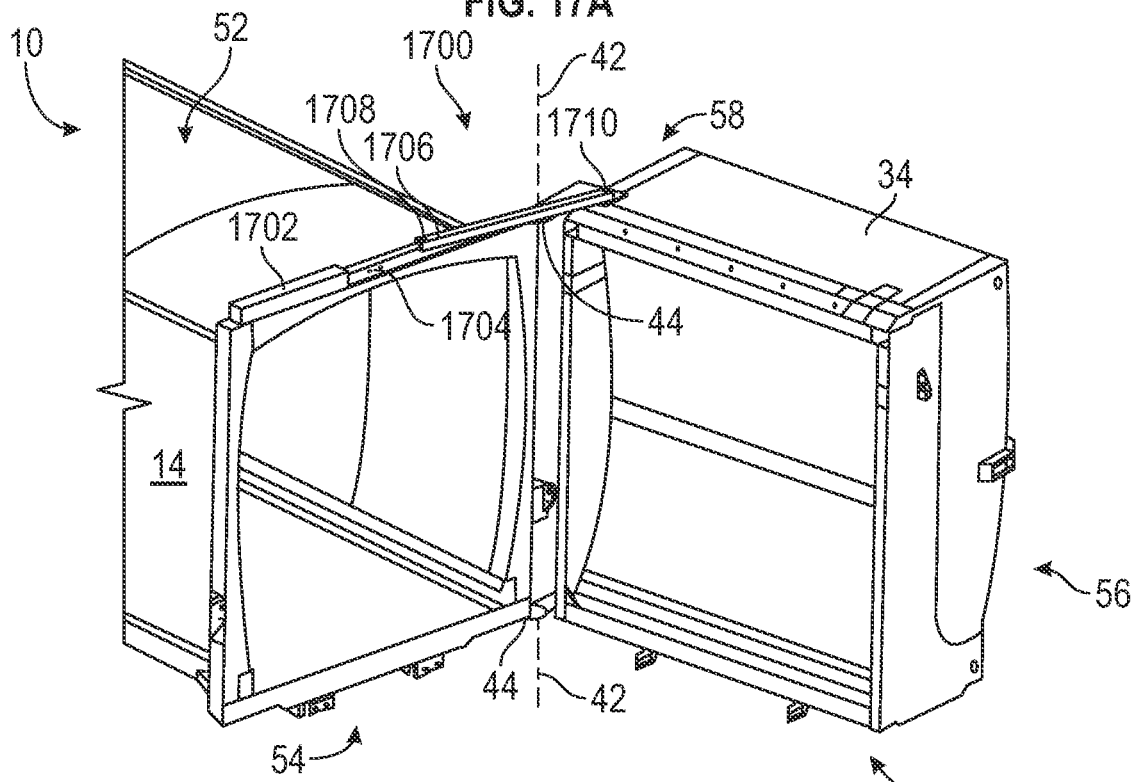
FIG. 17B is a perspective view of a portion of the refuse vehicle of FIG. 1 including the side-hinged tailgate and the actuator apparatus of FIG. 17B when the tailgate is in the second position, according to an exemplary embodiment.

Referring particularly to FIGS. 17A and 17B, refuse vehicle 10 can include a side-hinge actuator apparatus 1700 (e.g., a tailgate actuator assembly, a fully electric tailgate actuator assembly, etc.). Side-hinge actuator apparatus 1700 is configured for use with body 14 and tailgate 34 when tailgate 34 is configured to pivot or rotate about a vertical axis 42 (e.g., when hinged elements 44 are positioned along a lateral side of body 14).

Side-hinge actuator apparatus 1700 includes a linear electric actuator 1702, and a linkage 1706. Linear electric actuator 1702 is fixedly coupled, mounted, or secured at top side 52 of body 14. Linear electric actuator 1702 is configured to extend or retract an inner member 1704 to drive tailgate 34 to pivot or rotate about axis 42 between the first position (shown in FIG. 17A) and the second position (shown in FIG. 17B). Linkage 1706 pivotally couples at a first end with an outer end of inner member 1704, shown as pivotal coupling 1708. Linkage 1706 pivotally couples at an opposite or second end with tailgate 34 at a pivotal coupling 1710 that is positionally offset from axis 42 so that a torque is produced about axis 42 as linear electric actuator 1702 drives inner member 1704 to extend.

Linear electric actuator 1702 can extend to drive tailgate 34 to rotate about axis 42 into the second position (shown in FIG. 17B). Linear electric actuator 1702 can similarly operate to retract to drive tailgate 34 to rotate about axis 42 into the first position (shown in FIG. 17A). In this way, linear electric actuator 1702 can extend or retract to transition tailgate 34 between the first position and the second position. It should be understood that side-hinge actuator apparatus 1700 can include another linear electric actuator 1702 positioned at bottom side 54 of body 14.

Side Hinge Tailgate with Electric Motor and Linkages

Figure 18A:
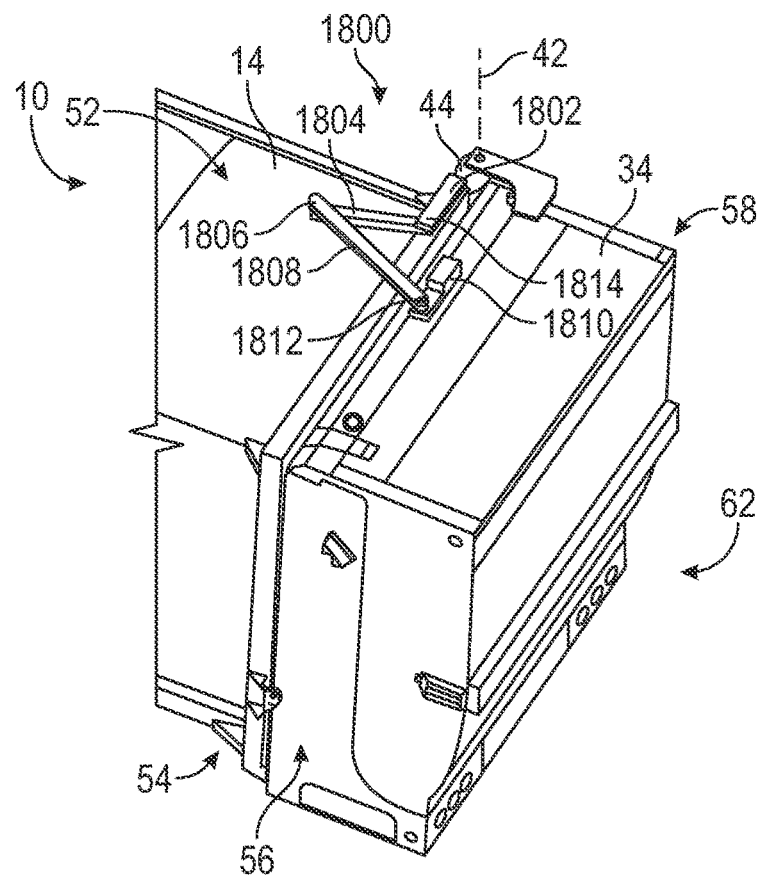
FIG. 18A is a perspective view of a portion of the refuse vehicle of FIG. 1 including a side-hinged tailgate with a linkage apparatus when the tailgate is in the first position, according to an exemplary embodiment.
Figure 18B:
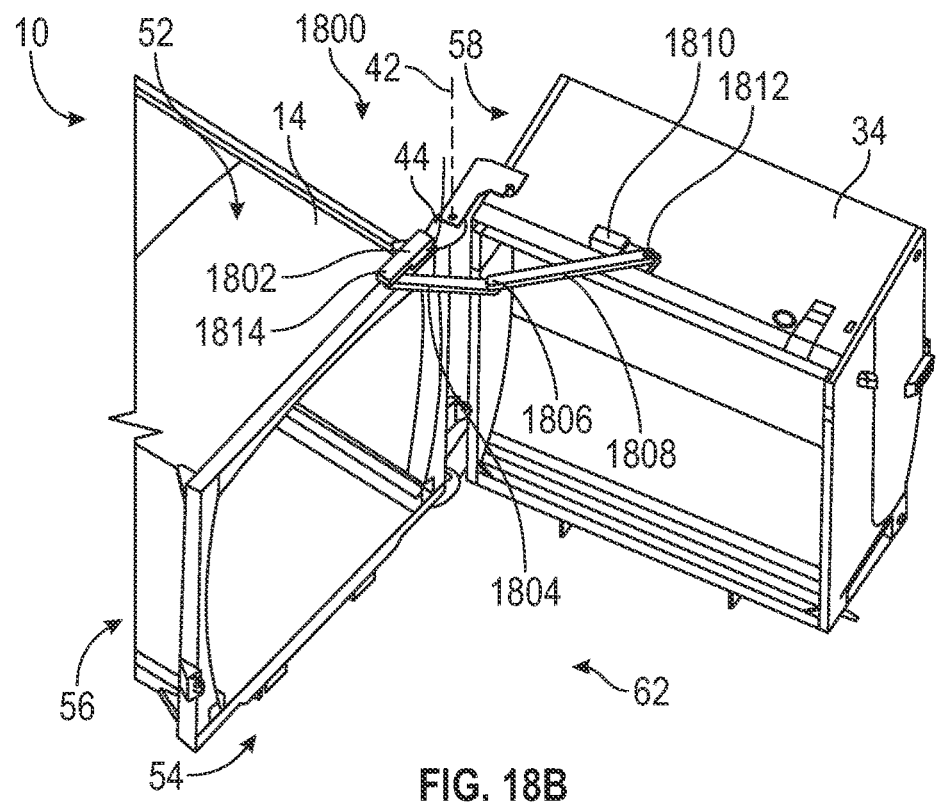
FIG. 18B is a perspective view of a portion of the refuse vehicle of FIG. 1 including the side-hinged tailgate and the linkage apparatus of FIG. 18A when the tailgate is in the second position, according to an exemplary embodiment.

Referring particularly to FIGS. 18A and 18B, refuse vehicle 10 can include a side-hinge linkage apparatus 1800 (e.g., a tailgate actuator assembly, a fully electric tailgate actuator assembly, etc.) configured to transition tailgate 34 between the first position (shown in FIG. 18A) and the second position (shown in FIG. 18B). Side-hinge linkage apparatus 1800 can be configured for use with a side-hinged tailgate 34 (e.g., when hinge elements 44 are positioned at a lateral side of body 14 and define axis 42 in a vertical direction).

Side-hinge linkage apparatus 1800 includes an electric motor 1802 that is fixedly coupled, mounted, or secured at the top side 52 of body 14. Electric motor 1802 can be fixedly coupled with the top side 52 of body 14 proximate at a rearwards edge of body 14. Side-hinge linkage apparatus 1800 also includes a first linkage 1804 that is configured to be driven by electric motor 1802 at rotatable coupling 1814. Side-hinge linkage apparatus 1800 also includes a second linkage 1808 that is pivotally coupled at a first end with an outer end of first linkage 1804 (shown as pivotal coupling 1806) and pivotally coupled with a structural member 1810 at a second or opposite end of second linkage 1808, shown as pivotal coupling 1812. Electric motor 1802 operates to drive first linkage 1804 to rotate about rotatable coupling 1814, thereby driving second linkage 1808 to rotate or pivot relative to first linkage 1804 at pivotal coupling 1806 and drive tailgate 34 to rotate or pivot about axis 42.

Vertical Tailgate Lift Apparatus

Figure 19:
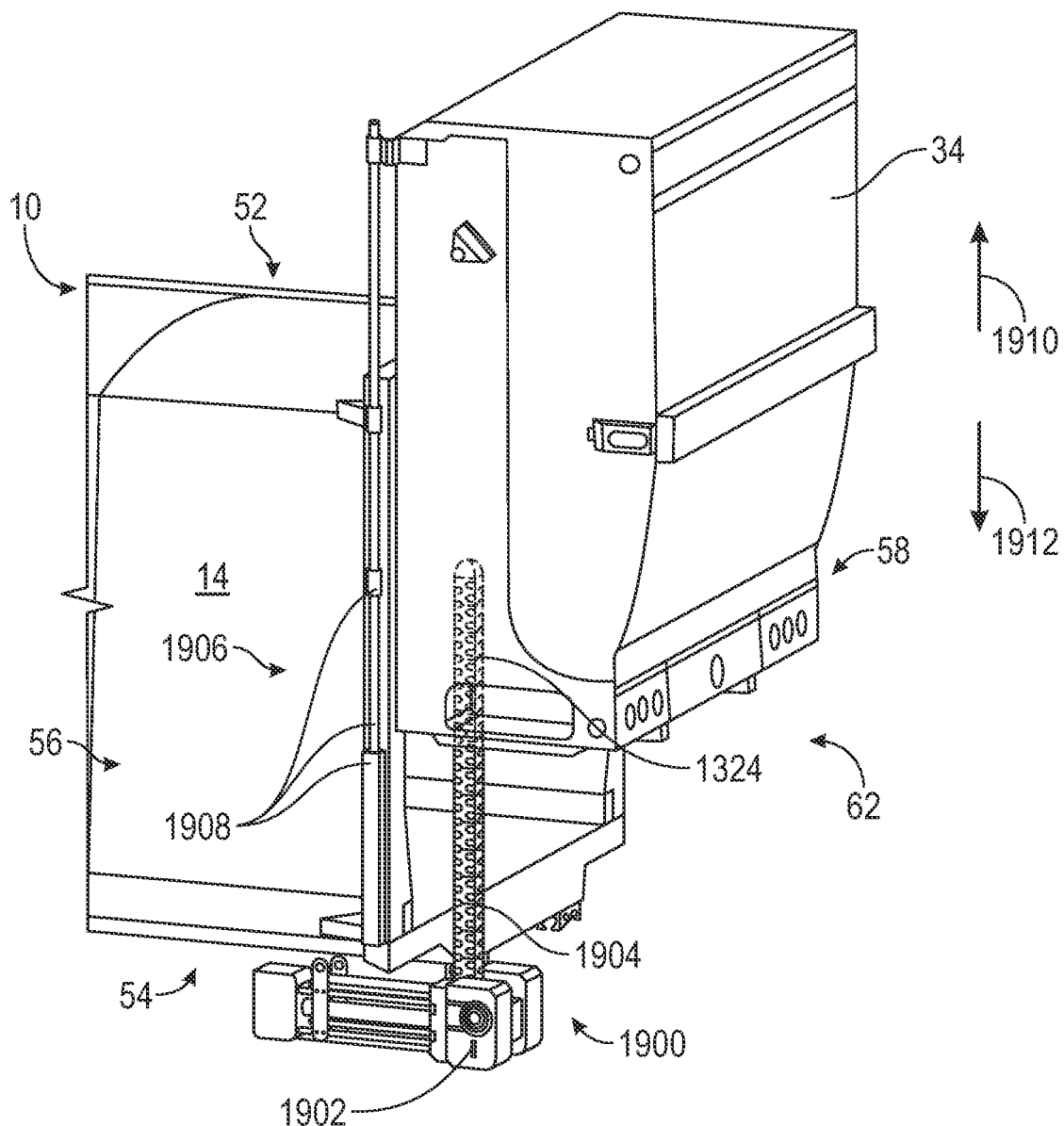
FIG. 19 is a perspective view of a portion of the refuse vehicle of FIG. 1 including a vertical lift apparatus configured to raise or lower the tailgate between the first position and the second position, according to an exemplary embodiment.

Referring particularly to FIG. 19, refuse vehicle 10 can include a vertical lift apparatus 1900 (e.g., a tailgate actuator assembly, a fully electric tailgate actuator assembly, etc.) configured to drive tailgate 34 to translate along a vertical direction (e.g., in an upwards direction 1910 or in a downwards direction 1912) relative to body 14. Tailgate 34 may be configured to translatably or slidably couple with body 14 at rear 62 of body 14 between the first position (e.g., when a bottom edge of tailgate 34 is aligned with a bottom edge of body 14) and the second position (e.g., when the bottom edge of tailgate 34 is aligned with a top edge of body 14).

Vertical lift apparatus 1900 includes an electric motor 1902 configured to drive a push-chain or a compressive load-bearing chain, shown as push chain 1904 to extend or retract. Push chain 1904 can be fixedly coupled with bottom 54 of tailgate 34 so that push chain 1904 can exert a pushing force to tailgate 34 to translate tailgate 34 in upwards direction 1910 relative to body 14. Vertical lift apparatus 1900 also includes a rail system, assembly, apparatus, etc., shown as rail system 1906 that is configured to translatably couple tailgate 34 with body 14. Rail system 1906 can include multiple rails 1908 that are configured to slidably or translatably couple with each other. In some embodiments, the multiple rails 1908 telescope relative to each other. An inner most rail 1908 may fixedly couple with tailgate 34 while an outer most rail 1908 may fixedly couple with body 14. In this way, rail system 1906 can guide translation of tailgate 34 relative to body 14. When tailgate 34 translates in upwards direction 1910, rail system 1906 may be driven to extend. When tailgate 34 translates in downwards direction 1912, rail system 1906 may be driven to retract.

Electric motor 1902 can be configured to drive push chain 1904 to extend or retract, thereby translating tailgate 34 in the upwards direction 1910 or the downwards direction 1912 to transition tailgate 34 between the first position and the second position. In some embodiments, electric motor 1902 and push chain 1904 are replaced with a linear electric actuator that is oriented vertically and configured to translate tailgate 34 along the vertical direction relative to body 14 between the first position and the second position. It should be understood that vertical lift apparatus 1900 can include multiple rail systems 1906 positioned at opposite lateral sides (e.g., left side 56 and right side 58) of body 14.

Electric Locks

Figure 3:
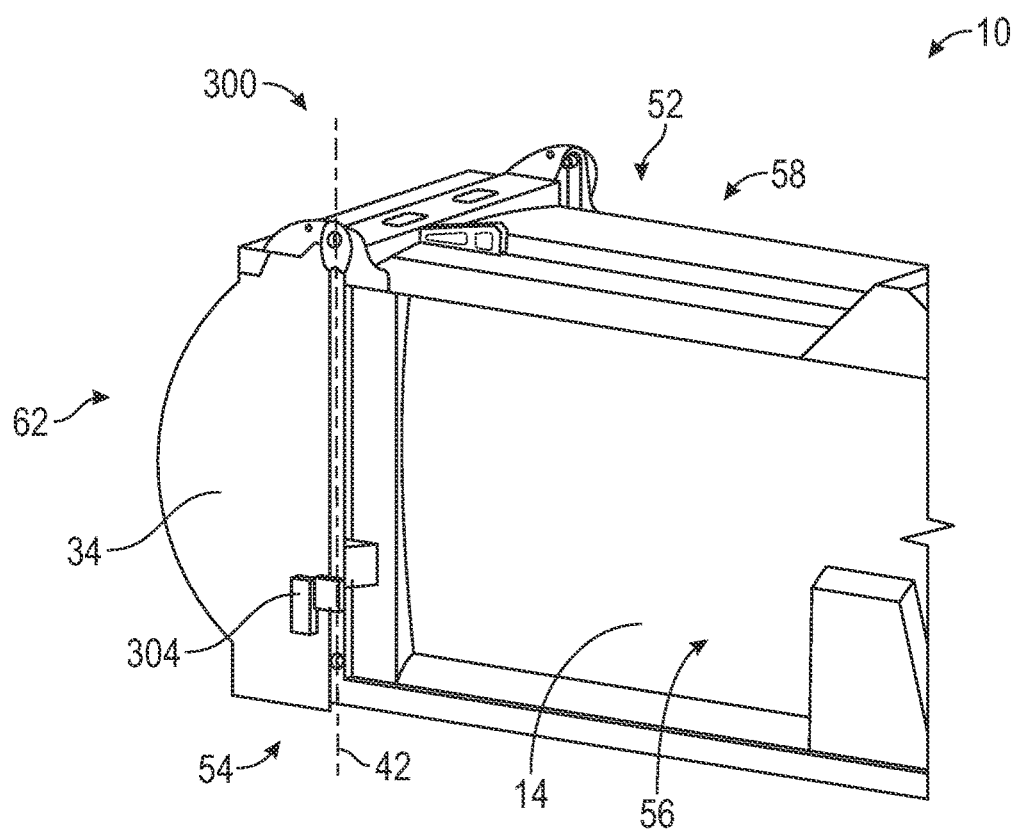
FIG. 3 is the tailgate of FIG. 2 having electric locking mechanisms, according to an exemplary embodiment.

As shown in FIG. 3, the tailgate 34 of the refuse vehicle 10 includes a locking system 300 (e.g., a lock, a fully electric lock, etc.) that includes one or more electric locks 304. The electric locks 304 may selectively couple the tailgate 34 to the body 14 of the refuse vehicle 10. Additionally or alternatively, the electric locks 304 may selectively hold the tailgate 34 in an open or closed position. For example, a top portion of the tailgate 34 is coupled to the body 14 via the axis 42 (as described in detail with reference to FIG. 2), while a bottom portion of the tailgate 34 is selectively coupled to the body 14 via the electric locks 304, disengagement of which allows the tailgate 34 to open (e.g., to transition out of the first position and into the second position). The electric locks 304 are shown on the bottom of the tailgate 34, however in some embodiments the electric locks 304 are located elsewhere, for example on the side of the tailgate 34. The electric locks 304 may include one or more pins. The one or more pins may be received by one or more coupling elements of the body 14 and/or the frame 12. In some embodiments, the electric locks 304 include an electric device (e.g., a solenoid, electromagnetic actuator, ball screw driven by an electric motor, etc.) to translate the one or more pins between a locked and unlocked position. In some embodiments, the electric locks 304 include a different electric device. Additionally or alternatively, the electric locks 304 may electromagnets. For example, electromagnetic locks may selectively secure the tailgate 34 to the body 14 by magnetizing and demagnetizing.

In some embodiments, the electric locks 304 coordinate with one or more other components of the tailgate 34 (e.g., electric actuator 202, etc.) to facilitate opening and/or closing of the tailgate 34. For example, to open a hatch-type tailgate, the electric locks 304 may power a solenoid to disengage one or more pins from the body 14 and the electric actuator 202 may extend to rotationally open the tailgate 34 along the axis 42. Continuing the example, the electric locks 304 may further power a different solenoid to engage one or more additional pins to hold the tailgate 34 in an open position. In some embodiments, the tailgate 34 includes one or more sensors to determine a position (e.g., open, close) of the tailgate 34. Additionally or alternatively, the tailgate 34 may include one or more control circuits (e.g., a processor, FPGA, SOC, etc.) to determine a position of the tailgate 34. For example, a control circuit may read the current supplied to an electric actuator of the tailgate 34 to determine a position of the tailgate 34 based on the current load of the electric actuator.

As shown in FIG. 3, the axis 42 may be located on a side of the tailgate 34. In some embodiments, the axis 42 is one a right side or a left side of the tailgate 34. In some embodiments, the axis 42 is on both sides of the tailgate 34, facilitating opening of the tailgate to both sides. Additionally or alternatively, the tailgate 34 may be divided and open in a double-leafed manner. In some embodiments, each section of a divided tailgate may independently couple/decoupled from the body 14, allowing a section of the tailgate 34 to be replaced without replacing the entire tailgate. A divided tailgate allows for customization of the refuse vehicle 10. For example, a refuse vehicle may have a curbside section of the tailgate 34 with various curbside components (e.g., a grabber, tools, etc.) and a street-side section of the tailgate 34 with a high-visibility sign. It should be understood that the tailgate 34 may have, integrate, or otherwise utilize any of the components or features described herein. For example, the tailgate 34 having an axis 42 on the side of the tailgate 34 may include any of the electric components (e.g., electric actuator 202) described in reference to FIG. 2, to facilitate opening of the tailgate 34. Furthermore, failure to mention a specific component does not preclude integration of such a component. The tailgate 34 described herein may include any component known in the art.

Sliding Pin Lock

Figure 20:
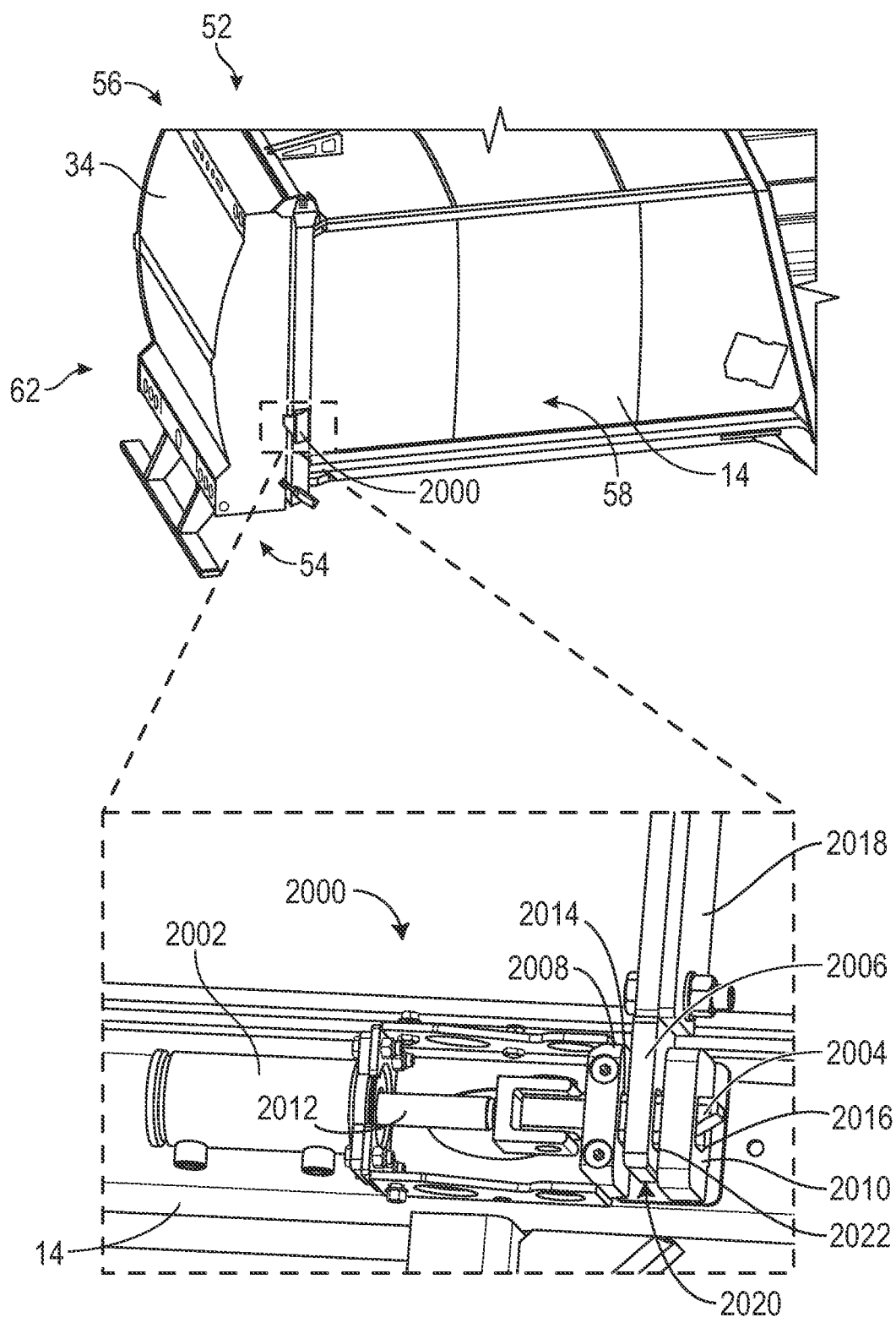
FIG. 20 is a perspective view of a portion of the refuse vehicle of FIG. 1 including a sliding pin locking mechanism for locking the tailgate in the first position, according to an exemplary embodiment.

Referring particularly to FIG. 20, refuse vehicle 10 can include a sliding pin locking mechanism 2000 (e.g., a lock, a fully electric lock, etc.) positioned along a rearwards portion of body 14. Sliding pin locking mechanism 2000 is fixedly coupled with the rear 62 of body 14 and may be positioned on the right side 58, left side 56, or both. Sliding pin locking mechanism 2000 includes a linear actuator 2002 (e.g., a linear electric actuator, a hydraulic cylinder, a pneumatic cylinder, etc.) configured to translate an inner member 2012 (e.g., a rod, a bar, a beam, etc.) to extend or retract.

Sliding pin locking mechanism 2000 includes a locking member, shown as pin 2004 that is fixedly coupled, attached, integrally formed, secured, etc., with an outer end of inner member 2012. Operation of linear actuator 2002 drives translation of pin 2004 (e.g., in either a forwards or a rearwards direction). Sliding pin locking mechanism 2000 also includes a first guide member 2008 and a second guide member 2010. First guide member 2008 and second guide member 2010 are both fixedly coupled with body 14, aligned with inner member 2012, and positioned a distance apart along an axis defined by inner member 2012 and pin 2004 (e.g., a stroke axis of linear actuator 2002), thereby defining a space or gap 2020 between first guide member 2008 and second guide member 2010.

First guide member 2008 and second guide member 2010 each include a corresponding aperture, opening, bore, hole, etc., shown as opening 2014 and opening 2016, respectively. Opening 2014 and opening 2016 can have a cross-sectional shape or a periphery or shape that corresponds to or matches a cross-sectional shape of pin 2004 or an outer periphery of pin 2004. In some embodiments, opening 2014 and opening 2016 are sized to receive pin 2004 therewithin.

Opening 2014 and opening 2016 may be aligned so that as pin 2004 is driven to translate along the stroke axis of linear actuator 2002, pin 2004 extends through opening 2014 and opening 2016. In some embodiments, when linear actuator 2002 is at a maximum extension, pin 2004 extends through both opening 2014 and opening 2016.

Referring still to FIG. 20, sliding pin locking mechanism 2000 includes an engagement portion 2006 of tailgate 34. Engagement portion 2006 may protrude laterally outwards from a side of tailgate 34. In some embodiments, engagement portion 2006 is fixedly coupled, fastened, secured, or integrally formed with an extension portion 2018 of tailgate 34. When tailgate 34 transitions into the first position, engagement portion 2006 swings into the gap 2020 defined between first guide member 2008 and second guide member 2010. Engagement portion 2006 includes an opening, aperture, hole, bore, etc., shown as opening 2022 that is configured to swing into alignment with opening 2014 of first guide member 2008 and opening 2016 of second guide member 2010. When engagement portion 2006 swings into the gap 2020 between first guide member 2008 and second guide member 2010 and opening 2022 is aligned with openings 2014 and 2016, linear actuator 2002 may operate to extend inner member 2012 so that pin 2004 extends through opening 2014 of first guide member 2008, opening 2022 of engagement portion 2006, and opening 2016 of second guide member 2010, thereby locking tailgate 34 in the first position or limiting movement of tailgate 34 between the first position and the second positions. When it is desired for tailgate 34 to transition out of the first position and into the second position, linear actuator 2002 can operate to retract so that pin 2004 does not extend through opening 2014, opening 2022, and opening 2016. Tailgate 34 can then be operated to transition between the first position and the second position freely. It should be understood that while FIG. 20 shows sliding pin locking mechanism 2000 configured to lock tailgate 34 in the first position, sliding pin locking mechanism 2000 or an additional sliding pin locking mechanism 2000 can be positioned on refuse vehicle 10 (e.g., on body 14) to lock tailgate 34 in the second position.

Over Centered Lock Mechanism

Figure 21A:
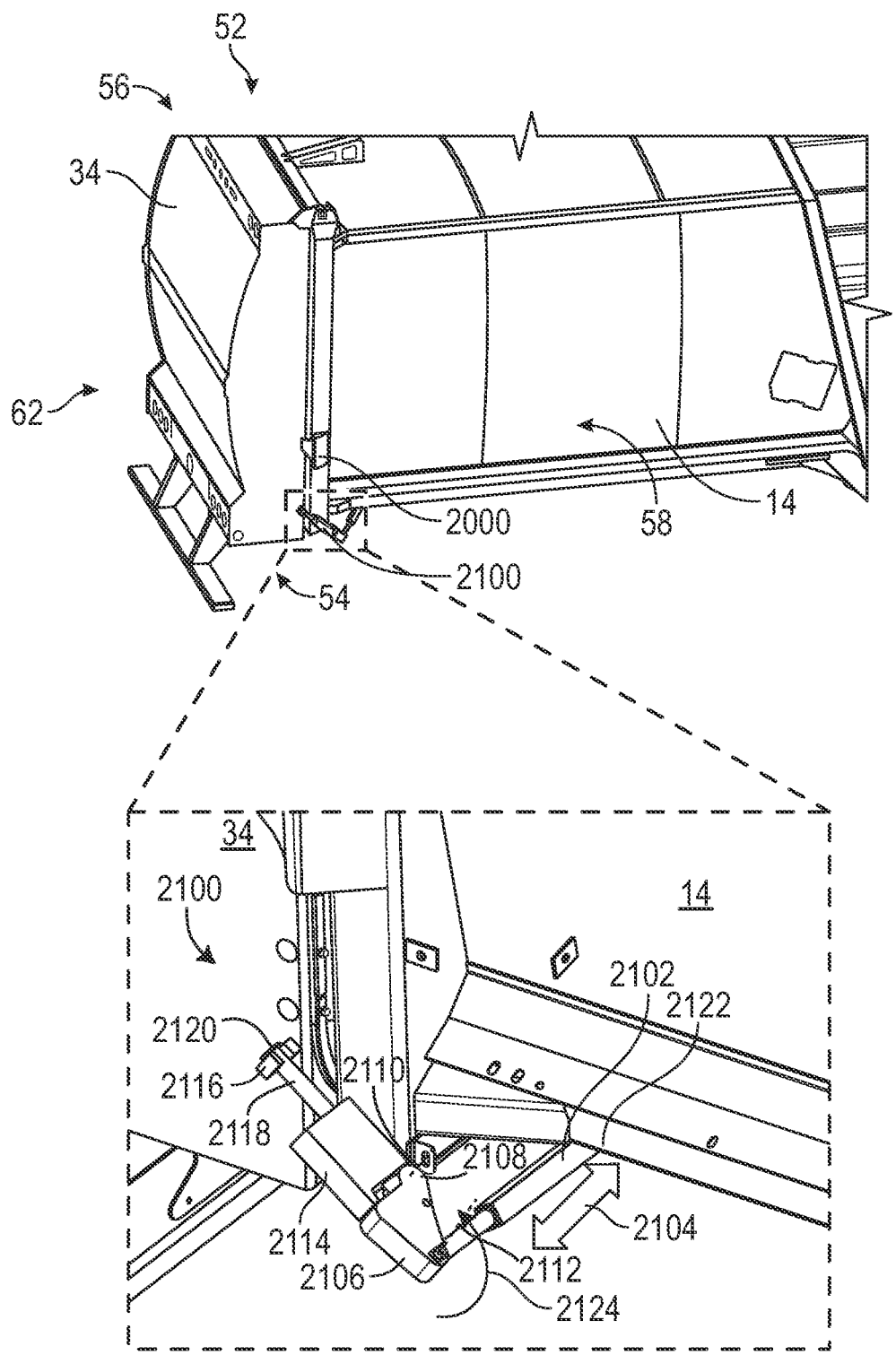
FIG. 21A is a perspective view of a portion of the refuse vehicle of FIG. 1 including a locking pin cam mechanism for locking the tailgate in the first position, according to an exemplary embodiment.

Referring particularly to FIG. 21A, refuse vehicle 10 can include a locking cam mechanism 2100 (e.g., a lock, a fully electric lock, etc.) that is configured to draw tailgate 34 towards body 14 and lock tailgate 34 in place (e.g., in the first position). Locking cam mechanism 2100 includes a linear electric actuator 2102, a cam member 2106, a stationary member 2114, a pin or elongated member 2118, and an engagement member 2116. Engagement member 2116 is fixedly coupled with tailgate 34 along a lateral side of tailgate 34. Engagement member 2116 is configured to receive an end of elongated member 2118 therethrough. Elongated member 2118 can include a capped end 2120 configured to abut, contact, or engage engagement member 2116 so that as elongated member 2118 translates, tailgate 34 is drawn into engagement with body 14.

Stationary member 2114 is fixedly coupled, fastened, or otherwise attached with a lateral side of body 14 (e.g., a structural support member). Stationary member 2114 includes a channel, a bore, a through-hole, etc., through which elongated member 2118 extends and slides. An end of elongated member 2118 that is opposite capped end 2120 can be received within a corresponding groove, recess, channel, etc., of cam member 2106. The end of elongated member 2118 that is received within cam member 2106 can be pinned so that cam member 2106 can pivot about an axis 2110 relative to elongated member 2118. In some embodiments, the end of elongated member 2118 is received within a recess of a cam portion 2108 of cam member 2106 that includes a rounded surface configured to engage a corresponding surface of stationary member 2114.

An outer end of linear electric actuator 2102 pivotally couples with a corresponding portion, corner, etc., of cam member 2106. Linear electric actuator 2102 can be attached or fixedly coupled with a structural member 2122 of body 14. In some embodiments, the outer end of linear electric actuator 2102 is configured to pivot about an axis 2112 relative to cam member 2106. Linear electric actuator 2102 can extend or retract (represented by arrow 2124) to drive cam member 2106 to pivot relative to elongated member 2118. Linear electric actuator 2102 can retract, thereby causing relative pivoting between cam member 2106 and linear electric actuator 2104 about axis 2112 (e.g., as represented by arrow 2124). Retraction of linear electric actuator 2102 causes cam member 2106 to also pivot relative to elongated member 2118 about axis 2110, thereby causing elongated member 2118 to translate or slide relative to stationary member 2114 and pull tailgate 34 into engagement with body 14. In some embodiments, tailgate 34 can be further compressed (e.g., by retraction of linear electric actuator 2102) or can be manually compressed (into engagement with body 14) to release locking cam mechanism 2100.

Figure 21B:
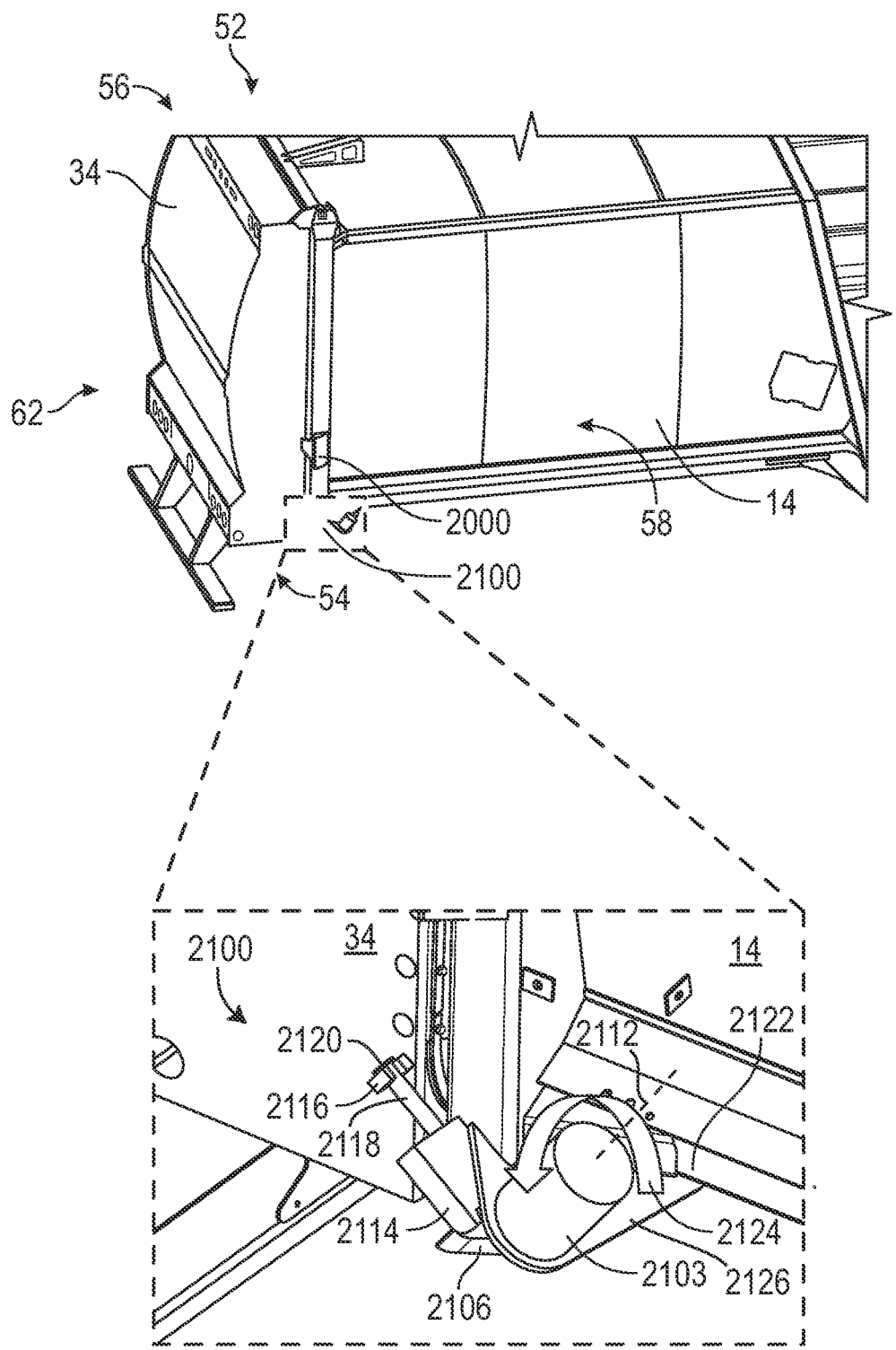
FIG. 21B is a perspective view of a portion of the refuse vehicle of FIG. 1 including the locking pin cam mechanism of FIG. 21A configured for use with an electric motor for locking the tailgate in the first position, according to an exemplary embodiment.

Referring particularly to FIG. 21B, locking cam mechanism 2100 (e.g., a lock, a fully electric lock, etc.) can include an electric motor 2103 that is configured to drive cam member 2106 to pivot relative to stationary member 2114 about axis 2112. In some embodiments, electric motor 2103 is fixedly coupled with a structural support member 2126 that is fixedly coupled with structural member 2122 of body 14. Locking cam mechanism 2100 shown in FIG. 21B can function similarly to locking cam mechanism 2100 as described in greater detail above with reference to FIG. 21A but using rotational kinetic energy generated by electric motor 2103 instead of linear electric actuator 2102.

Over-Centered T-Linkage Mechanism

Figure 22:
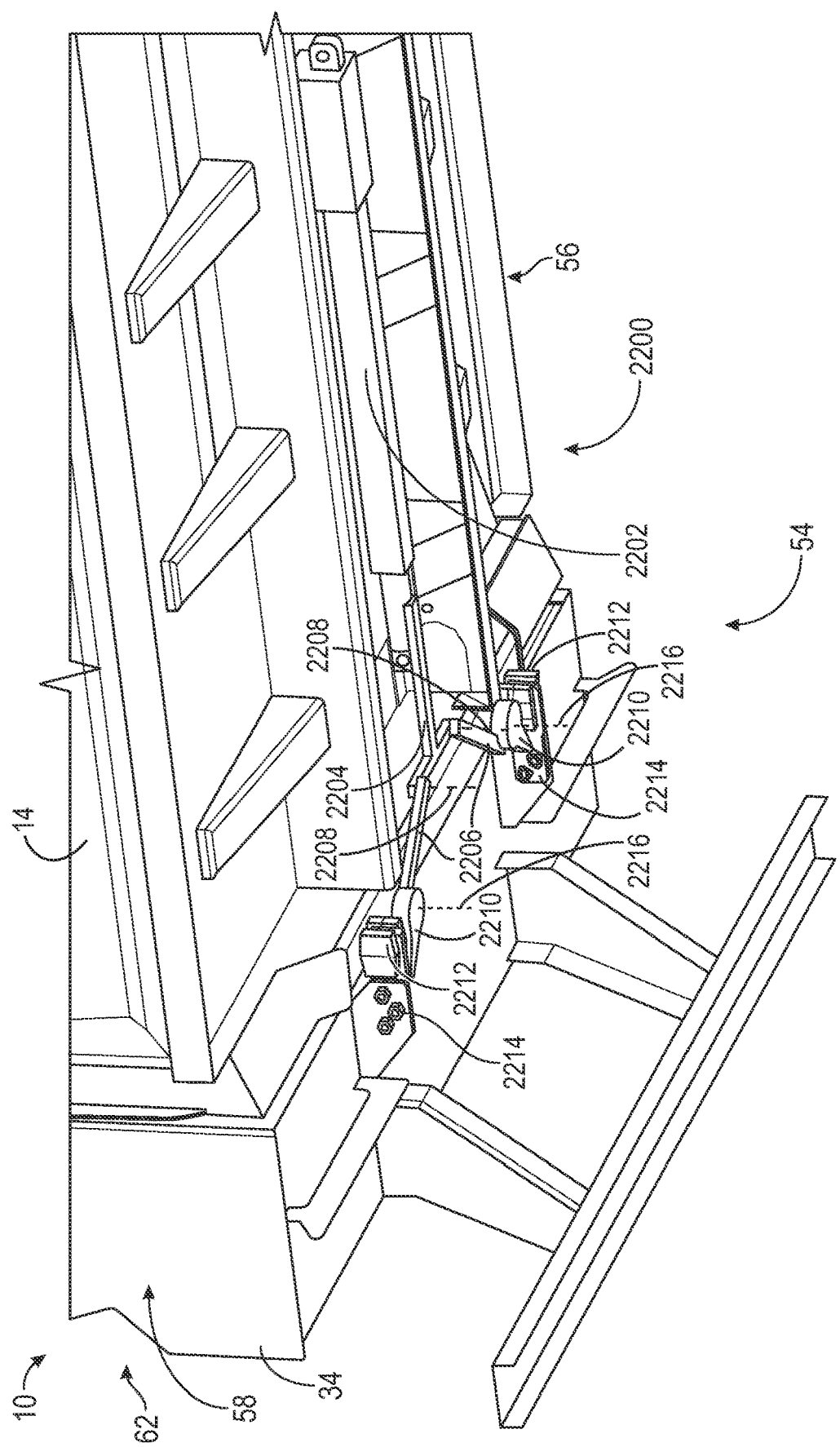
FIG. 22 is a perspective view of a portion of the refuse vehicle of FIG. 1 including an over-centered T-linkage lock mechanism for locking the tailgate in the first position, according to an exemplary embodiment.

Referring particularly to FIG. 22, refuse vehicle 10 can include an over-centered T-linkage lock mechanism 2200 (e.g., a lock, a fully electric lock, etc.) configured to lock tailgate 34 in the first position. T-linkage lock mechanism 2200 includes a linear electric actuator 2202 that is mounted or fixedly coupled on the bottom side 54 of body 14 of refuse vehicle 10. Linear electric actuator 2202 is configured to drive an inner member to extend or retract to transition tailgate 34 between the first position and the second position. A T-shaped linkage 2204 is fixedly coupled, attached, secured, fastened, integrally formed, welded, etc., with the inner member so that linear electric actuator 2202 drives T-shaped linkage 2204 to translate. T-shaped linkage 2204 is pivotally or rotatably coupled at opposite ends (e.g., at opposite ends of a flange of the T-shaped linkage 2204) with intermediate linkages 2206. Intermediate linkages 2206 can be pivotally or rotatably coupled with the ends of the flange of the T-shaped linkage 2204 so that intermediate linkages 2206 can rotate or pivot relative to T-shaped linkage 2204.

Intermediate linkages 2206 are fixedly coupled with engagement members 2210. Engagement members 2210 and/or intermediate linkages 2206 can be pivotally or rotatably coupled with the bottom side 54 of body 14. Engagement members 2210 can have tear-drop shapes and may include a protrusion, point, apex, etc., that is configured to engage corresponding locking members 2212. Locking members 2212 are fixedly coupled with the bottom side 54 of tailgate 34 and can include tracks, grooves, recesses, etc., configured to receive the apex or a corresponding portion of engagement members 2210 as engagement members pivot or rotate about axes 2216 relative to body 14, respectively.

In some embodiments, linear electric actuator 2202 includes a ball-screw and an electric motor. Operation of the electric motor drives linear electric actuator 2202 to extend or retract. Tailgate 34 may transition into the first position (shown in FIG. 22) when linear electric actuator 2202 is retracted. After tailgate 34 has transitioned into the first position, linear electric actuator 2202 can operate to extend to drive or pivot or move engagement members 2210 into engagement with locking members 2212 to secure tailgate 34 in the first position.

Claw Locks

Figure 23A:
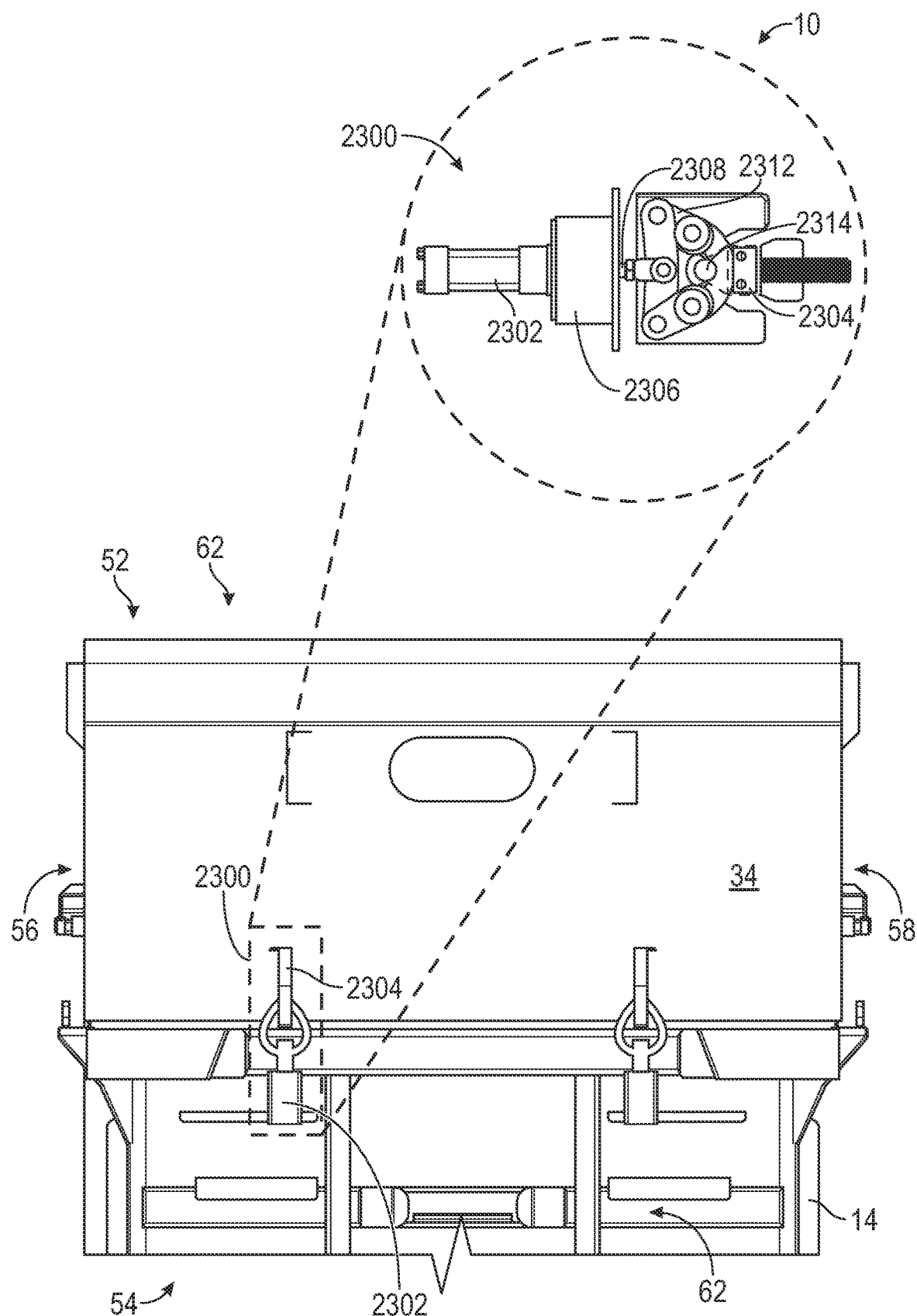
FIG. 23A is a bottom view of a portion of the refuse vehicle of FIG. 1 including a claw lock mechanism for locking the tailgate in the first position, according to an exemplary embodiment.

Referring particularly to FIG. 23A, refuse vehicle 10 can include a claw lock 2300 (e.g., a lock, a fully electric lock, etc.) that is configured to selectably transition between an engaged position or state (e.g., an open position) and a disengaged position or state (e.g., a closed position). Claw lock 2300 can be positioned on the bottom side 54 of refuse vehicle 10 (as shown in FIG. 23A), the top side 52 of refuse vehicle 10, the left side 56 of refuse vehicle 10, or the right side 58 of refuse vehicle 10 (shown in FIG. 23B).

Claw lock 2300 includes a claw mechanism 2302 and an engagement member 2304. Claw mechanism 2302 is configured to transition between an engaged position to grasp engagement member 2304 or a corresponding portion of engagement member 2304 and a disengaged or open position to release engagement member 2304. When claw mechanism 2302 is in the engaged position, tailgate 34 is limited from rotating between the first position and the second position. When claw mechanism 2302 is in the disengaged or open position, tailgate 34 is free to rotate or move between the first position and the second position.

Claw mechanism 2302 can be fixedly coupled, attached, secured, welded, fastened, etc., with body 14, while engagement member 2304 is fixedly coupled, attached, secured, welded, fastened, etc., with tailgate 34. Claw mechanism 2302 includes an actuator 2306 (e.g., a linear electric actuator, a hydraulic actuator, a pneumatic actuator, etc.) that is configured to drive an elongated member, translatable member, etc., shown as rod 2308 to extend or retract. Rod 2308 is coupled with one or more hinged claw members 2312 to drive the hinged claw members 2312 to pivot relative to each other. Hinged claw members 2312 may form a claw linkage that can be transitioned between the engaged position and the disengaged position to grasp a pin 2314 of engagement member 2304 to thereby limit rotation or movement of tailgate 34.

Figure 23B:
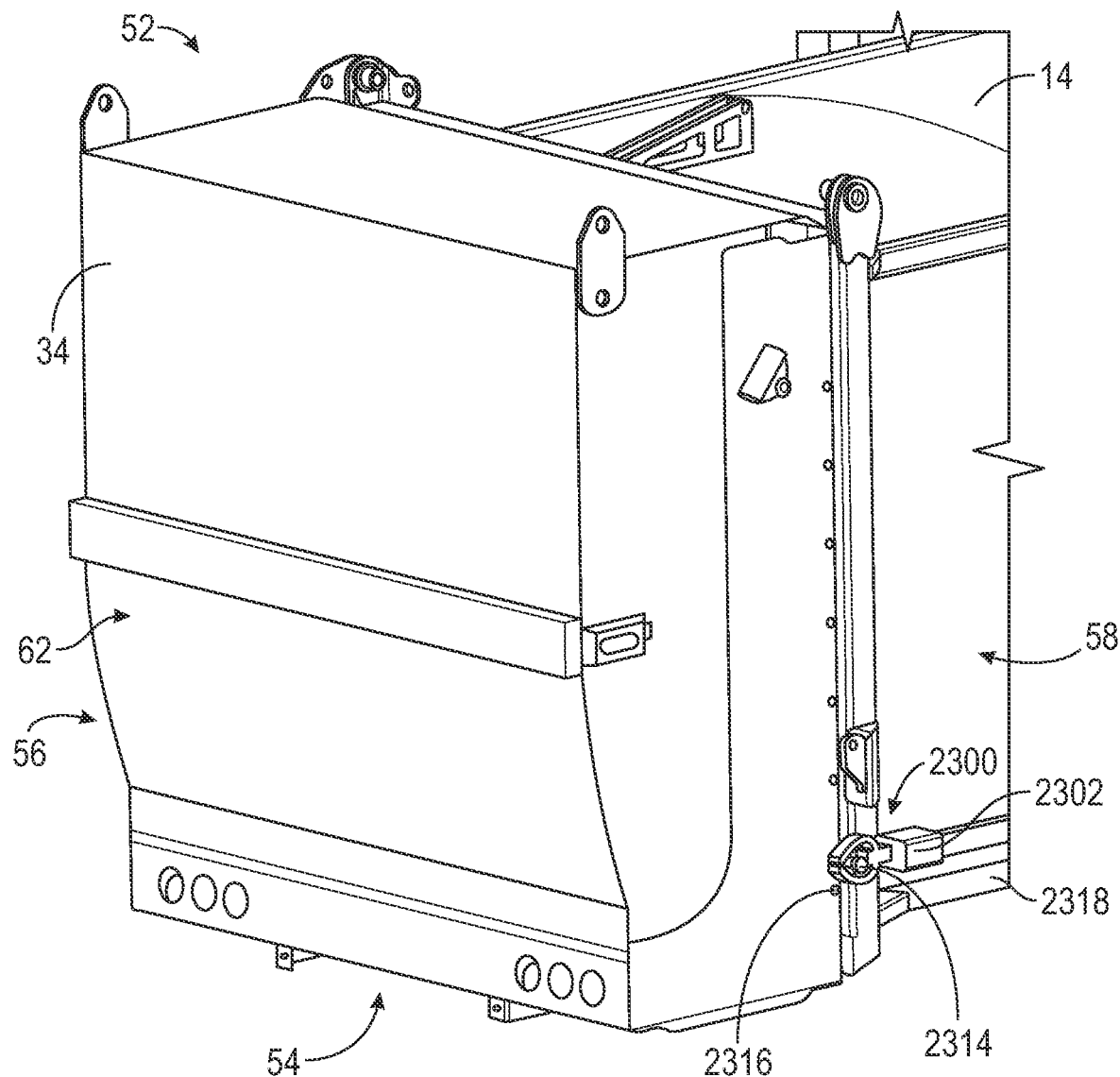
FIG. 23B is a perspective view of a portion of the refuse vehicle of FIG. 1 including the claw lock mechanism of FIG. 23A positioned along a side of the refuse vehicle, according to an exemplary embodiment.

Referring particularly to FIG. 23B, claw lock 2300 can be positioned on right side 58 of refuse vehicle 10, or on left side 56 of refuse vehicle 10, or on both the right side 58 and the left side 56 of refuse vehicle 10. In some embodiments, multiple claw locks 2300 are positioned along the right side 58 or the left side 56 of refuse vehicle 10. Claw mechanism 2302 can be fixedly coupled on the right side 58 of refuse vehicle 10 proximate the bottom side 54 of refuse vehicle 10 (e.g., along a longitudinally extending frame or rail member 2318). Pin 2314 may be fixedly coupled with tailgate 34 along an inner edge 2316 of tailgate 34.

Door Locks

Referring particularly to FIG. 24, refuse vehicle 10 can include one or more door locks 2400 (e.g., locks) that are configured to lock tailgate 34 in the first position (e.g., the closed position). Tailgate 34 can be configured as a set of swinging doors 2404 that are positioned at rear 62 of body 14 and pivotally or rotatably couple with body 14. In some embodiments, tailgate 34 includes a set of swinging doors 2404 that are positioned at rear 62 of tailgate 34 and are pivotally or rotatably coupled with tailgate 34.

Door locks 2400 include a bar, a beam, a rod, a tubular member, etc., shown as rod 2402 that extends between a top and bottom structural member 2406 of tailgate 34. Rod 2402 is pivotally coupled with door 2404 at mounts 2418. Rod 2402 can extend through an aperture or opening of mount 2418 and may be configured to rotate or pivot within mount 2418. Rod 2402 can also be configured to translate or move relative to mount 2418. In some embodiments, rod 2402 includes a step, a shoulder, a radial protrusion, an annular protrusion, etc., that is configured to engage a corresponding surface of mount 2418 (e.g., a top surface of mount 2418) to limit translation of rod 2402.

Door lock 2400 also includes a receiving member 2416 that is fixedly coupled with a structural member 2406 (e.g., of tailgate 34) that door 2404 rotates or pivots relative to. Receiving member 2416 can include an opening, a bore, an aperture, etc., configured to receive a bottom end of rod 2402. Receiving member 2416 may be positioned or aligned along structural member 2406 to receive the bottom end of rod 2402, thereby limiting rotation of door 2404 and locking door 2404 in the closed position.

Door lock 2400 includes a handle 2408 that is fixedly coupled with rod 2402. A user may manually grasp handle 2408 and drive rod 2402 to pivot about its central axis and/or to translate rod 2402 relative to mount 2418. Handle 2408 is configured to be swung (e.g., by a user) into engagement with an engagement member 2410. Engagement member 2410 is fixedly coupled with door 2404 and includes a pivotal member 2412 that is pivotally coupled with engagement member 2410 or door 2404 through pin 2414. A user may grasp handle 2408, pivot pivotal member 2412 out of engagement with handle 2408, and lift and/or rotate handle 2408 and rod 2402 out of engagement with engagement member 2410 and receiving member 2416. In some embodiments, door handle 2408 is pivotally coupled with rod 2402 through a pin 2420. Engagement member 2410 can include a groove, a channel, a depression, a recess, etc., configured to receive a side of handle 2408 that is opposite pivotal member 2412.

Twist Locks

Figure 25:
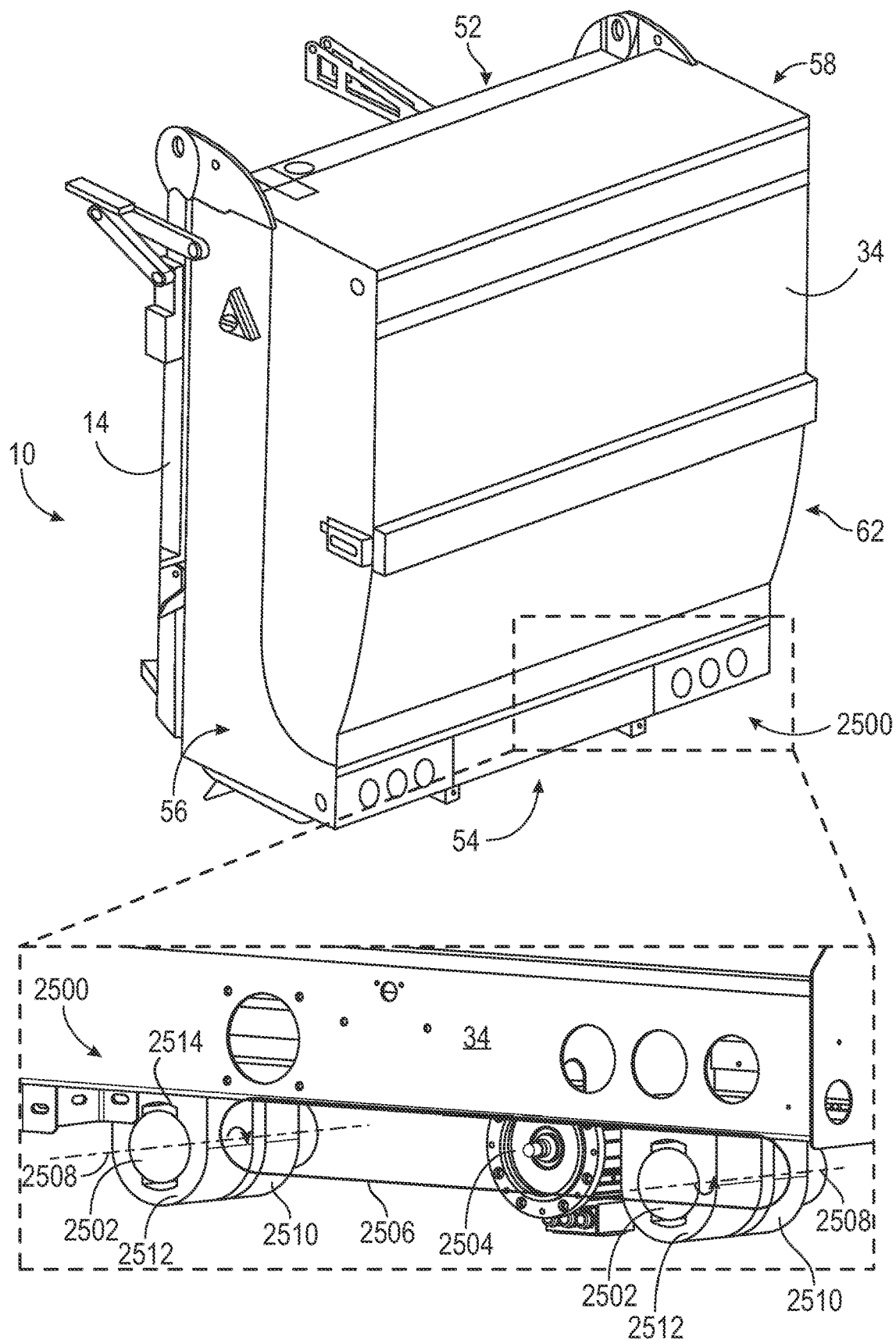
FIG. 25 is a perspective view of a portion of the refuse vehicle of FIG. 1 including a twist lock mechanism configured to lock the tailgate in the first position, according to an exemplary embodiment.

Referring particularly to FIG. 25, refuse vehicle 10 can include a twist lock mechanism 2500 (e.g., a lock, a fully electric lock, etc.) configured to limit rotation or movement of tailgate 34 (e.g., between the first position and the second position). Twist lock mechanism 2500 can be positioned on the bottom side 54 of tailgate 34 and body 14. Twist lock mechanism 2500 includes first body members 2512 that are fixedly coupled with the bottom side 54 of tailgate 34 and second body members 2510 that are fixedly coupled with the bottom side 54 of body 14. As tailgate 34 transitions between the first position and the second position relative to body 14, first body members 2512 may move or swing with tailgate 34. First body members 2512 can be positioned a lateral distance apart along the bottom side 54 of tailgate 34. Likewise, second body members 2510 can be positioned an equal lateral distance apart along the bottom side 54 of body 14.

When tailgate 34 transitions into the first position (shown in FIG. 25), first body members 2512 may align with second body members 2510 along common axes 2508. First body members 2512 each include an opening, an aperture, a cavity, etc., shown as opening 2514. Opening 2514 may extend through an entire thickness of first body members 2512 and can include threads along particular angular portions. Opening 2514 may define a pair of inner surfaces that are opposite each other (e.g., across a 45 degree angular sweep) and include threads. Opening 2514 may also include a top and a bottom channel where threads are not formed. In this way, first body member 2512 includes interrupted threads that are angularly positioned on opposite sides of opening 2514 (e.g., 180 degrees from each other) and sweep across 45 degrees.

Twist lock mechanism 2500 also includes quarter turn fasteners, shown as engagement members 2502. Engagement members 2502 may be cylindrical fasteners that include threads along only two portions (e.g., interrupted threads). Engagement members 2502 extend centrally along axes 2508. For example, engagement members 2502 can include two surfaces that are oriented 180 degrees apart from each other about axis 2508. Each of the two surfaces include threads across a 45 degree sweep.

Engagement members 2502 may each be rotatably coupled with a corresponding one of second body members 2510 and translationally fixedly coupled with the corresponding one of second body members 2510. In some embodiments, second body members 2510 each include an opening, an aperture, a channel, a bore, a hole, a through-hole, etc., configured to receive the corresponding engagement member 2502 therethrough. Engagement members 2502 may define the axes 2508.

Engagement members 2502 can be driven to rotate (e.g., 45 degrees about axes 2508) by an electric motor 2504 that drives engagement members 2502 through a belt, a chain, a tensile member, shown as power transmitting band 2506. Electric motor 2504 can be fixedly coupled and positioned on the bottom side 54 of body 14.

Engagement members 2502 can be transitioned between a disengaged position and an engaged position. In some embodiments, transitioning the engagement members 2502 between the disengaged position and the engaged position includes driving engagement members 2502 to rotate about axes 2508 (e.g., through operation of electric motor 2504) 45 degrees. When engagement members 2502 are in the disengaged position, the interrupted threads positioned on opposite sides of engagement members 2502 may be oriented vertically or otherwise aligned with the top and bottom channels of first body members 2512 (or left and right channels of first body members 2512, or any other channels or portions of first body members 2512 that do not include threads). Engagement members 2502 can be transitioned into the disengaged position and tailgate 34 can be transitioned into the first position (shown in FIG. 25). When tailgate 34 is transitioned into the first position, engagement members 2502 are received through the openings 2514, with the interrupted threads of engagement members 2502 aligned with portions or channels of openings 2514 that do not include threads or interlocking features. After tailgate 34 is transitioned into the first position (e.g., the closed position), engagement members 2502 can each be rotated 45 degrees (e.g., a quarter turn) about the corresponding axis 2508 so that the threaded portions of engagement members 2502 engage the threaded surfaces of first body members 2512 (e.g., through operation of electric motor 2504), thereby limiting movement, rotation, or transition of tailgate 34 between the first position and the second position. When it is desired for tailgate 34 to be transitioned out of the first position and into the second position, engagement members 2502 can each be rotated about the corresponding axis 2508 so that the threads of engagement members 2502 are aligned with the channels of openings 2514 (e.g., rotated out of engagement with the inner threads of first body members 2512) so that tailgate 34 is free to translate, rotate, or otherwise transition out of the first position.

It should be understood that while engagement members 2502 are described herein as including threads that are configured to engage corresponding inner threads of first body members 2512 when rotated a quarter turn, any other interlocking feature, protrusion, extension, channel, etc., may be used in place of threads. For example, engagement members 2502 can include hooks that are configured to be driven into engagement with a corresponding groove, recess, inner surface, inner geometry, etc., of first body members 2512 when engagement members 2502 are rotated a quarter turn (or a half turn, or any other angular amount depending on the configuration and angular positioning of said interlocking features).

Figure 26:
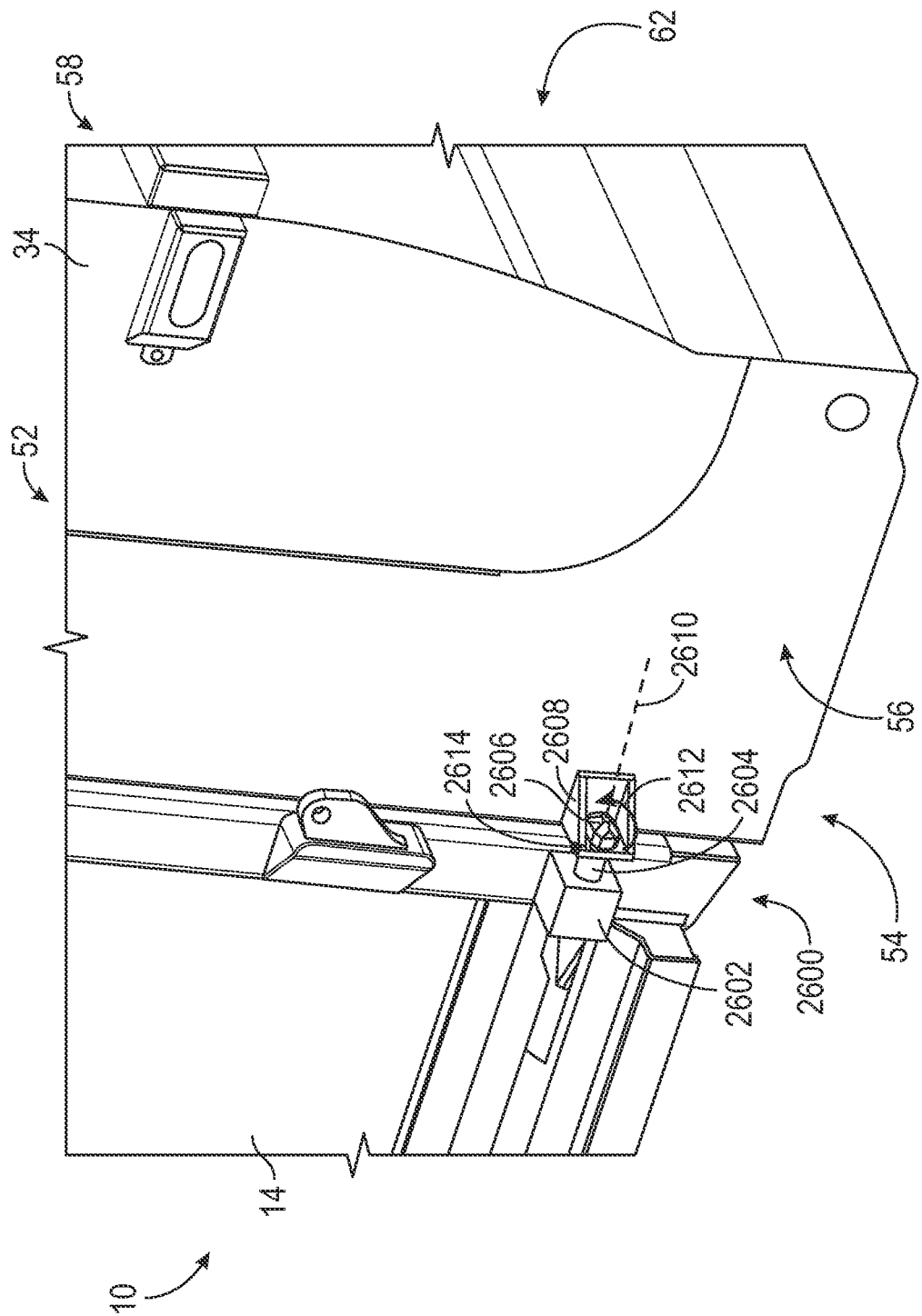
FIG. 26 is a perspective view of a portion of the refuse vehicle of FIG. 1 including another twist lock mechanism for locking the tailgate in the first position, according to an exemplary embodiment.

Referring particularly to FIG. 26, refuse vehicle 10 can include another twist lock mechanism 2600 (e.g., a lock, a fully electric lock, etc.). Twist lock mechanism 2600 includes a structural member 2602 that is fixedly coupled with a lateral side of body 14 at rear 62 of body 14. Structural member 2602 may be fixedly coupled, mounted, or secured with left side 56 of body 14 or may be positioned on right side 58 of body 14. Structural member 2602 is pivotally or rotatably coupled with an engagement member 2604 that protrudes rearwards beyond a rear edge, surface, face, periphery, or end of body 14. Engagement member 2604 can include a pin portion and an engagement portion 2606 that is integrally formed or otherwise fixedly coupled with an end of the pin portion. Engagement portion 2606 can have an elliptical cross-sectional shape. Engagement member 2604 defines an axis 2610 about which engagement member 2604 may rotate, pivot, or turn.

Twist lock mechanism 2600 includes a bracket, flange member, or a receiving member, 2608 that is fixedly coupled with tailgate 34. Receiving member 2608 includes an aperture 2614 that is configured to receive the end of engagement member 2604 therethrough. Aperture 2614 may have a shape that corresponds to the shape of engagement portion 2606 of engagement member 2604.

Engagement member 2604 is transitionable or rotatable between a first angular position (e.g., a locked or engaged position, shown in FIG. 26) and a second angular position (e.g., an unlocked or disengaged position). Engagement member 2604 can be transitioned between the first angular position and the second angular position to limit rotation or movement of tailgate 34 by rotation of engagement member 2604 45 degrees about axis 2610. Engagement member 2604 can be transitioned into the second position so that engagement member 2604 is oriented or aligned to pass through aperture 2614. Tailgate 34 may then be transitioned from the second position into the first position so that tailgate 34 engages body 14. As tailgate 34 is transitioned into the first position (shown in FIG. 26), engagement member 2604 may pass through the aperture 2614. When tailgate 34 is transitioned into the first position, engagement portion 2606 is positioned within receiving member 2608. Engagement member 2604 can then be transitioned into the first angular position (e.g., by rotating engagement member 2604 45 degrees about axis 2610 in direction 2612) so that engagement portion 2606 engages a corresponding surface, face, portion, etc., of receiving member 2608 (e.g., so that engagement member 2604 is aligned such that engagement portion 2606 can not be translated through aperture 2614). When engagement portion 2606 extends through aperture 2614 and is in the first angular position, movement or rotation of tailgate 34 is limited.

Twist lock mechanism 2600 can include an electric motor (e.g., positioned within structural member 2602) that is configured to drive engagement member 2604 to rotate about axis 2610, thereby limiting movement of tailgate 34 in the closed position.

Figure 27:
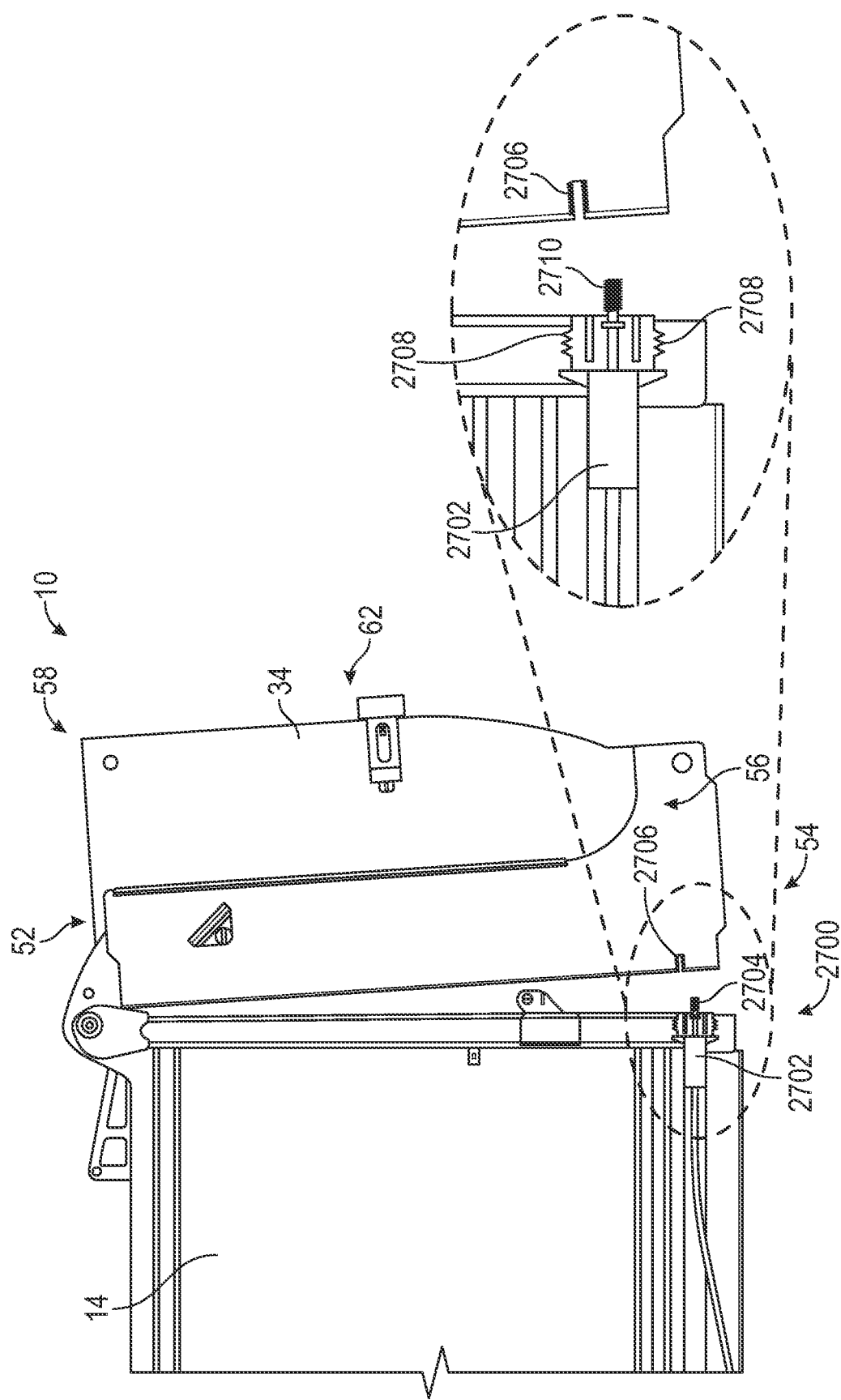
FIG. 27 is a side view of a portion of the refuse vehicle of FIG. 1 including another twist lock mechanism for locking the tailgate in the first position, according to an exemplary embodiment.

Referring particularly to FIG. 27, refuse vehicle 10 can include another twist lock mechanism 2700 (e.g., a lock, a fully electric lock, etc.). Twist lock mechanism 2700 is positioned at the rear 62 of body 14 and includes an electric motor 2702 that is fixedly coupled with body 14. Electric motor 2702 is configured to drive a threaded member 2710 that is configured to threadingly engage or couple with a corresponding set of inner threads 2706 of a bore of tailgate 34. When tailgate 34 transitions into the first position, electric motor 2702 can drive the threaded member 2710 to rotate so that threaded member 2710 engages the inner threads 2706 of the bore of the tailgate 34, thereby drawing tailgate 34 into engagement with body 14 and securing tailgate 34 in the second position. In some embodiments, twist lock mechanism 2700 includes springs 2708 that are mounted to the electric motor 2702 and are configured to pre-load threaded member 2710. Springs 2708 can facilitate engagement between threaded member 2710 and inner threads 2706 of the bore of tailgate 34 even when threaded member 2710 and inner threads 2706 are mis-aligned. In some embodiments, inner threads 2706 are formed along an inner surface or an inner periphery of a through hole or a bore that extends entirely through tailgate 34 to facilitate reducing debris buildup.

Rack and Pinion Lock

Referring particularly to FIG. 28, refuse vehicle 10 can include a rack and pinion lock 2800 (e.g., a lock, a fully electric lock, etc.). Rack and pinion lock 2800 includes a rack 2806 and a pinion 2802. Pinion 2802 can be driven by an electric motor and is configured to engage rack 2806. Rack 2806 is fixedly coupled with tailgate 34 (e.g., through a structural member 2808 that is fixedly coupled with the bottom 54 of tailgate 34). Pinion 2802 is fixedly coupled with body 14 (e.g., through structural member 2804).

When tailgate 34 transitions into the first position (shown in FIG. 28), pinion 2802 may engage the rack 2806. The electric motor 2810 can drive pinion 2802 to tighten engagement between tailgate 34 and body 14 and maintain tailgate 34 in the first position. In some embodiments, the electric motor 2810 includes a brake 2812 that is configured to transition between a locked position (e.g., to limit rotation of the electric motor 2810 and pinion 2802) and an unlocked position (e.g., to allow rotation of the electric motor 2810 and pinion 2802). In some embodiments, electric motor 2810 is rotatably coupled with pinion 2802 through a clutch that is transitionable between an engaged state (e.g., to rotatably fixedly couple electric motor 2810 with pinion 2802) and a disengaged state (e.g., to allow relative rotation between electric motor 2810 and pinion 2802). When tailgate 34 is closed, pinion 2802 may be free to rotate (e.g., by disengaging the clutch, or by allowing pinion 2802 to back-drive electric motor 2810 when the clutch is engaged). After tailgate 34 is transitioned into the closed position, electric motor 2810 may drive pinion 2802 to drive tailgate 34 into tighter engagement with body 14. After tailgate 34 is fully transitioned into the first or closed position, the brake 2812 may be engaged to limit movement of tailgate 34 or to secure tailgate 34 in the first position.

Hook and Latch Lock

Figure 29:
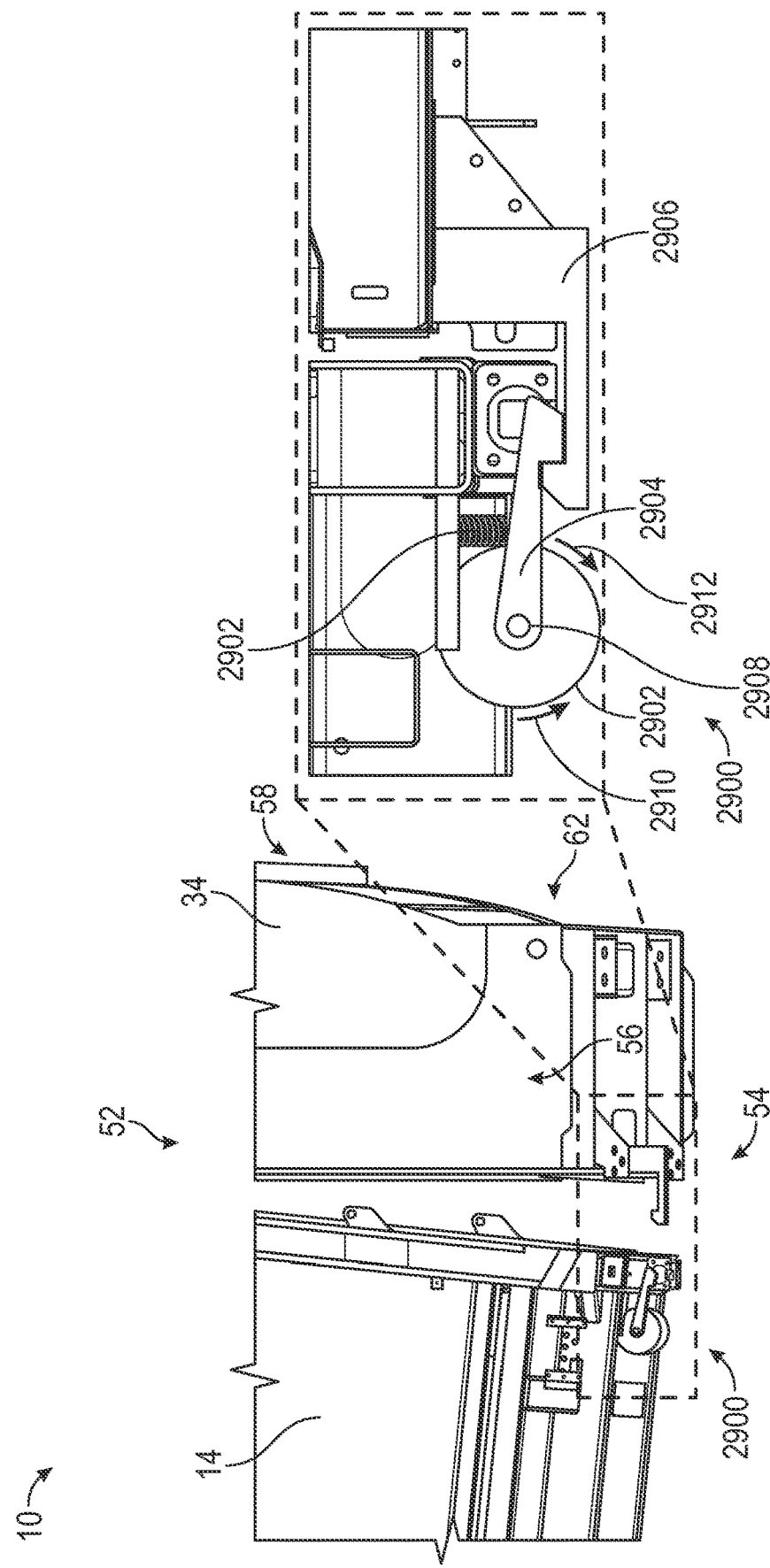
FIG. 29 is a side view of a portion of the refuse vehicle of FIG. 1 including an interlocking latch mechanism for locking the tailgate in the first position, according to an exemplary embodiment.

Referring particularly to FIG. 29, refuse vehicle 10 can include a hook and latch lock mechanism 2900 (e.g., a lock, a fully electric lock, etc.). Hook and latch mechanism 2900 includes a first hook member 2904 that is pivotally coupled with body 14 at pin 2908 (e.g., at bottom 54 of refuse vehicle 10) and a second hook member 2906 that is fixedly coupled with tailgate 34 (e.g., at bottom 54 of tailgate 34). Hook and latch mechanism 2900 also includes a spring 2902 (e.g., a torsional spring, a compressive spring, a tension spring, etc.) that is configured to bias first hook member 2904 to rotate about pin 2908 in direction 2912. First hook member 2904 and second hook member 2906 can have chamfered or sloped ends that are configured to slidably couple with each other as tailgate 34 moves into the first position.

When tailgate 34 moves into the first position, the sloped ends of first hook member 2904 and second hook member 2906 slidably couple with each other and drive first hook member 2904 to rotate about pin 2908 in direction 2910. Once tailgate 34 is fully in the first position, torque exerted by spring 2902 drives first hook member 2904 to snap into engagement with second hook member 2906, thereby securing tailgate 34 in the first position.

Electric motor 2902 can be configured to drive first hook member 2904 to rotate about pin 2908 in direction 2910, thereby disengaging first hook member 2904 from second hook member 2906. When tailgate 34 is transitioned out of the first position and into the second position, electric motor 2902 can operate to rotate first hook member 2904 to rotate about pin 2908 relative to body 14 in direction 2910, thereby disengaging first hook member 2904 from second hook member 2906 and allowing movement of tailgate 34 (e.g., into the second position).

Hook and Pin Lock

Figure 30:
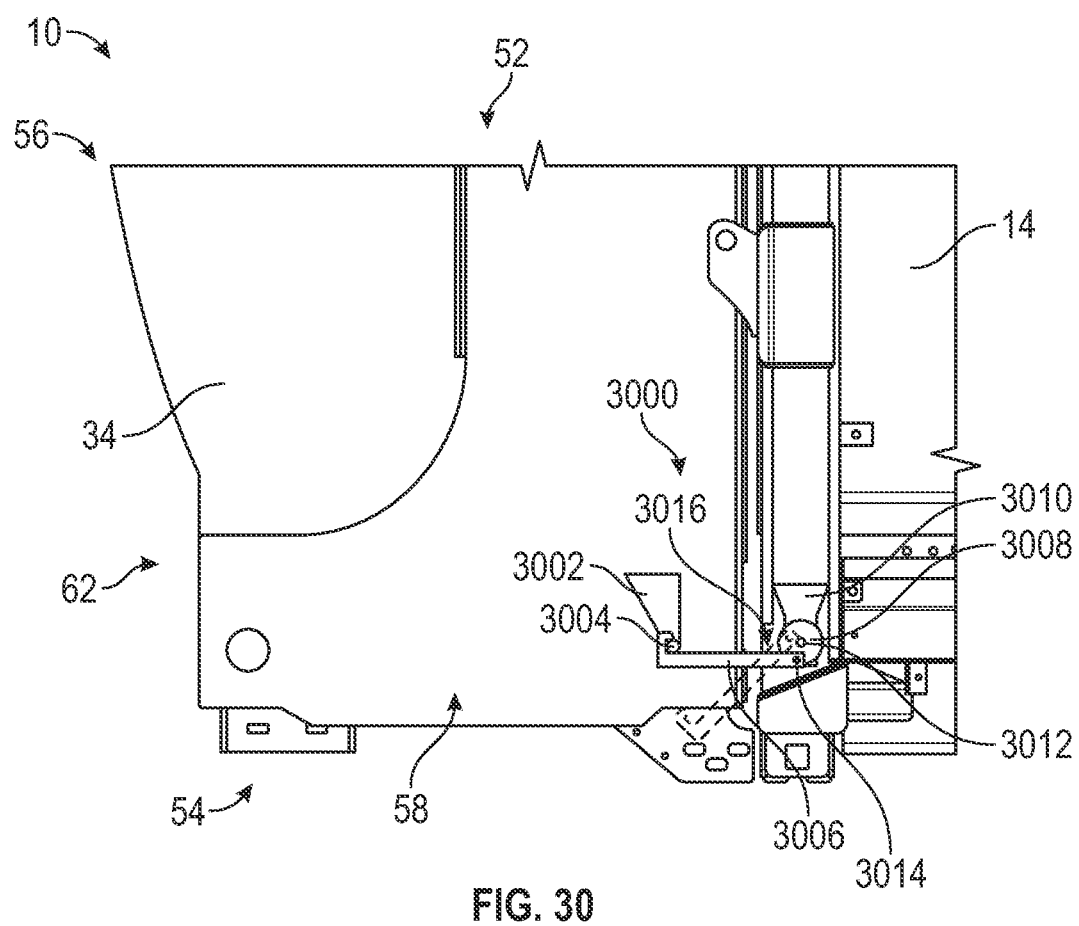
FIG. 30 is a side view of a portion of the refuse vehicle of FIG. 1 including a latch and pin mechanism for locking the tailgate in the first position, according to an exemplary embodiment.

Referring particularly to FIG. 30, refuse vehicle 10 can include a hook and pin mechanism 3000 (e.g., a lock, a fully electric lock, etc.) for locking tailgate 34 (e.g., in the first position as shown). Hook and pin mechanism 3000 includes a structural member 3002 that is fixedly coupled with tailgate 34 (e.g., with a lateral side of the tailgate 34) and includes a pin 3004. Pin 3004 can extend outwards from the side of tailgate 34 in the lateral direction and is fixedly coupled with the structural member 3002.

Hook and pin mechanism 3000 also includes a hook member 3006 that is fixedly coupled with or configured to be driven by an electric motor 3008. Electric motor 3008 is mounted or otherwise fixedly coupled with body 14 through a structural member 3010 at the rear 62 of body 14. Electric motor 3008 may drive the hook member 3006 to swing about an axis 3012 between a first angular position (e.g., an unlocked or disengaged position) and a second angular position (e.g., a locked or engaged position, as shown in FIG. 30).

When tailgate 34 is in the second angular position, electric motor 3008 can operate to swing hook member 3006 about axis 3012 or maintain hook member 3006 in the second angular position (shown in dashed lines). Hook member 3006 may be pinned with electric motor 3008 at a position radially offset from a drive axis of electric motor 3008, shown as pin 3014 and can rotate or pivot relative to an output drive shaft of electric motor 3008 about pin 3014.

Tailgate 34 may then be transitioned into the first position (shown in FIG. 30). Once tailgate 34 is transitioned into the first position, electric motor 3008 can operate to drive hook member 3006 into the first angular position to engage pin 3004, thereby securing tailgate 34 in the first position. In some embodiments, hook and pin mechanism 3000 is a side rotary latch. Hook member 3006 may be constrained to a particular path of motion or rotation through a slider 3016 that slides along a track of body 14.

Linear Latch

Figure 31:
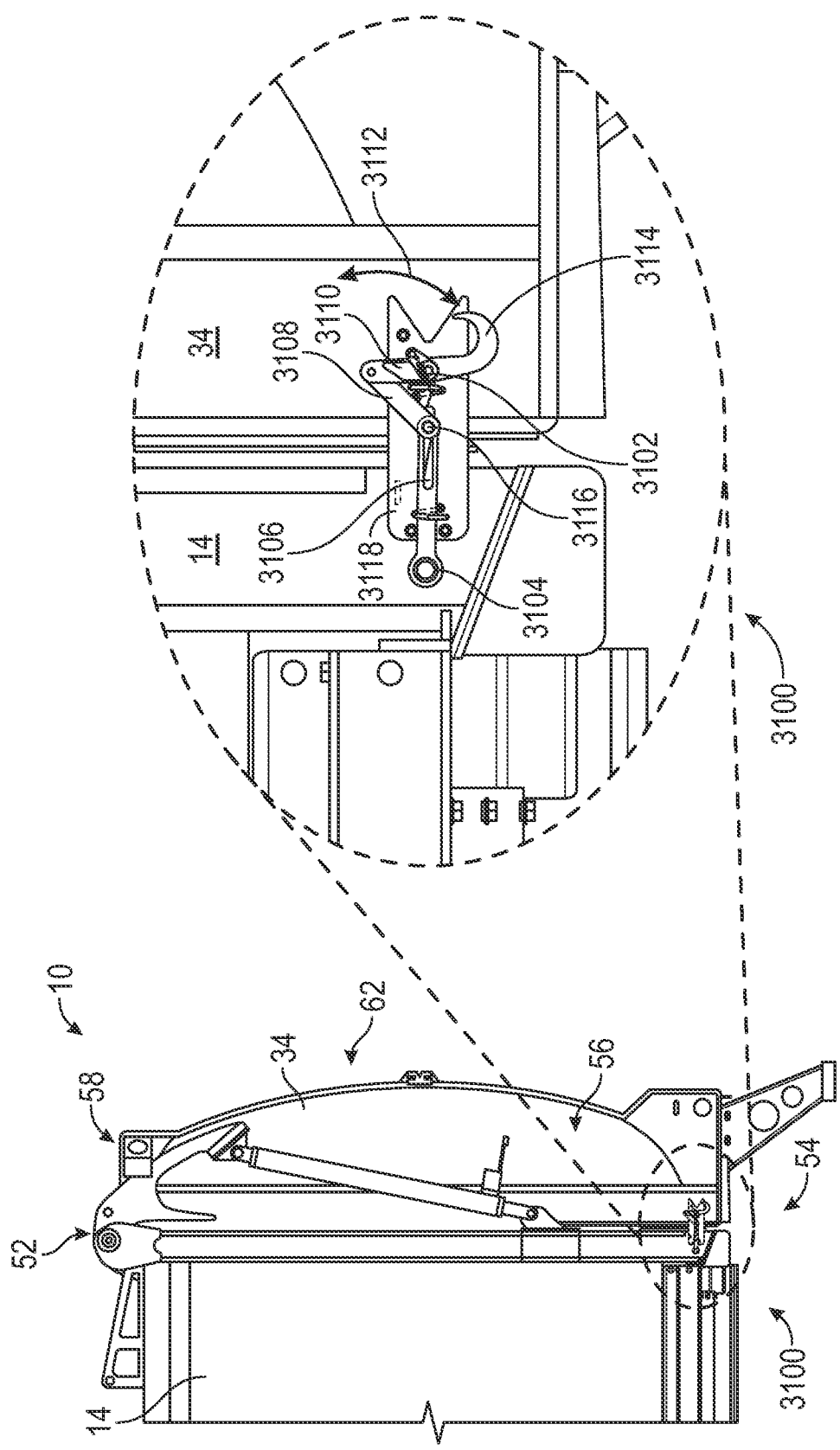
FIG. 31 is a side view of a portion of the refuse vehicle of FIG. 1 including a linear latch mechanism for locking the tailgate in the first position, according to an exemplary embodiment.

Referring particularly to FIG. 31, refuse vehicle 10 can include a linear latch mechanism 3100 (e.g., a lock, a fully electric lock, etc.) that is configured to selectably secure tailgate 34 in the first or closed position. Linear latch mechanism 3100 is configured to receive translational motion from a linear electric actuator (e.g., a ball screw actuator). Linear latch mechanism 3100 includes a translatable member 3104 including an eyelet at a first end that is configured to receive the translational motion of the linear electric actuator and cause translatable member 3104 to translate.

Linear latch mechanism 3100 can be positioned on a lateral side of body 14 and may include a hook member 3114 configured to be driven to pivot (represented by arrow 3112) to engage a corresponding member, portion, or geometry of tailgate 34 when tailgate 34 is in the first position, to thereby secure tailgate 34 in the first position. Linear latch mechanism 3100 includes a pin 3116 that is configured to slidably couple or translate along a groove 3106 of a body 3118. Body 3118 is fixedly coupled with rear 62 of body 14 of refuse vehicle 10 and may protrude or extend behind a rearmost surface or edge of body 14. Translatable member 3104 can be fixedly coupled with pin 3116 at an outer end of translatable member 3104 (e.g., an end of translatable member 3104 that is opposite the end that receives the translational motion).

Linear latch mechanism 3100 includes a first linkage 3108 that is pivotally or rotatably coupled with translatable member 3104 through pin 3116 at a first end and pivotally or rotatably coupled with a second linkage 3110 at a second, opposite, or distal end. Second linkage 3110 can be pivotally or rotatably coupled with body 3118. Second linkage 3110 and hook member 3114 can be integrally formed or fixedly coupled with each other. In this way, translation of translational member 3104 drives rotation of first linkage 3108 relative to translational member 3106 about pin 3116, and drives rotation of second linkage 3110 and hook member 3114 relative to body 3118 (e.g., about the pivotal coupling between hook member 3114 and second linkage 3110 and body 3118).

In some embodiments, second linkage 3110 and hook member 3114 are selectably pivotally coupled in at least one rotational direction through a selector 3102. Selector 3102 may be manually transitioned between an engaged and a disengaged position to pivotally de-couple hook member 3114 from second linkage 3110.

The linear electric actuator can be operated to retract, thereby drawing translational member 3104, and causing hook member 3114 to pivot relative to body 3118 in direction 3112. The linear electric actuator can be operated to extend, thereby pushing translational member 3104 and causing hook member 3114 to pivot relative to body 3118 in a direction opposite direction 3112. The linear electric actuator can be operated to pivot hook member 3114 in either direction between a first angular position (e.g., a locked or engaged position) and a second angular position (e.g., an unlocked or a disengaged position). When hook member 3114 is in the first angular position, hook member 3114 may engage, or releasably fixedly couple with a corresponding post, protrusion, hook, pin, etc., that is fixedly coupled on tailgate 34 to lock tailgate 34 in the first position.

Trunk Latch

Figure 32:
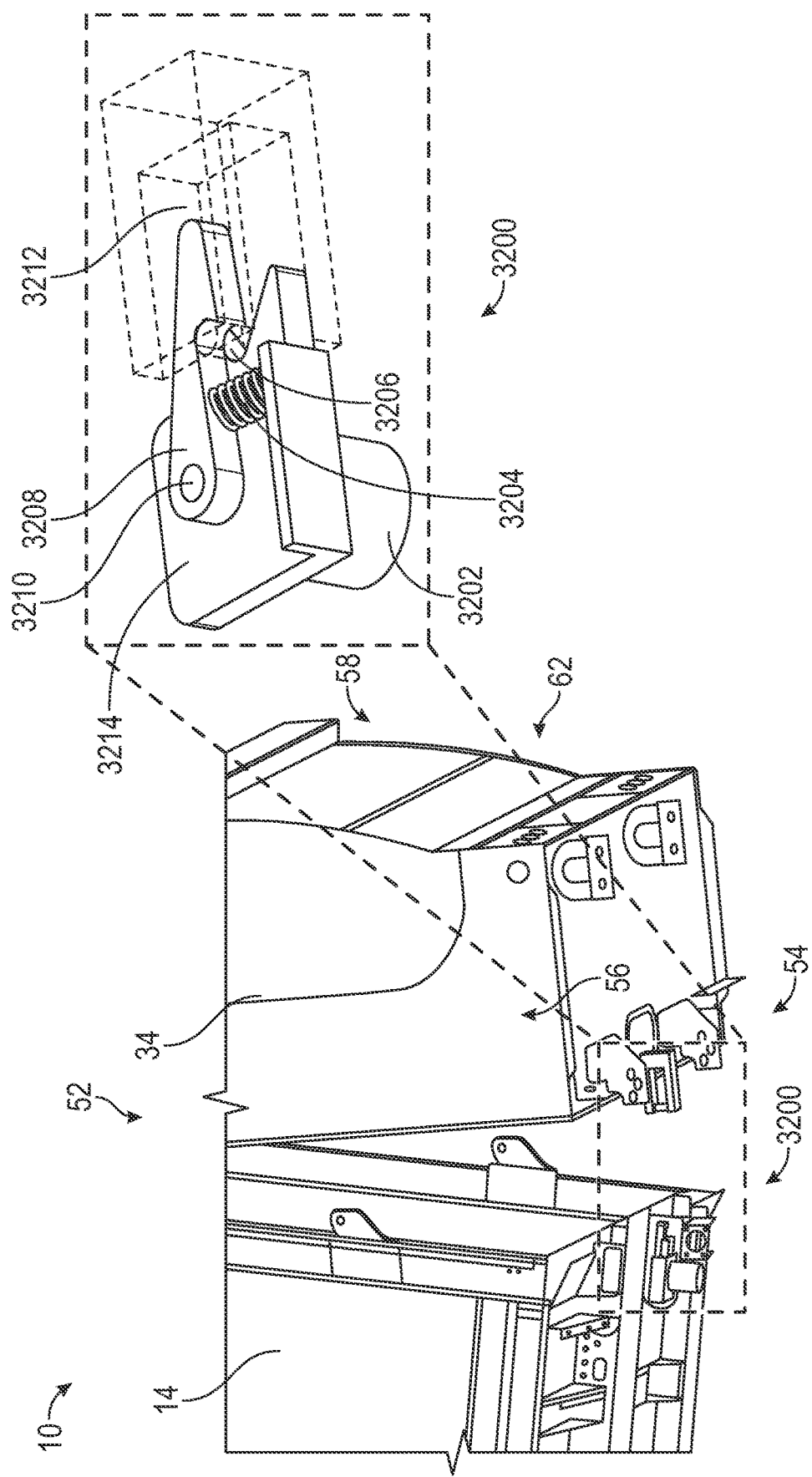
FIG. 32 is a side view of a portion of the refuse vehicle of FIG. 1 including a trunk latch for locking the tailgate in the first position, according to an exemplary embodiment.

Referring particularly to FIG. 32, refuse vehicle 10 can include a spring-loaded trunk-style latch 3200 (e.g., a lock, a fully electric lock, etc.) for securing tailgate 34 in the first position. Spring-loaded latch 3200 includes a first structural member 3214 that is fixedly coupled with body 14 of refuse vehicle (e.g., on bottom 54 of body 14) and a second structural member 3212 that is fixedly coupled with tailgate 34 of refuse vehicle 10 (e.g., on the bottom 54 of tailgate 34).

Spring-loaded latch 3200 includes a latch member 3208 (e.g., a hook) that is pivotally or rotatably coupled with the first structural member 3214 through a pin 3210. Latch member 3208 may be bias to pivot about pin 3210 in a first direction by spring 3204. Latch member 3208 can include a chamfered, rounded, or sloped surface that is configured to slidably couple with a corresponding pin 3206 of second structural member 3212 as tailgate 34 swings into the first position.

As tailgate 34 swings into the first position, the latch member 3208 rotates about pin 3210 in a second direction that is opposite the first direction (e.g., in a direction that opposes spring 3204 or that loads spring 3204). Once tailgate 34 is fully in the first position, latch member 3208 may snap or interlock into engagement with pin 3206 due to the torque exerted by spring 3204 in the first direction. In some embodiments, latch member 3208 defines a surface that is configured to abut, engage, directly contact, etc., the pin 3206 of second structural member 3212 after latch member 3208 has snapped into engagement (e.g., when the tailgate 34 is fully in the first position).

Spring-loaded latch 3200 can also include an electric motor 3202 that is fixedly coupled with the first structural member 3214 and configured to drive latch member 3208 to rotate or pivot relative to first structural member 3214 in the second direction. In some embodiments, when it is desired for tailgate 34 to be transitioned out of the first position, electric motor 3202 operates to swing latch member 3208 to pivot or rotate relative to first structural member 3214 in the second direction, thereby disengaging latch member 3208 from pin 3206. Once latch member 3208 is disengaged from pin 3206 (e.g., once pin 3206 does not contact, abut, or engage the surface of latch member 3208), tailgate 34 may be transitioned out of the first position.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the refuse vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A refuse vehicle comprising:
  a chassis;
  a body coupled with the chassis, the body defining a refuse compartment;
  a tailgate coupled with a rear of the body, the tailgate transitionable between a first position to limit access to the refuse compartment and a second position to allow access to the refuse compartment;
  a fully electric tailgate actuator assembly comprising:
    a first linkage extending from a first point on the body to a first point on the tailgate;
    a second linkage extending from a second point on the body to a second point on the tailgate; and
    an electric motor configured to drive at least one of the first linkage or the second linkage to rotate to transition the tailgate between the first position and the second position;
    wherein the first linkage, the second linkage, the body, and the tailgate define a four-bar linkage.

2. The refuse vehicle of claim 1, wherein in the first position, the first linkage and the second linkage are non-parallel with each other.

3. The refuse vehicle of claim 2, wherein in the second position, the first linkage and the second linkage are non-parallel with each other.

4. The refuse vehicle of claim 1, wherein the tailgate is adjusted upwards and towards a front of the refuse vehicle as the tailgate is transitioned from the first position to the second position.

5. The refuse vehicle of claim 1, wherein the first linkage has a length that is greater than a length of the second linkage.

6. The refuse vehicle of claim 1, wherein:
the first point on the body is positioned along the body lower than the second point is positioned along the tailgate;
the first point on the tailgate is positioned along the tailgate lower than the second point is positioned along the tailgate;
wherein the first linkage and the second linkage do not cross each other in the first position and in the second position.

7. The refuse vehicle of claim 1, wherein the tailgate both rotates and translates as the tailgate is transitioned from the first position to the second position, wherein an upper corner of the tailgate moves towards a front of the refuse vehicle as the tailgate transitions from the first position to the second position, and the upper corner is above a roof of the body.

8. The refuse vehicle of claim 1, further comprising a lock mechanism comprising:
a first hook on the body;
a second hook on the tailgate;
wherein the first hook and the second hook are configured to releasably couple with each other when the tailgate is in the first position to lock the tailgate in the first position.

9. The refuse vehicle of claim 8, wherein:
the first hook extends from a bottom of the body towards the tailgate;
the second hook extends from a bottom of the tailgate towards the body; and
the first hook is rotatably coupled with the body, and the second hook is fixedly coupled with the tailgate.

10. The refuse vehicle of claim 9, wherein the lock mechanism further comprises a spring configured to bias the first hook into engagement with the second hook when the tailgate is in the first position.

11. A refuse vehicle comprising:
a chassis;
a body coupled with the chassis, the body defining a refuse compartment;
a tailgate coupled with a rear of the body, the tailgate transitionable between a first position to limit access to the refuse compartment and a second position to allow access to the refuse compartment;
a fully electric tailgate actuator assembly comprising:
a first linkage extending from a first point on the body to a first point on the tailgate;
a second linkage extending from a second point on the body to a second point on the tailgate; and
an electric motor configured to drive at least one of the first linkage or the second linkage to rotate to transition the tailgate between the first position and the second position; and
a lock mechanism comprising:
a first hook on the body; and
a second hook on the tailgate;
wherein the first hook and the second hook are configured to releasably couple with each other when the tailgate is in the first position to lock the tailgate in the first position.

12. The refuse vehicle of claim 11, wherein:
the first hook extends from a bottom of the body towards the tailgate;
the second hook extends from a bottom of the tailgate towards the body; and
the first hook is rotatably coupled with the body, and the second hook is fixedly coupled with the tailgate.

13. The refuse vehicle of claim 12, wherein the lock mechanism further comprises a spring configured to bias the first hook into engagement with the second hook when the tailgate is in the first position.

14. The refuse vehicle of claim 11, wherein the first linkage, the second linkage, the body, and the tailgate define a four-bar linkage.

15. The refuse vehicle of claim 11, wherein in the first position, the first linkage and the second linkage are non-parallel with each other and wherein in the second position, the first linkage and the second linkage are non-parallel with each other, wherein the first linkage has a length that is greater than a length of the second linkage.

16. The refuse vehicle of claim 11, wherein the tailgate is adjusted upwards and towards a front of the refuse vehicle as the tailgate is transitioned from the first position to the second position.

17. The refuse vehicle of claim 11, wherein:
the first point on the body is positioned along the body lower than the second point is positioned along the tailgate;
the first point on the tailgate is positioned along the tailgate lower than the second point is positioned along the tailgate;
wherein the first linkage and the second linkage do not cross each other in the first position and in the second position.

18. The refuse vehicle of claim 11, wherein the tailgate both rotates and translates as the tailgate is transitioned from the first position to the second position, wherein an upper corner of the tailgate moves towards a front of the refuse vehicle as the tailgate transitions from the first position to the second position, and the upper corner is above a roof of the body.

19. A refuse vehicle comprising:
a chassis;
a body coupled with the chassis, the body defining a refuse compartment;
a tailgate coupled with a rear of the body, the tailgate transitionable between a first position to limit access to the refuse compartment and a second position to allow access to the refuse compartment;
a fully electric tailgate actuator assembly comprising:
a four bar linkage coupling the tailgate with the body; and
an electric motor configured to drive at least one linkage of the four bar linkage to rotate to transition the tailgate between the first position and the second position; and
a lock mechanism comprising:
a first hook on the body;
a second hook on the tailgate; and
a spring configured to bias the first hook into engagement with the second hook when the tailgate is in the first position
wherein the first hook and the second hook are configured to releasably couple with each other when the tailgate is in the first position to lock the tailgate in the first position.

20. A refuse vehicle comprising:
a chassis;
a body coupled with the chassis, the body defining a refuse compartment;
a tailgate coupled with a rear of the body, the tailgate transitionable between a first position to limit access to the refuse compartment and a second position to allow access to the refuse compartment;

a fully electric tailgate actuator assembly comprising:
- a first linkage extending from a first point on the body to a first point on the tailgate;
- a second linkage extending from a second point on the body to a second point on the tailgate; and
- an electric motor configured to drive at least one of the first linkage or the second linkage to rotate to transition the tailgate between the first position and the second position;
- wherein in the first position, the first linkage and the second linkage are non-parallel with each other.

21. A refuse vehicle comprising:
- a chassis;
- a body coupled with the chassis, the body defining a refuse compartment;
- a tailgate coupled with a rear of the body, the tailgate transitionable between a first position to limit access to the refuse compartment and a second position to allow access to the refuse compartment;
- a fully electric tailgate actuator assembly comprising:
  - a first linkage extending from a first point on the body to a first point on the tailgate;
  - a second linkage extending from a second point on the body to a second point on the tailgate; and
  - an electric motor configured to drive at least one of the first linkage or the second linkage to rotate to transition the tailgate between the first position and the second position;
  - wherein the tailgate both rotates and translates as the tailgate is transitioned from the first position to the second position, wherein an upper corner of the tailgate moves towards a front of the refuse vehicle as the tailgate transitions from the first position to the second position, and the upper corner is above a roof of the body.

* * * * *